(12) United States Patent
Kislev et al.

(10) Patent No.: US 12,278,519 B1
(45) Date of Patent: Apr. 15, 2025

(54) ELECTRIC MACHINE WITH MULTIPLE TOOTHED SPACERS IN COILS

(71) Applicant: EVR MOTORS LTD, Petah Tikva (IL)

(72) Inventors: Victor Kislev, Kfar Yona (IL); Ruslan Shabinski, Maale Adumim (IL); Eliyahu Rozinsky, Hod Hasharon (IL); Oleg Gaspar, Tel Aviv (IL)

(73) Assignee: EVR MOTORS LTD, Petah Tikva (IL)

( * ) Notice: Subject to any disclaimer, the term of this patent is extended or adjusted under 35 U.S.C. 154(b) by 0 days.

(21) Appl. No.: 18/398,472

(22) Filed: Dec. 28, 2023

(51) Int. Cl.
  *H02K 1/14* (2006.01)
  *H02K 1/276* (2022.01)
  *H02K 21/16* (2006.01)

(52) U.S. Cl.
  CPC ............. *H02K 1/146* (2013.01); *H02K 1/276* (2013.01); *H02K 21/16* (2013.01)

(58) Field of Classification Search
  CPC ......... H02K 1/146; H02K 1/276; H02K 21/16
  USPC .................................................. 310/216.058
  See application file for complete search history.

(56) References Cited

U.S. PATENT DOCUMENTS

| | | | |
|---|---|---|---|
| 2,451,633 | A | 10/1948 | Perrigo |
| 3,330,975 | A | 7/1967 | Osterwalder |
| 3,334,252 | A | 8/1967 | Gayral |
| 4,217,513 | A | 8/1980 | Kohzai et al. |
| 4,441,043 | A | 4/1984 | DeCesare |
| 4,683,388 | A | 7/1987 | DeCesare |
| 5,089,730 | A | 2/1992 | O'Connor et al. |
| 5,345,133 | A | 9/1994 | Satake |
| 5,642,013 | A | 6/1997 | Wavre |
| 5,659,217 | A | 8/1997 | Petersen |

(Continued)

FOREIGN PATENT DOCUMENTS

| | | |
|---|---|---|
| CN | 103560633 A | 2/2014 |
| CN | 109245346 | 1/2019 |

(Continued)

OTHER PUBLICATIONS

International Search Report for Int'l Search Application No. PCT/IB2021/058475, dated Dec. 20, 2021 (21 pages).

(Continued)

*Primary Examiner* — Alex W Mok
(74) *Attorney, Agent, or Firm* — Finnegan, Henderson, Farabow, Garrett & Dunner, LLP

(57) ABSTRACT

An electric machine includes a plurality of coils, at least one first yoke, at least one second yoke, and at least one intermediate yoke between the at least one first yoke and the at least one second yoke. Each coil defines a coil opening that includes a first section, a second section, and an intermediate section between the first section and the second section. A plurality of first wedge-shaped teeth is integrally formed with and extends from the at least one first yoke into a differing one of the plurality of coil openings in the first section thereof. A plurality of second wedge-shaped teeth is integrally formed with and extends from the at least one second yoke into a differing one of the plurality of coil openings in the second section thereof. A plurality of intermediate wedge-shaped teeth is integrally formed with and extends from the at least one intermediate yoke into a differing one of the plurality of coil openings in the intermediate section thereof.

18 Claims, 32 Drawing Sheets

(56) References Cited

U.S. PATENT DOCUMENTS

| | | | |
|---|---|---|---|
| 5,751,089 A | 5/1998 | Stridsberg |
| 5,866,965 A | 2/1999 | Baronosky et al. |
| 5,874,796 A | 2/1999 | Petersen |
| 6,011,339 A | 1/2000 | Kawakami |
| 6,046,520 A | 4/2000 | Betsch et al. |
| 6,072,253 A | 6/2000 | Harpenau et al. |
| 6,137,202 A | 10/2000 | Holmes et al. |
| 6,211,587 B1 | 4/2001 | Enomoto |
| 6,226,856 B1 | 5/2001 | Kazama et al. |
| 6,472,792 B1 | 10/2002 | Jack et al. |
| 6,812,612 B2 | 11/2004 | Schunk et al. |
| 6,924,574 B2 | 8/2005 | Qu et al. |
| 6,956,307 B2 | 10/2005 | Engquist et al. |
| 6,979,919 B2 | 12/2005 | Gotmalm |
| 7,164,220 B2 | 1/2007 | Gilmour et al. |
| 7,173,353 B2 | 2/2007 | Lopatinsky et al. |
| 7,218,026 B2 | 5/2007 | Murakami et al. |
| 7,471,023 B2 | 12/2008 | Roundell |
| 7,723,888 B2 | 5/2010 | Petek |
| 7,737,600 B2 | 6/2010 | Endo et al. |
| 7,847,443 B2 | 12/2010 | Farnia |
| 7,902,712 B2 | 3/2011 | Nakamasu et al. |
| 7,990,015 B2 | 8/2011 | Mongeau et al. |
| 8,069,550 B2 | 12/2011 | Gadelmeier et al. |
| 8,075,825 B2 | 12/2011 | Takahashi et al. |
| 8,082,654 B2 | 12/2011 | Bender |
| 8,183,724 B2 | 5/2012 | Rodriguez et al. |
| 8,212,438 B2 | 7/2012 | Belton |
| 8,230,580 B2 | 7/2012 | Kiyono et al. |
| 8,250,734 B2 | 8/2012 | Fubuki et al. |
| 8,378,534 B2 | 2/2013 | Houle et al. |
| 8,766,506 B2 | 7/2014 | Sano et al. |
| 8,881,362 B2 | 11/2014 | Yoshimura et al. |
| 8,893,375 B1 | 11/2014 | Pairaktaridis |
| 9,287,755 B2 | 3/2016 | Woolmer et al. |
| 9,391,499 B2 | 7/2016 | Kim |
| 9,479,036 B2 | 10/2016 | Lim et al. |
| 9,502,951 B2 | 11/2016 | Rozinsky et al. |
| 9,777,770 B2 | 10/2017 | Lang et al. |
| 10,038,349 B2 | 7/2018 | Long et al. |
| 10,056,813 B2 | 8/2018 | Rozinsky et al. |
| 10,288,078 B2 | 5/2019 | De Filippis |
| 10,491,068 B2 | 11/2019 | Seo et al. |
| 10,536,055 B2 | 1/2020 | Hanumalagutti |
| 10,566,858 B2 | 2/2020 | Takano |
| 10,574,099 B2 | 2/2020 | Xu et al. |
| 10,601,273 B2 | 3/2020 | Rippel et al. |
| 10,644,555 B2 | 5/2020 | Mueller et al. |
| 10,644,556 B2 | 5/2020 | Tamura et al. |
| 11,062,840 B2 | 7/2021 | Dai et al. |
| 11,088,595 B2 | 8/2021 | Suda et al. |
| 11,177,712 B2 | 11/2021 | Lambourne et al. |
| 11,296,572 B1 | 5/2022 | Kislev et al. |
| 11,322,994 B2 | 5/2022 | Kislev et al. |
| 11,336,132 B2 | 5/2022 | Kislev et al. |
| 11,349,359 B2 | 5/2022 | Kislev et al. |
| 11,355,985 B2 | 6/2022 | Kislev et al. |
| 11,374,444 B2 | 6/2022 | Kislev et al. |
| 11,451,099 B2 | 9/2022 | Kislev et al. |
| 11,489,378 B2 | 11/2022 | Kislev et al. |
| 11,489,379 B2 | 11/2022 | Kislev et al. |
| 2002/0053838 A1 | 5/2002 | Okuda |
| 2002/0089239 A1 | 7/2002 | Emoto et al. |
| 2002/0149282 A1 | 10/2002 | Heidrich |
| 2004/0007933 A1 | 1/2004 | Hsu |
| 2005/0258705 A1 | 11/2005 | Berwald et al. |
| 2006/0006745 A1 | 1/2006 | Lopatinsky et al. |
| 2006/0190922 A1 | 8/2006 | Chen |
| 2006/0208602 A1 | 9/2006 | Enomoto |
| 2006/0244338 A1 | 11/2006 | Petersen |
| 2007/0052305 A1 | 3/2007 | Roundell |
| 2007/0252447 A1 | 11/2007 | Lonel |
| 2008/0001494 A1 | 1/2008 | Endo |
| 2008/0169720 A1 | 7/2008 | Petek |
| 2008/0185932 A1 | 8/2008 | Jajtic et al. |
| 2008/0197741 A1 | 8/2008 | Schunk |
| 2009/0026875 A1* | 1/2009 | Mongeau ............... H02K 3/522 |
| | | 310/216.044 |
| 2009/0115361 A1 | 5/2009 | Nitta |
| 2009/0127970 A1 | 5/2009 | Tatematsu |
| 2009/0256430 A1 | 10/2009 | Farnia |
| 2009/0302694 A1 | 12/2009 | Asai |
| 2010/0066198 A1 | 3/2010 | Fubuki et al. |
| 2010/0244603 A1 | 9/2010 | El-Refaie |
| 2010/0253176 A1 | 10/2010 | Ovrebo et al. |
| 2011/0016701 A1 | 1/2011 | Bender |
| 2011/0109190 A1 | 5/2011 | Aoyama et al. |
| 2012/0007453 A1 | 1/2012 | Leiber |
| 2012/0043844 A1 | 2/2012 | Bailey et al. |
| 2013/0069475 A1 | 3/2013 | Ocket et al. |
| 2013/0147291 A1 | 6/2013 | Woolmer et al. |
| 2013/0187485 A1 | 7/2013 | Sakamoto et al. |
| 2013/0278088 A1 | 10/2013 | Bahr |
| 2013/0285489 A1 | 10/2013 | Lemma |
| 2013/0328432 A1 | 12/2013 | Hoemann |
| 2014/0175920 A1 | 1/2014 | Cimatti |
| 2014/0117790 A1 | 5/2014 | Sakamoto et al. |
| 2014/0125167 A1 | 5/2014 | Marvin |
| 2014/0285048 A1 | 9/2014 | Seo |
| 2014/0375163 A1 | 12/2014 | Esakov et al. |
| 2015/0048701 A1 | 2/2015 | Johnsen et al. |
| 2016/0056607 A1 | 2/2016 | Eckert |
| 2016/0149472 A1 | 5/2016 | Pal |
| 2016/0204661 A1 | 7/2016 | De Filippis |
| 2016/0226321 A1 | 8/2016 | Krishnasamy |
| 2017/0104402 A1 | 4/2017 | Dai et al. |
| 2017/0170706 A1 | 6/2017 | Bhargava |
| 2017/0353063 A1* | 12/2017 | Bell ..................... H02K 1/18 |
| 2018/0099657 A1 | 4/2018 | Leiber |
| 2018/0166936 A1 | 6/2018 | Do |
| 2018/0175707 A1 | 6/2018 | Miyama |
| 2018/0248429 A1 | 8/2018 | Sakauchi |
| 2018/0337572 A1 | 11/2018 | Miyama |
| 2019/0156992 A1 | 5/2019 | Dai et al. |
| 2019/0229569 A1 | 7/2019 | Li |
| 2019/0229583 A1 | 7/2019 | Dextraze |
| 2019/0260252 A1 | 8/2019 | Lambourne |
| 2019/0260254 A1 | 8/2019 | Azar et al. |
| 2019/0372408 A1 | 12/2019 | Taniguchi et al. |
| 2020/0067391 A1* | 2/2020 | Sandner ................ H02K 1/182 |
| 2020/0076261 A1 | 3/2020 | Fritsch |
| 2020/0119620 A1 | 4/2020 | Suda et al. |
| 2020/0136441 A1 | 4/2020 | Azar |
| 2020/0153321 A1 | 5/2020 | Manabe et al. |
| 2020/0177042 A1 | 6/2020 | Desai |
| 2020/0274430 A1 | 8/2020 | Petersen |
| 2020/0276896 A1 | 9/2020 | Kawamura et al. |
| 2021/0143701 A1 | 5/2021 | Sangha |
| 2021/0328477 A1 | 10/2021 | Tsai et al. |
| 2022/0029509 A1 | 1/2022 | Martens et al. |
| 2022/0094216 A1 | 3/2022 | Kislev et al. |
| 2022/0094217 A1 | 3/2022 | Kislev et al. |
| 2022/0094231 A1 | 3/2022 | Kislev et al. |
| 2022/0385141 A1 | 12/2022 | Kislev et al. |

FOREIGN PATENT DOCUMENTS

| | | |
|---|---|---|
| CN | 208862675 U | 5/2019 |
| CN | 209994171 U | 1/2020 |
| CN | 111224502 A | 6/2020 |
| CN | 111404290 A | 7/2020 |
| CN | 112186915 A | 1/2021 |
| DE | 10229333 | 1/2004 |
| DE | 102004026453 A1 | 12/2004 |
| DE | 10336780 A1 | 3/2005 |
| DE | 102004034611 A1 | 2/2006 |
| DE | 102006049420 A | 5/2007 |
| DE | 102009008405 A1 | 8/2010 |
| DE | 102010002696 A1 | 3/2011 |
| DE | 102014000636 A1 | 7/2015 |
| DE | 102016218822 A1 | 3/2018 |
| EP | 1416619 A1 | 5/2004 |
| EP | 1555734 A1 | 7/2005 |
| EP | 1806822 A1 | 7/2007 |

(56) References Cited

FOREIGN PATENT DOCUMENTS

| | | |
|---|---|---|
| EP | 1923979 A1 | 5/2008 |
| EP | 2530688 A1 | 12/2012 |
| FR | 3024608 A1 | 2/2016 |
| GB | 1343413 A | 1/1974 |
| GB | 2507072 A | 4/2014 |
| JP | S5612827 A | 2/1981 |
| JP | H1187165 A | 3/1999 |
| JP | 2000041365 A | 2/2000 |
| JP | 2000050540 A | 2/2000 |
| JP | 2002315247 A | 10/2002 |
| JP | 2002369418 A | 12/2002 |
| JP | 2004201483 A | 7/2004 |
| JP | 2005310566 A | 11/2005 |
| JP | 2005319479 A | 11/2005 |
| JP | 2006166610 A | 6/2006 |
| JP | 2007221913 A | 8/2007 |
| JP | 2007295740 A | 11/2007 |
| JP | 2015167432 A | 9/2015 |
| JP | 2016149905 A | 8/2016 |
| JP | 2017147780 A | 8/2017 |
| KR | 100847481 B1 | 7/2009 |
| RU | 2696853 C2 | 2/2018 |
| WO | WO0209256 A1 | 1/2002 |
| WO | WO2011026795 A1 | 3/2011 |
| WO | WO2013030108 A2 | 3/2013 |
| WO | WO2016199486 A1 | 12/2016 |
| WO | WO2017036354 A1 | 3/2017 |
| WO | WO2015140970 A1 | 4/2017 |
| WO | WO2019087358 A1 | 5/2019 |
| WO | WO2020066208 A1 | 4/2020 |
| WO | WO2020165435 A1 | 8/2020 |
| WO | WO2020233936 A1 | 11/2020 |
| WO | WO2022016950 A1 | 1/2022 |
| WO | PCT/IB2021/058475 | 3/2022 |
| WO | WO2022058939 | 3/2022 |

OTHER PUBLICATIONS

Takano et al., Core, Armature Core, and Motor, Jul. 15, 2004, JP 2004201483 (English Machine Translation) (Year 2004) ( 9 pgs.).

Li et al, A Concentrated Winding Transvers Magnetic Flux Permanent Magnet Synchronous Motor, Jul. 10, 2020, CN 111404290 (English Machine Translation) (Year 2020) (7 pgs.).

Kolehmainen Jere, Stator for Axial Flux Electric Motor, Nov. 26, 2020, WO 2020233936 English Machine Translation) (Year 2004) (10 pgs.).

Drozdek et al, Inductor of Rotating Electrical Machine with Improved Magnetic Performance, Feb. 5, 2016, FR 3024608 (English Machine Translation) (Year 2016) (23 pgs.).

Hill, Machine Translation of DE102004026453, Dec. 2004 (Year 2004) (36 pgs.).

* cited by examiner

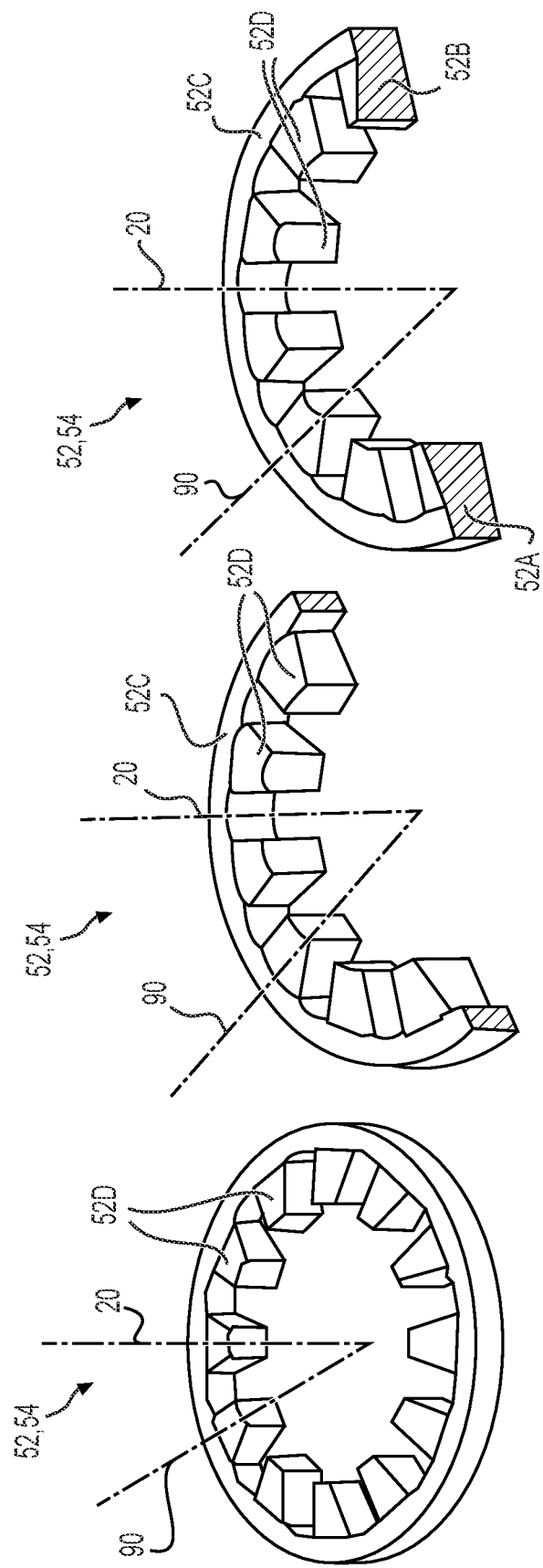

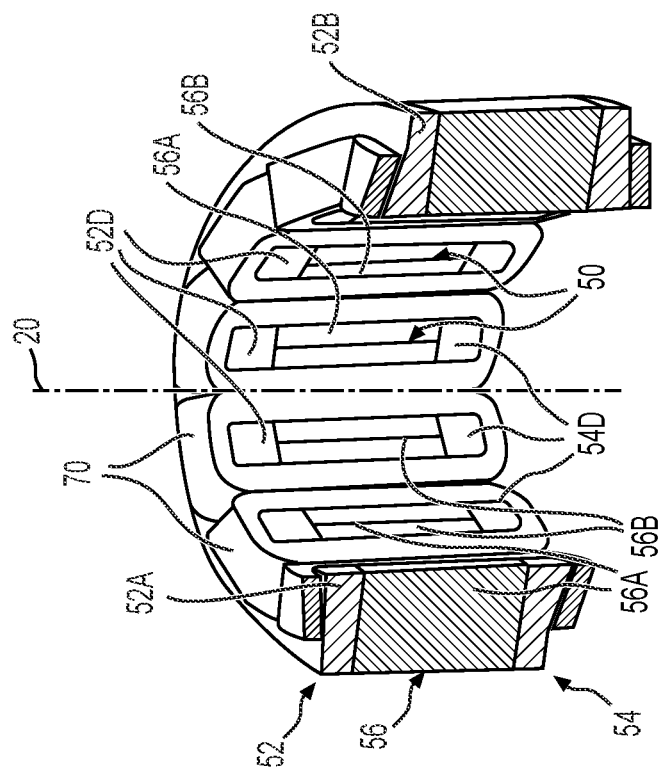
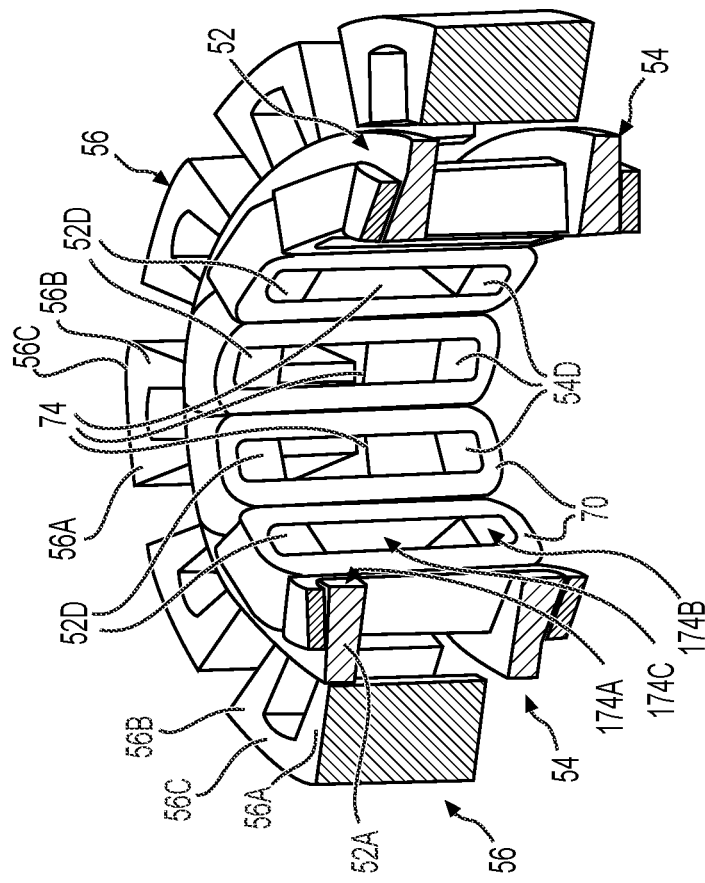
FIG. 13B
FIG. 13A

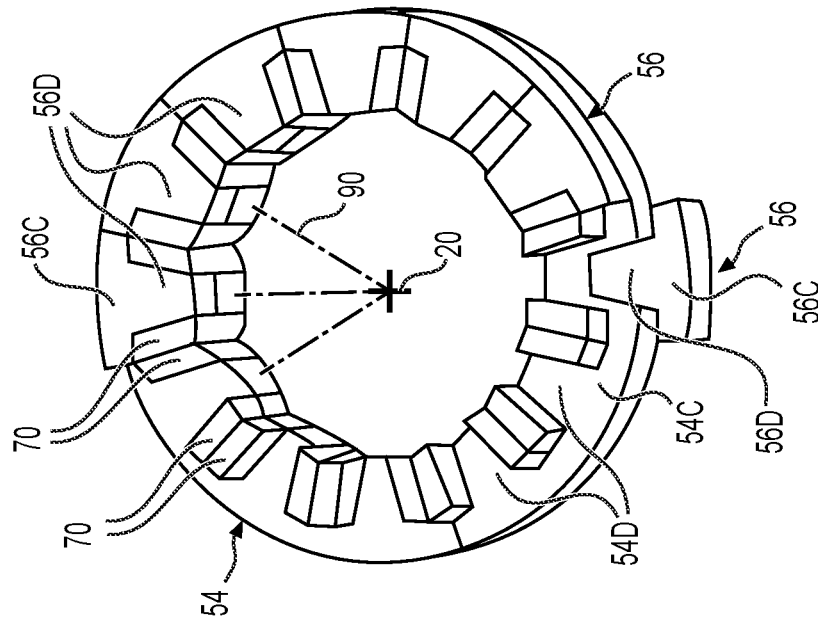
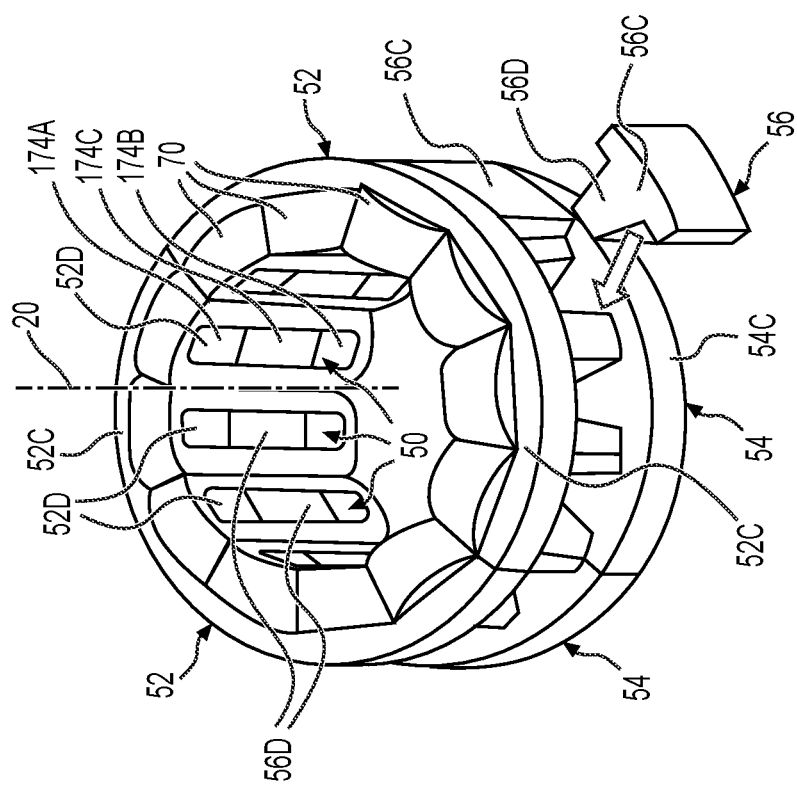
FIG. 14B
FIG. 14A

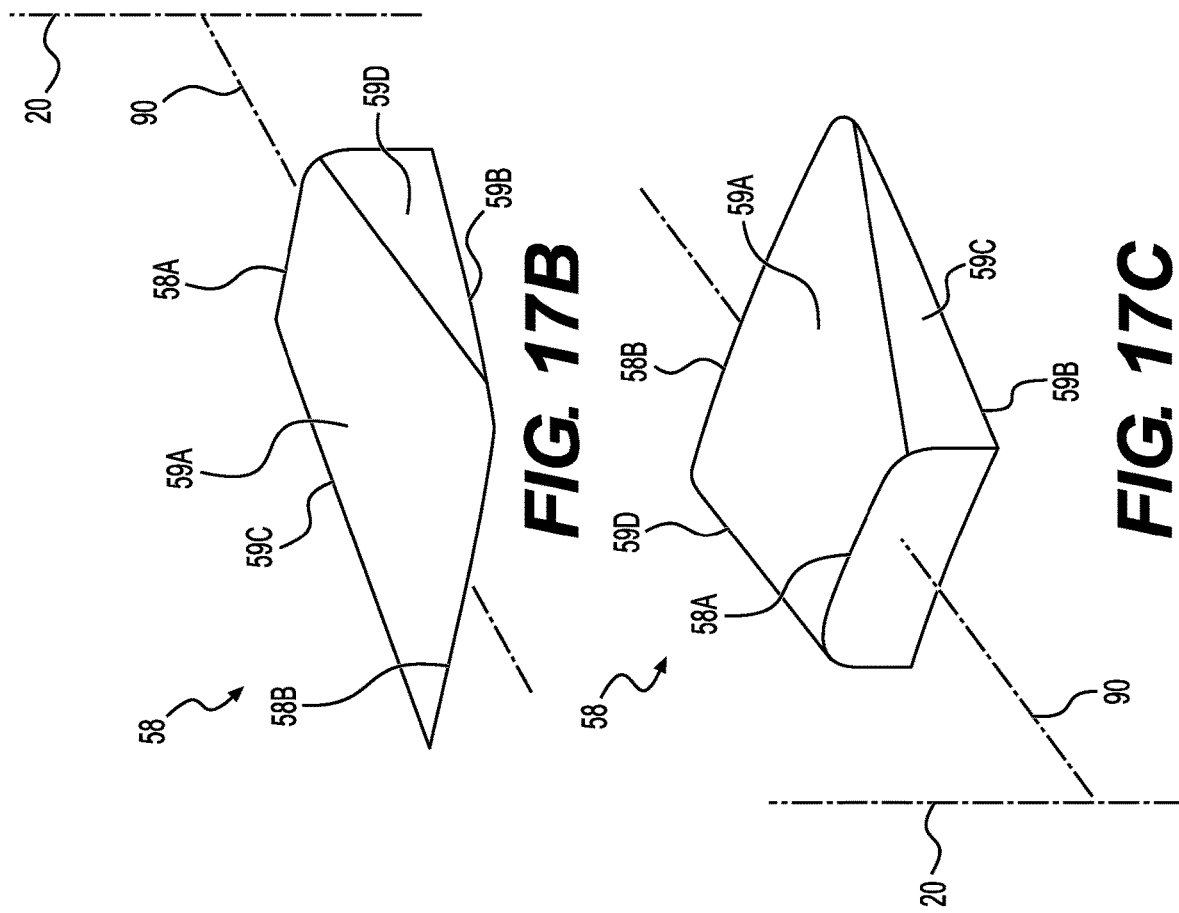
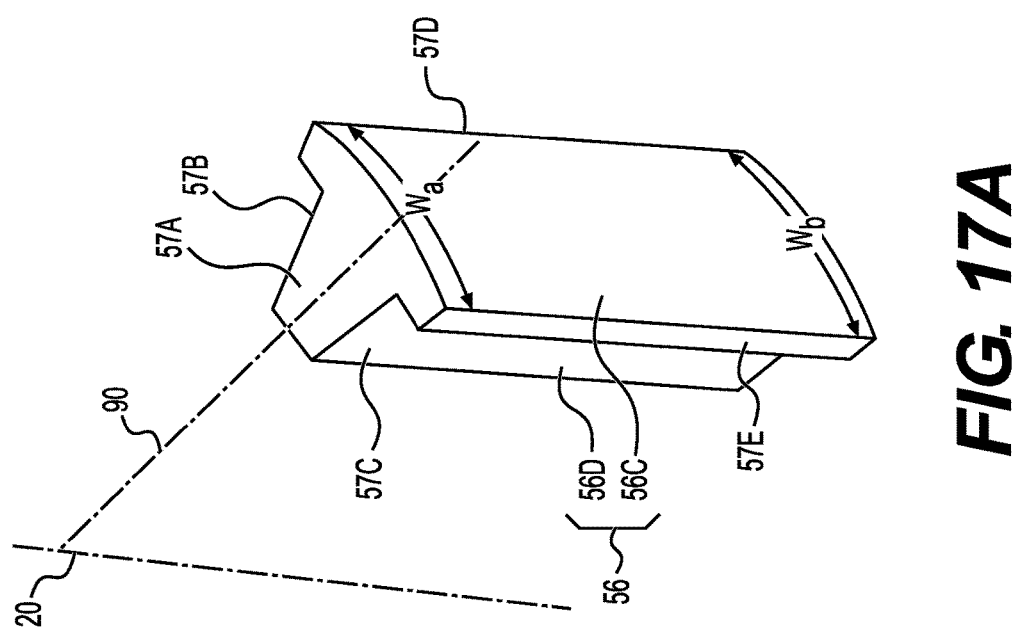
FIG. 17B   FIG. 17C   FIG. 17A

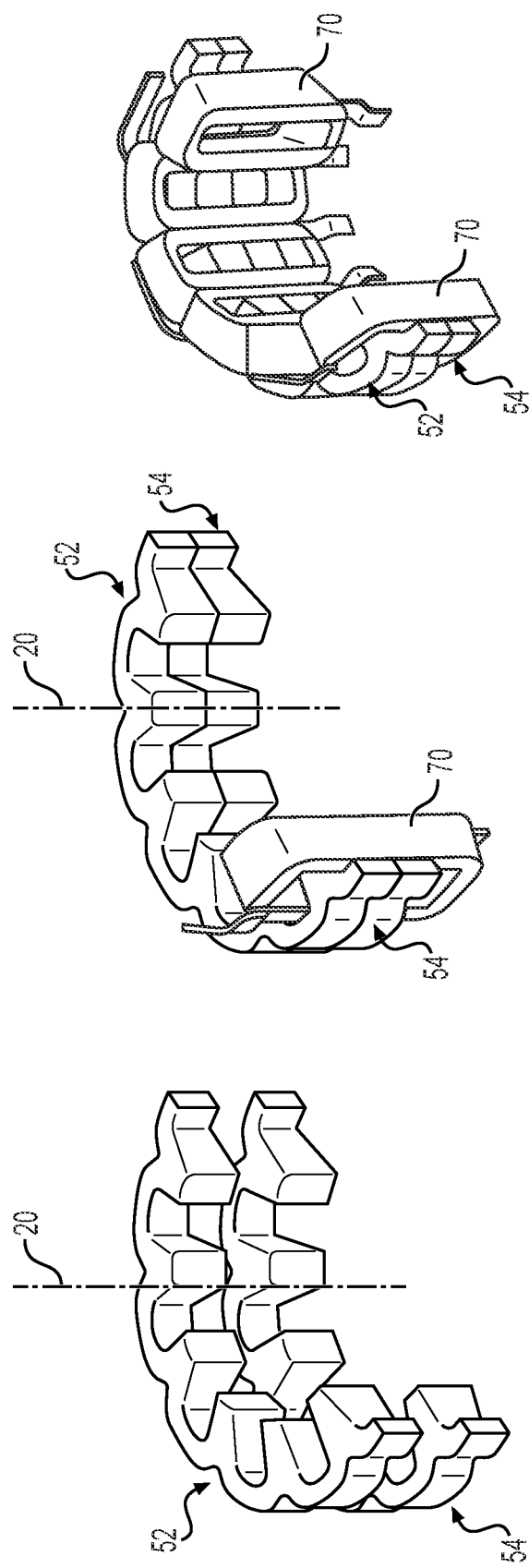

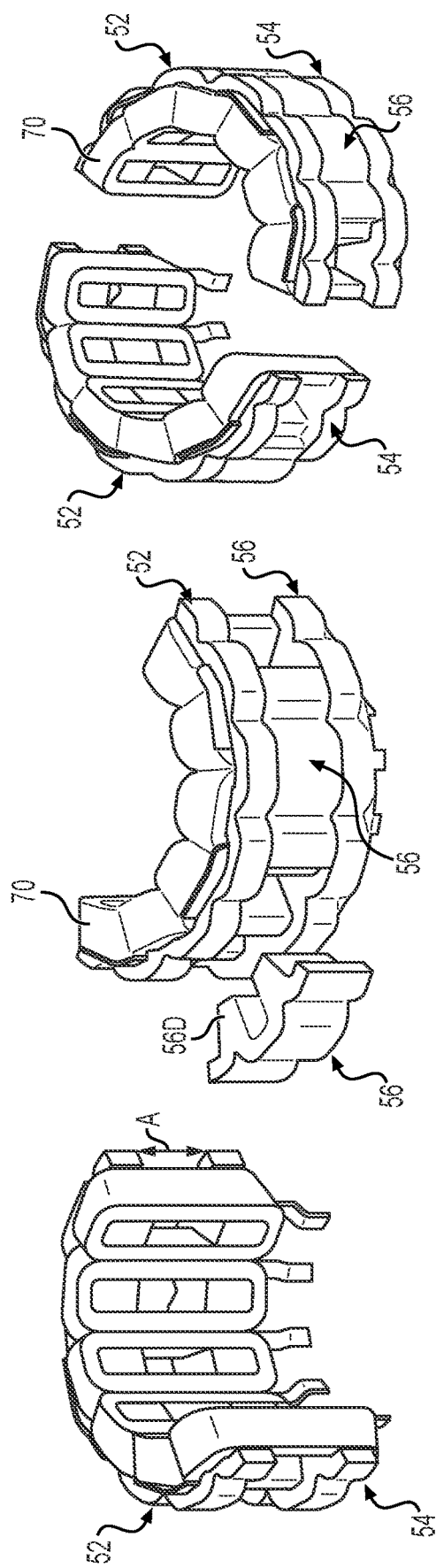

ELECTRIC MACHINE WITH MULTIPLE TOOTHED SPACERS IN COILS

TECHNICAL FIELD

The present disclosure relates to electric machines, in particular to radial flux electric machines.

BACKGROUND

The term "electric machine" (or electrical machine) generally refers to a machine that relies on electromagnetic forces for its operation. The two main parts of an electric machine can be described in mechanical or electrical terms. In mechanical terms, the rotor is the rotating part, and the stator is the stationary part of an electrical machine. In electrical terms, the armature is the power-producing component, and the field is the magnetic field producing component of an electrical machine. The armature can be on the rotor or the stator, and the magnetic field can be provided by either electromagnets or permanent magnets mounted on either the rotor or the stator. Electric machines are electromechanical energy converters and include, among others, electric motors, and electric generators. An electric motor converts electricity to mechanical power while an electric generator converts mechanical power to electricity. The moving part of the electric machine can be rotating (rotating electric machines) or linear (linear electric machines). Electric machines operate on the principle that electrical current generates electromagnetic flux and vice versa. In some electric machines, a rotor including permanent magnets is configured for rotating in an electromagnetic field generated by a plurality of electromagnets through which electricity is passed.

Electrical machines can be categorized as axial flux electric machines and radial flux electric machines. The fundamental difference between these types of machines lies in the orientation of the magnetic field. In radial flux electric machines, the working magnetic flux crosses the air gap between the stator and the rotor in the radial plane, while in axial flux electric machines, the magnetic flux crosses the air gap parallel to the axis of rotation. A large number of solutions are known aimed at reducing the stray fields of permanent magnets and windings of an electric machine, as well as increasing the concentration of the magnetic flux density in the stator and rotor cores, and strive to ensure the same values of the magnetic flux density in all parts of the core. There are also a large number of solutions aimed at providing a high fill factor for permanent magnet electric machines. Some of these solutions use complex tooth shapes to improve electric machine performance. While some of these solutions effectively uses the volume of the tooth, they do not sufficiently reduce the leakage fluxes of the electric machine. In addition, in some cases, the complex tooth shapes make it difficult to provide a high winding fill factor. The electric machines of the current disclosure alleviate some or all of the above-mentioned issues. A decrease in leakage fluxes and an increase in the fill factor in embodiments of electric machines of the current disclosure may allow for increased power and efficiency of electrical machines. However, the scope of the current disclosure is defined by the claims and not by the ability to solve any particular problem.

SUMMARY

Several embodiments of an electric machine and methods of fabricating and using an electric machine are disclosed. It is to be understood that both the foregoing general description and the following detailed description are exemplary and explanatory only. As such, the scope of the disclosure is not limited solely to the disclosed embodiments. Instead, it is intended to cover such alternatives, modifications and equivalents within the spirit and scope of the disclosed embodiments. Persons skilled in the art would understand how various changes, substitutions and alterations can be made to the disclosed embodiments without departing from the spirit and scope of the disclosure.

Some disclosed embodiments include an electric machine comprising a plurality of coils and a plurality of U-shaped clips. Each coil of the plurality of coils may define a coil opening, and each U-shaped clip may include a first tooth, a second tooth, and a yoke interconnecting the first tooth and the second tooth. The first tooth of each U-shaped clip may be disposed in one coil opening of the plurality of coils and the second tooth of each U-shaped clip may be disposed in another coil opening of an adjacent coil with the yoke bridging two adjacent coils. Two sidewalls of the two adjacent coils may be sandwiched between the first tooth and the second tooth of each U-shaped clip.

Some disclosed embodiments include an electric machine comprising a plurality of coils, at least one first yoke, at least one second yoke, and at least one intermediate yoke between the at least one first yoke and the at least one second yoke. Each coil may define a coil opening and each coil opening may include a first section, a second section, and an intermediate section between the first section and the second section. A plurality of first wedge-shaped teeth may be integrally formed with and extend from the at least one first yoke and each of the plurality of first wedge-shaped teeth may extend into a differing one of the plurality of coil openings in the first section thereof. A plurality of second wedge-shaped teeth may be integrally formed with and extend from the at least one second yoke and each of the plurality of second wedge-shaped teeth may extend into a differing one of the plurality of coil openings in the second section thereof. A plurality of intermediate wedge-shaped teeth may be integrally formed with and extend from the at least one intermediate yoke and the plurality of intermediate wedge-shaped teeth may extend into a differing one of the plurality of coil openings in the intermediate section thereof.

Some disclosed embodiments include an electric machine comprising a plurality of electromagnetic coils with each electromagnetic coil defining a trapezoidally-shaped and tapered coil opening. The plurality of electromagnetic coils may be arranged circumferentially about an axis of rotation of the electric machine. The electric machine may also include a plurality of yokes each extending in an axial direction. At least one of the plurality of yokes may be tapered in the axial direction. The electric machine may also include a plurality of teeth. At least one tooth of the plurality of teeth may extend from each of the plurality of yokes. The plurality of teeth may each be tapered in a radial direction to enable the plurality of teeth to fit within a corresponding trapezoidally-shaped and tapered coil opening.

Some disclosed embodiments include an air coolable electric machine comprising a rotor, a stator, and a heat dissipation plate. The heat dissipation plate may have a first side arranged for thermal communication with the stator, a central opening, and an outer periphery. A plurality of circumferentially distributed Y-shaped or ψ-shaped cooling fins may extend from a second side of the heat dissipation plate opposite the first side. Each cooling fin may include a radially extending leg portion and a V-shaped or ψ-shaped deflector portion. Each V-shaped or v-shaped deflector portion may face the outer periphery of the heat dissipation plate to deflect a first portion of airflow outwardly. And each radially extending leg portion may be arranged to direct portion of airflow inwardly toward the central opening.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate exemplary embodiments and, together with the description, are used to explain the disclosed principles. In these drawings, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure.

For simplicity and clarity of illustration, the figures depict the general structure of the various described embodiments. Details of well-known components or features may be omitted to avoid obscuring other features, since these omitted features are well-known to those of ordinary skill in the art. Further, elements in the figures are not necessarily drawn to scale. The dimensions of some features may be exaggerated relative to other features to improve understanding of the exemplary embodiments. One skilled in the art would appreciate that the features in the figures are not necessarily drawn to scale and, unless indicated otherwise, should not be viewed as representing proportional relationships between different features in a figure. Additionally, even if it is not specifically mentioned, aspects described with reference to one embodiment or figure may also be applicable to, and may be used with, other embodiments or figures.

FIGS. 11A-11F are illustrations of exemplary portions of a multi-part tooth consistent with some embodiments of the current disclosure;

FIGS. 13A-13B are schematic illustrations of another exemplary multipart tooth of an electric machine consistent with some embodiments of the current disclosure;

FIGS. 14A-14B are cross-sectional perspective illustrations of another exemplary multipart tooth arrangement of an electric machine consistent with some embodiments of the current disclosure;

FIGS. 17A-17C illustrate parts of an exemplary multi-part tooth consistent with some embodiments of the current disclosure;

FIGS. 23A-23I are illustrations depicting an exemplary method of assembling a stator consistent with some embodiments of the current disclosure.

DETAILED DESCRIPTION

Figure 1:
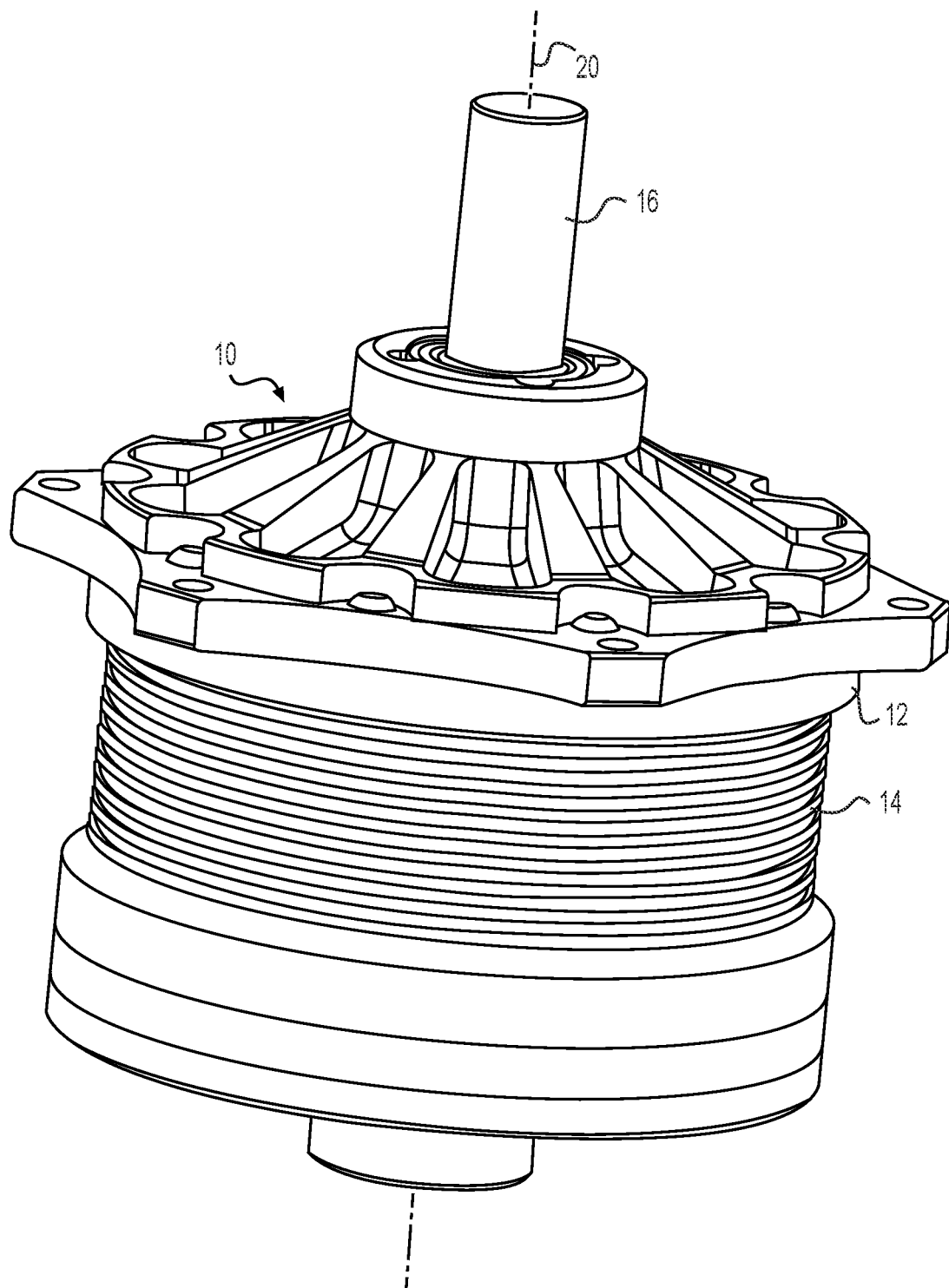
FIG. 1 illustrates a perspective view of one embodiment of an exemplary electric machine consistent with some embodiments of the current disclosure.

With regard to terminology used in this detailed description, all relative terms such as "about," "substantially," "approximately," etc. are used to indicate a possible variation of up to 15% (unless noted otherwise or another variation is specified). For example, the cross-sectional area of a first region described in this disclosure as being substantially equal to, or substantially the same as, the cross-sectional area of a second region covers a variation in cross-sectional area of up to 15% in its ambit. Similarly, a dimension substantially equal "t" units (width, length, etc.) covers a variation of up to 15%. Additionally, a dimension described as being between a range (e.g., X-Y, X to Y, etc.) includes the two boundaries. That is, a dimension between X-Y can be any dimension between X−15% to X+15%. Unless indicated otherwise, all terms relating to the shape of an object or area refers to approximate shapes. For example, a cross-sectional shape described as being square (rectangular, trapezoidal, etc.) does not necessarily refer to an exact square (unless it is described as being such). Instead, slight variations in the described shape (e.g., resulting from manufacturing processes, tolerances, etc.) are also covered. For example, the corners of cross-sectional area described as being square may have rounded (or chamfered) corners, variations in corner angle of up to 15%, variations in parallelism between the opposite sides of 15%, etc.

Unless defined otherwise, all terms of art, notations and other scientific terms or terminology used herein have the same meaning as is commonly understood by one of ordinary skill in the art to which this disclosure belongs. Some of the components, structures, and/or processes described or referenced herein are well understood and commonly employed using conventional methodology by those skilled in the art. Therefore, these components, structures, and processes will not be described in detail. All patents, applications, published applications and other publications referred to herein are incorporated by reference in their entirety. If a definition or description set forth in this disclosure is contrary to, or otherwise inconsistent with, a definition and/or description in these references, the definition and/or description set forth in this disclosure prevails over those in the references that are incorporated by reference. None of the references described or referenced herein is admitted as prior art to the current disclosure.

Various embodiments of the current disclosure involve an electric machine. As used herein, an "electric machine" (or electrical machine) is a device that operates based on electromagnetic forces. An electric machine may be an energy converter that transforms electric energy into mechanical energy or vice versa. In other words, some electric machines convert electric energy to mechanical energy and some electric machines convert mechanical energy to electric energy. In general, any type of electromechanical energy converter that operates on, or generates, electricity is an electric machine. In some embodiments, the electric machine may be an electric motor or an electric generator. During operation, an electric machine generates magnetic flux. In a radial flux electric machine, at least some portions of the generated magnetic flux extends perpendicular to the axis of rotation of the machine. Electric machines include a stator and a rotor separated by an air gap. In a radial flux electric machine, the working (or main) magnetic flux may extend between the rotor and the stator through the air gap in the radial plane.

FIG. 1 illustrates an exemplary electric machine 10. In some embodiments, electric machine 10 may be a radial flux electric machine. In general, electric machines may be air cooled or liquid cooled. Electric machine 10 illustrated in FIG. 1 may be an air-cooled system with a housing 12. External ribs 14 may be positioned on the external surface of the housing 12 to transfer heat generated by the electric machine 10 during operation to the surrounding air. In the discussion below, electric machine 10 in the form of an electric motor will be described. However, the description is equally applicable to other types of electric machines, such as, for example, an electric generator. When electric machine 10 operates, its shaft 16 rotates about an axis of rotation 20. Electric machine 10 may include a stator and a rotor. As used herein, a "stator" is a stationary or a fixed part, component, or assembly (of components) of the electric machine, and a "rotor" is a part, component, or assembly that is configured to move with respect to the stator. In other words, the rotor may be a rotating part and the stator may be a stationary part of the electric machine. The rotor may be positioned radially inwards of the stator (called an inner-rotor electric machine) or radially outwards of the stator (called an outer-rotor electric machine). The current disclosure is applicable to both inner-rotor and outer-rotor machines.

Figure 2A:
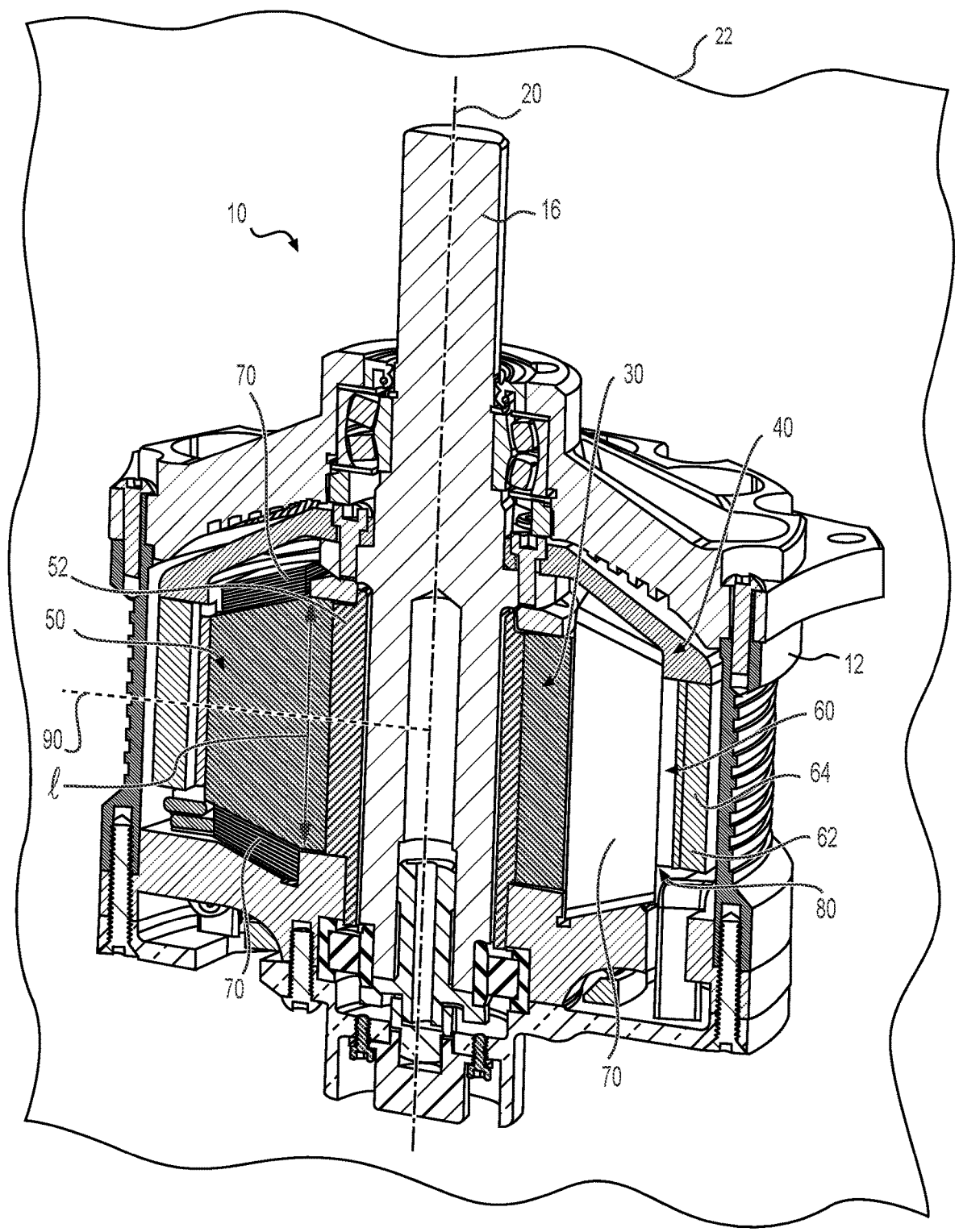
FIG. 2A is a cross-sectional view of in an axial plane of the electric machine of FIG. 1.
Figure 2B:
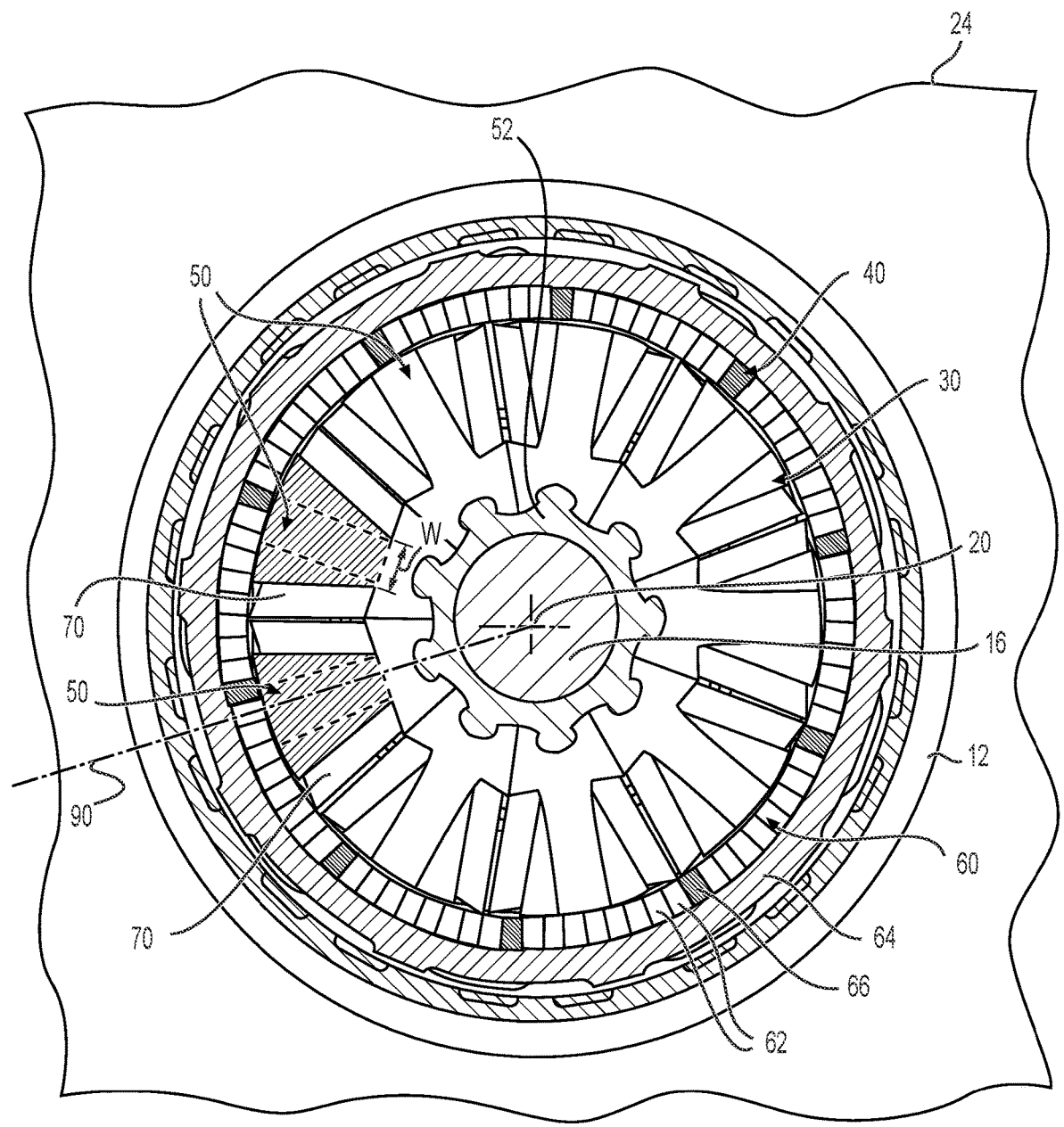
FIG. 2B is a cross-sectional view in a radial plane of the electric machine of FIG. 1.
Figure 2C:
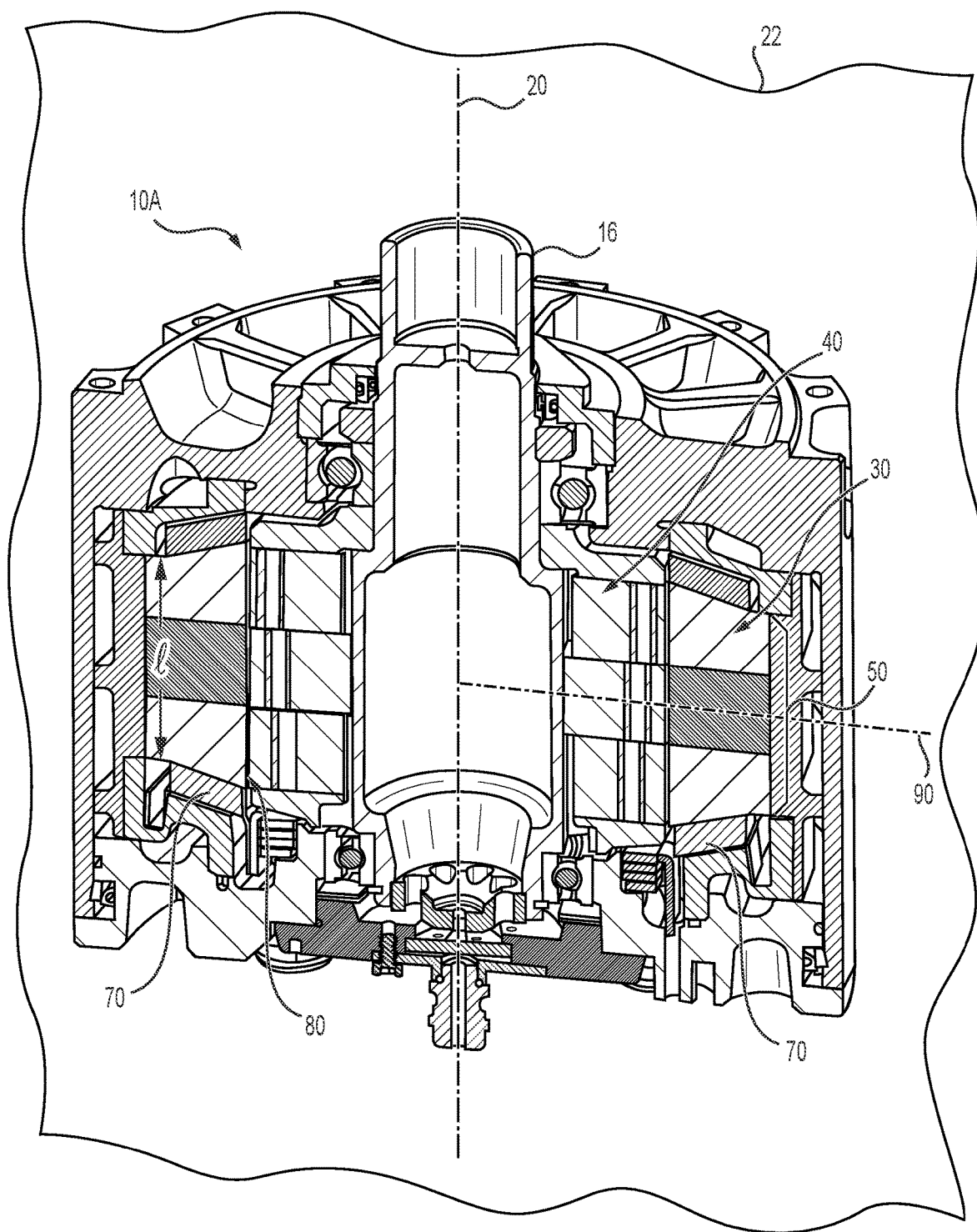
FIG. 2C is a cross-sectional view of another exemplary electric machine of the current disclosure in an axial plane.
Figure 2D:
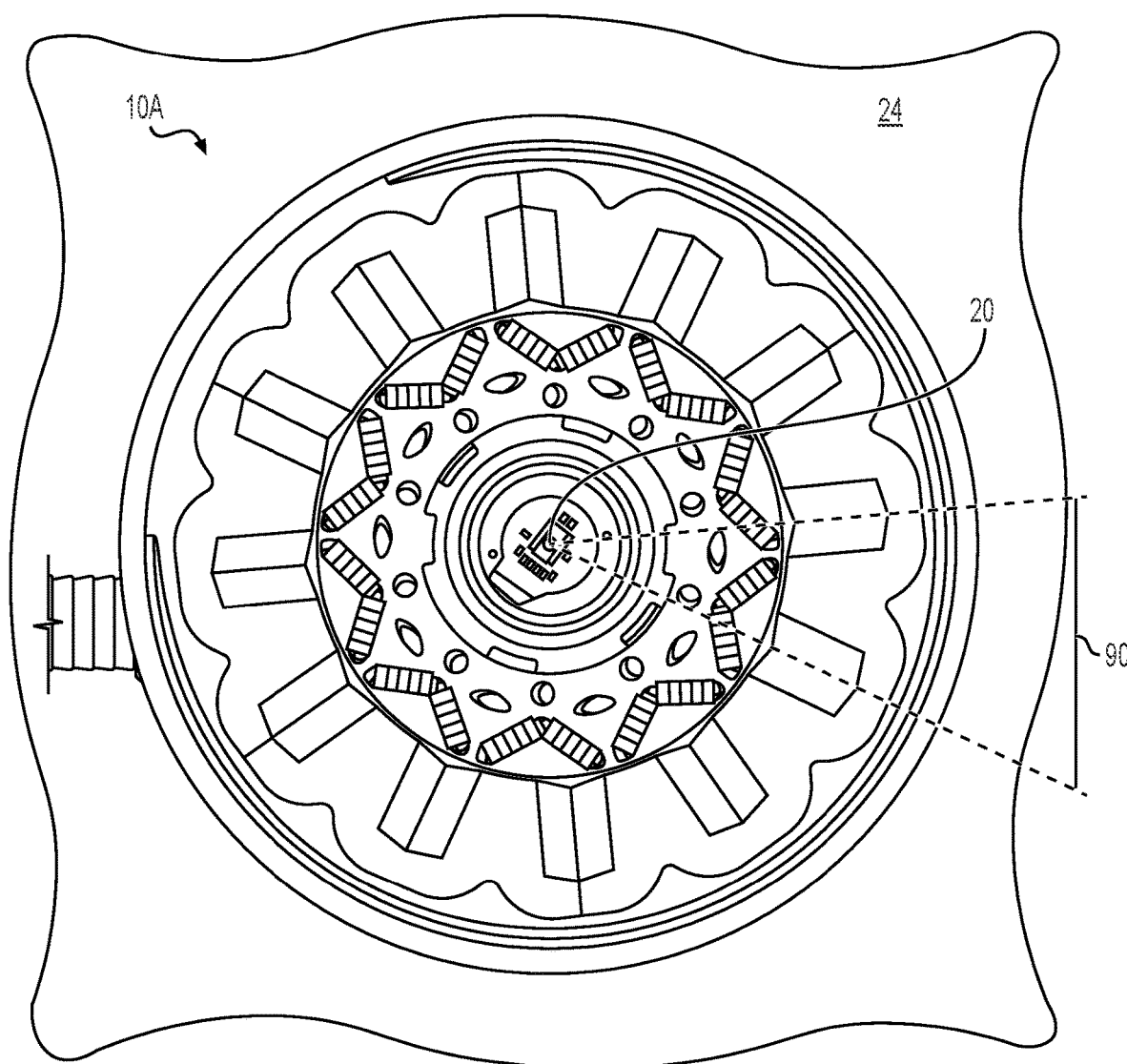
FIG. 2D is a cross-sectional view in a radial plane of the electric machine of FIG. 2C.

FIG. 2A is a cross-sectional view of an exemplary outer-rotor electric machine 10 along an axial plane 22 of the machine 10, and FIG. 2B is a cross-sectional view of machine 10 along a radial plane 24 of machine 10. FIG. 2C is a cross-sectional view of an exemplary inner-rotor electric machine 10A along an axial plane 22 of the machine. As used herein, "axial plane" refers to an imaginary plane that the axis of rotation 20 lies in. In other words, every point of the axis of rotation 20 of electric machine 10 lies in the axial plane 22. As seen in FIGS. 2A and 2C, the axis of rotation 20 of the machine lies in the axial plane 22, and the axial plane 22 bisects the electric machine into two symmetric halves. "Radial plane" refers to an imaginary plane that extends perpendicular to the axis of rotation 20. In some embodiments, the electric machine may have a generally cylindrical configuration (see, e.g., FIG. 1) and the radial plane 24 may be a plane used to describe a virtual slice along a radial axis 90 of the generally cylindrically shaped machine. In other words, every point of the radial axis 90 lies in the radial plane 24. The axial plane 22 and the radial planes 24 are mutually orthogonal or perpendicular planes. In FIG. 2B, the axis of rotation 20 extends perpendicular (e.g., into and out of the paper) to the radial plane 24. Electric machine 10 of FIG. 2A includes a stator 30 positioned radially inwards of a rotor 40, and in electric machine 10A of FIG. 2C, rotor 40 is positioned radially inwards of stator 30. In electric machines 10 and 10A, rotor 40 may be configured to rotate about the axis of rotation 20 relative to stator 30. Rotor 40 may be connected to the shaft 16 that is configured to rotate about the axis of rotation 20. In some embodiments, rotor 40 may be coupled to shaft 16 such the rotor and the shaft rotate about the axis of rotation 20 without relative motion between them.

The rotor of the disclosed electric machine may include a plurality of permanent magnets in some embodiments. A "permanent magnet" is a magnet formed of a material where the magnetic field is generated by the internal structure of the material itself without an external magnetizing field. In other words, a permanent magnet is an object made from a material that is magnetized and creates its own persistent magnetic field. For example, the internal construction of a permanent magnet may create a lasting magnetic field inside of it such that, even after an external magnetizing field is removed, they still retain their magnetic field. The permanent magnets of the rotor generate a flux field in the rotor. During operation of the electric machine, the stator generates a field that interacts with the rotor's magnetic field. Changing the position of the stator field with respect to the rotor field causes the rotor to shift. The shift due to this interaction is the magnetic torque. Any type of permanent magnet may be used. In some embodiments, the permanent magnets may include one or more of ferrites, alnico, samarium cobalt, or a neodymium alloy. With reference to electric machine 10 of FIGS. 2A and 2B, a plurality of permanent magnets 60 are coupled to a rotor core 64 of rotor 40. As best seen in FIG. 2B, each permanent magnet 60 may include multiple permanent magnet segments 62 coupled together in the form of an arc about the axis of rotation 20. In general, any number of magnet segments 62 may be included in each permanent magnet 60. In some embodiments, all permanent magnets 60 may include the same number of segments 62. In some embodiments, the multiple segments 62 may be attached together (e.g., by an adhesive material) to form a permanent magnet 60. In some embodiments, each permanent magnet 60 may be coated with an electrically non-conductive material. In some embodiments, adjacent permanent magnets 60 may be separated from each other by spacers 66 made of an electrically non-conductive material. The spacers 66 may be attached to the adjacent permanent magnets 60 by an adhesive material (e.g., glue). In some embodiments, the spacers 66 may be eliminated and adjacent permanent magnets 60 may be separated from each other by a space or a gap.

The stator (and/or the rotor) of an electric machine may include a plurality of teeth. As used herein "teeth" (and its singular "tooth") refers to projections or protrusions. For example, as used herein, a tooth generally refers to any projection or protrusion. In a radial flux electric machine, the teeth may project or extend in a radial direction towards or away from the axis of rotation of the machine. In other words, a tooth may be a projection that protrudes along the radial axis of the machine (e.g., towards or away from the axis of rotation). In some embodiments, at least a portion of the teeth may protrude from a body. The portion of the teeth that protrudes from the body may be integral with the body or may be connected (or coupled) to the body. Although the teeth may be a part of the stator or the rotor, in the discussion below, the teeth are described as being part of the stator. For example, in the exemplary outer-rotor electric machine 10 of FIG. 2A, the teeth may project from the stator 30 towards the rotor 40 in a radial direction away from the axis of rotation 20, and in the exemplary inner-rotor electric machine 10A of FIG. 2C, the teeth may project from the stator 30 towards the rotor 40 in a radial direction towards the axis of rotation 20. In some embodiments, the stator teeth may include a series of substantially similar projections that protrude from the body. Each projection may form a tooth or a portion of a tooth. The teeth may be configured or shaped to direct a substantial portion of the magnetic flux between the stator and the rotor therethrough. With reference to FIGS. 2A and 2B, in electric machine 10, the stator 30 includes a plurality of teeth 50 arranged annularly and symmetrically about the axis of rotation 20. Teeth 50 extend radially outwards from a stator core 52 that extends around the axis of rotation 20. As explained previously, in an inner-rotor electric machine 10A, the stator teeth 50 may project radially inwards towards the axis of rotation 20. The outline of a tooth 50 is shown using dashed lines in FIG. 2B. As can be seen in FIGS. 2B and 2C, in some embodiments, each tooth 50 may include multiple pieces or parts that are arranged together to form a composite or a multi-part tooth. It should be noted that the configuration of multi-part teeth 50 illustrated in FIGS. 2B and 2C are merely exemplary and many variations are possible. As will be described in more detail later, in some embodiments of the current disclosure, each tooth 50 may be a multi-part tooth and may have a trapezoidal cross-sectional shape in both the axial plane (see FIGS. 2A, 2C) and the radial plane (see FIG. 2B).

The electric machines of the current disclosure may include a plurality of electromagnetic coils. An "electromagnetic coil" (which may be referred to herein as simply a coil) may include one or more turns of an electrical conductor (e.g., wire, multiple strands of wire twisted together, strip, foil, or another configuration of an electrical conductor) that generates a magnetic field when an electric current is passed through the conductor (e.g., in electric motors), or generates a voltage across the conductor when a magnetic field passes over the coil. In some embodiments, the turns of electrical conductor may be configured or shaped like a coil, loop, twist, curl, or a spiral. In some embodiments, an electromagnetic coil may be an electrical conductor that contains a series of conductive wires configured to be wrapped around a ferromagnetic core. In general, electromagnetic coils of the current disclosure may be associated with the stator or the rotor of the electric machine. That is, in some embodiments, the plurality of coils may be coupled to (e.g., mounted, installed, wound on, etc.) the rotor and in other embodiments, the plurality of coils may be coupled to the stator. In the exemplary embodiments of electric machines 10, 10A illustrated in FIGS. 2A-2C, a plurality of electromagnetic coils 70 are coupled to the stator 30 such that each electromagnetic coil 70 is mounted on a multi-part tooth 50 of the stator 30. In some embodiments, each coil 70 may be snugly fitted on, or mounted on, a tooth 50 such that the internal surfaces of the coil 70 makes physical contact with the external surfaces of the multi-part tooth 50.

In the exemplary embodiment of electric machine 10 illustrated in FIGS. 2B, stator 30 includes nine multi-part teeth 50 and rotor 40 includes ten permanent magnets 60. However, this is only exemplary, and in general any number of teeth and permanent magnets may be provided. In electric machine 10 discussed with reference to FIGS. 2A and 2B, rotor 40 is positioned radially outwards of (or outside) stator 30 and the stator and rotor separated by a single air gap 80. In this embodiment, a width (W) of each multi-part tooth 50 in the radial plane 24 increases in the radially outward direction (see FIG. 2B) along radial axis 90 towards the air gap 80 (and rotor 40), and a length (f) of each tooth 50 in an axial plane 22 decreases in the radially outward direction along radial axis 90 towards the air gap 80 (see FIG. 2A). This is also exemplary, and electrical machines of the current disclosure may have other configurations. For example, FIGS. 3A-3D are schematic illustrations of some exemplary configurations of electric machines of the current disclosure showing the layout of the stator 30 relative to the rotor 40. In each case, the rotor 40 includes a plurality of permanent magnets 60 and is connected to a shaft that rotates about the axis of rotation 20. And the stator 30 includes a plurality of teeth 50 arranged annularly about the axis of rotation 20 with an electromagnetic coil 70 mounted on each tooth 50. As in the embodiments of FIGS. 2A-2C, each tooth 50 in the electric machines of FIGS. 3A-3C may include multiple parts (e.g., each tooth is a multi-part tooth), and each multi-part tooth 50 may have a trapezoidal cross-sectional shape in both the axial and radial planes.

Figure 3A:
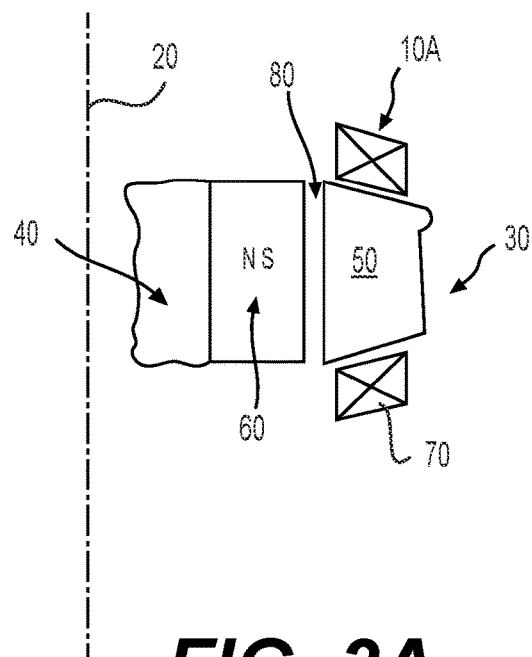
FIGS. 3A-3C are schematic illustrations in an axial plane of portions of electric machines consistent with some embodiments the current disclosure.
Figure 3B:
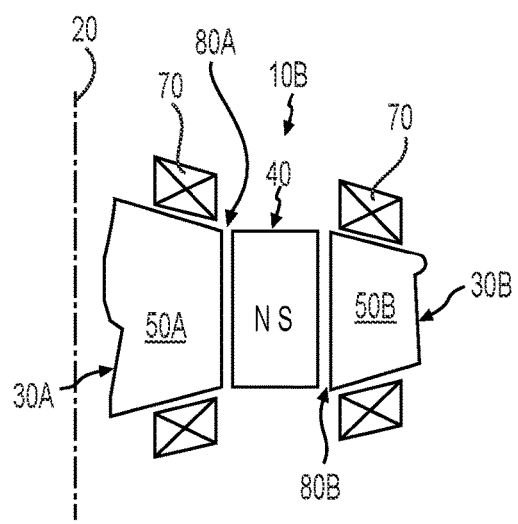
Figure 3C:
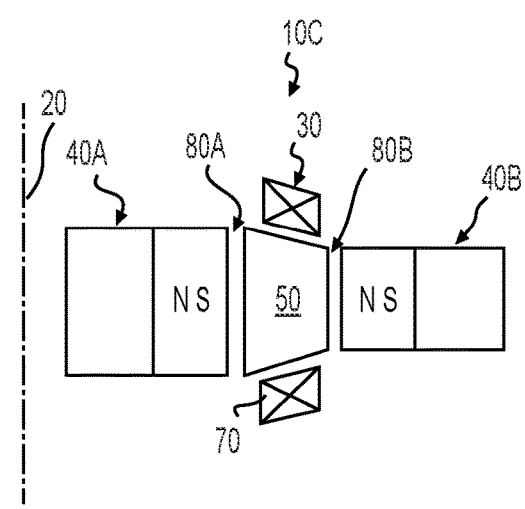

In electric machine 10A of FIGS. 2C and 3A, the rotor 40 is positioned radially inwards of the stator 30 (e.g., inner-rotor) and they are separated by an air gap 80. In electric machine 10A, the length (f) of each tooth 50 in the axial plane increases in the radially inward direction towards the air gap 80 and the rotor 40, and the width of the tooth in the radial plane decreases in the radially inward direction towards the air gap 80 and the rotor 40. Note that the radial plane, which is not visible in FIGS. 2C and 3A, extends into the plane of the paper. Electric machine 10B of FIG. 3B includes two stators 30A, 30B positioned on opposite sides of the rotor 40. Both the inner and the outer stators 30A, 30B include a plurality or multi-part teeth 50A, 50B annularly arranged about the axis of rotation 20. In electric machine 10B, the width of each tooth 50A (in the radial plane) of the inner stator 30A increases in the radially outward direction toward rotor 40 and air gap 80A, and the width of each tooth 50B of the outer stator 30B decreases in the radially inward direction toward the rotor 40 (and air gap 80B. Conversely, as shown in FIG. 3B, the length of each tooth 50A (in the axial plane) of the inner stator 30A decreases in the radially outward direction toward rotor 40 and air gap 80A, and the length of each tooth 50B of the outer stator 30B increases in the radially inward direction toward rotor 40 and air gap 80B. In other words, if the width of a tooth 50 decreases in one direction its length increases in that same direction, and vice versa. Electric machine 10C of FIG. 3C includes two rotors 40A, 40B positioned on opposite sides of the stator 30. An air gap 80A is formed between inner rotor 40A and stator 30 and an air gap 80B is formed between outer rotor 40B and stator 30. Such an electric machine may be called a double air gap machine. As in electric machines discussed previously, stator 30 of electric machine 10C includes a plurality of multi-part teeth 50. The width of each tooth 50 (in the radial plane) increases in a radially outward direction towards the outer rotor 40B and air gap 80B, and decreases in a radially inward direction towards the inner rotor 40A and air gap 80A. Conversely, as shown in FIG. 8C, the length of each tooth 50 (in the axial plane) decreases in the radial outward direction toward the outer rotor 40B and air gap 80B and increases in the radially inward direction toward the inner rotor 40A and air gap 80A.

Electric machines of the current disclosure may also have other configurations. For example, see, FIGS. 8A-22 of WO 2022/058939 A1 (published on Mar. 24, 2022) which is incorporated by reference herein in its entirety. As explained previously, electric machines of the current disclosure may include teeth having multiple parts that, when arranged together, have a trapezoidal cross-sectional shape in both the axial plane 22 and the radial plane 24. And electromagnetic coils may be mounted on one or more (e.g., all) of the multi-part teeth. Although the teeth were described as being part of the stator in the exemplary embodiments discussed above, this is only exemplary. In general, the multi-part teeth may be part of the stator and/or the rotor.

Figure 4A:
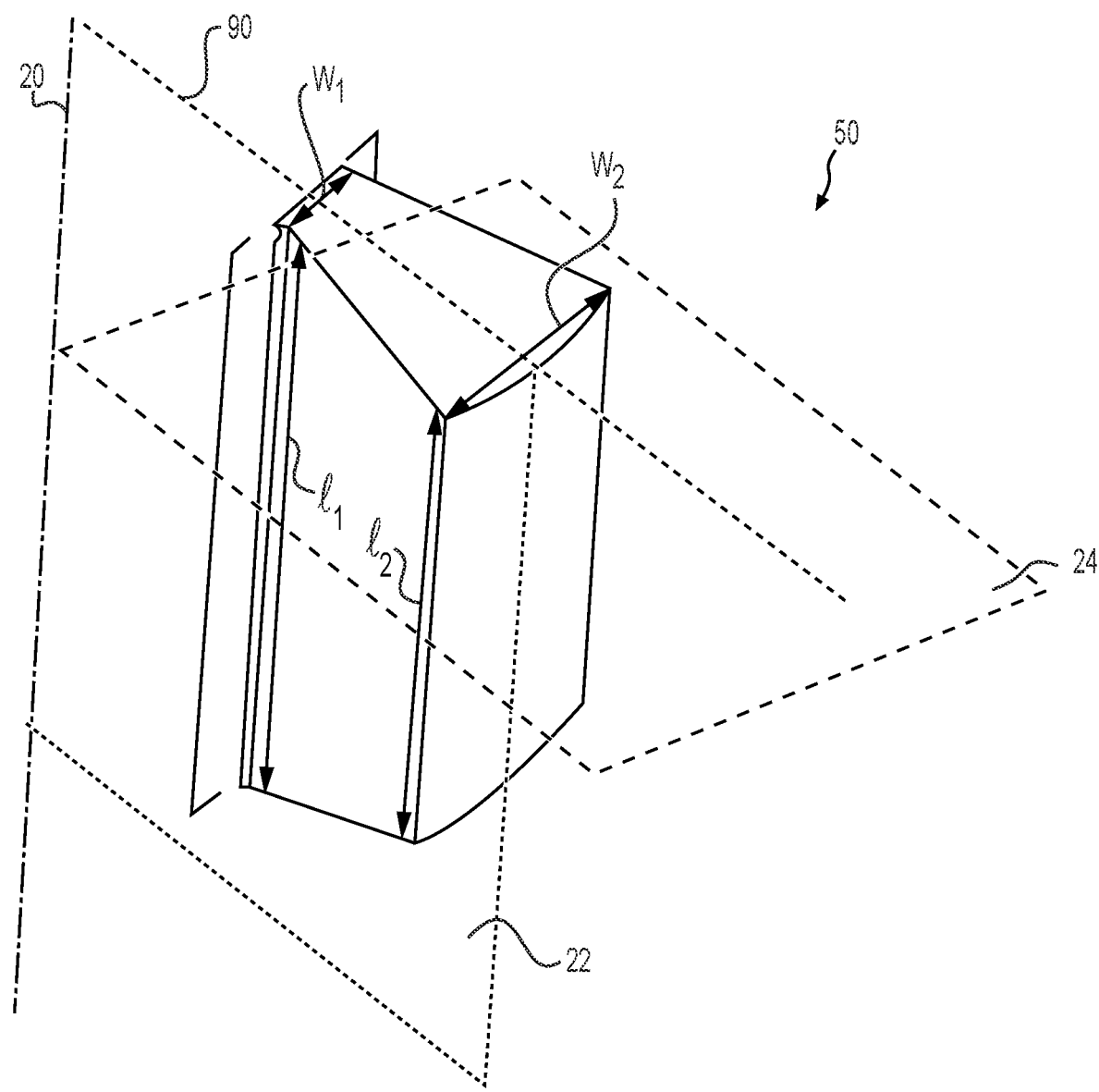
FIG. 4A is a perspective view of an exemplary tooth of an internal-rotor electric machine consistent with some embodiments of the current disclosure.
Figure 4B:
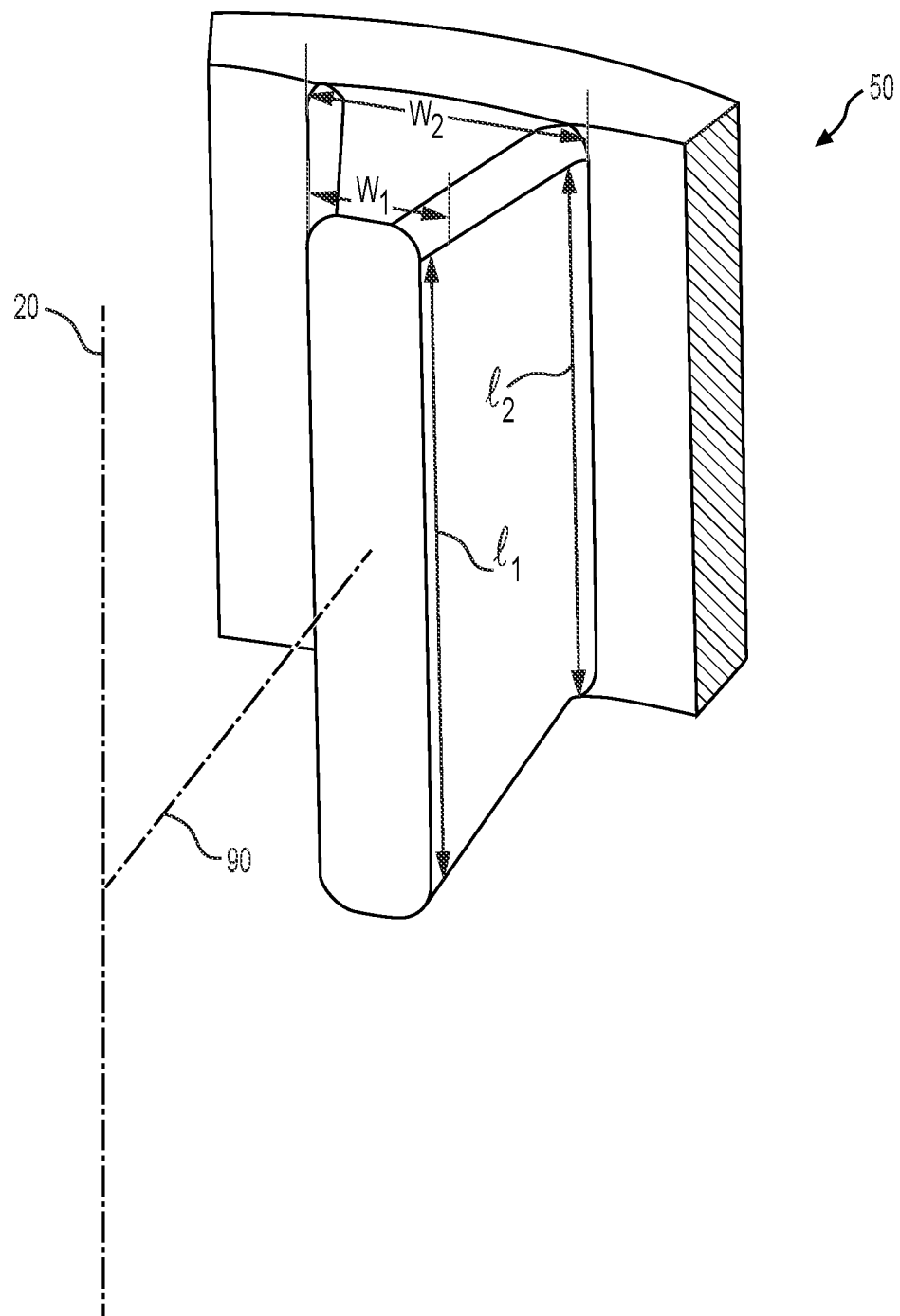
FIG. 4B is a perspective view of another exemplary tooth of an external-rotor electric machine consistent with some embodiments of the current disclosure.

In electric machines of the current disclosure, each multi-part tooth may have a trapezoidal cross-sectional shape in two mutually perpendicular planes (namely, the axial and radial planes). That is, as explained previously with reference to FIGS. 2A and 2B, the cross-sectional shape of each tooth 50 in the axial and radial planes 22, 24 may be trapezoidal. As used in the current disclosure, a "trapezoid" is a two-dimensional flat closed shape having four substantially straight sides with only one pair of parallel sides. It should be noted that, in an actual tooth, some or all sides of the tooth may deviate from being perfectly straight, and some or all corners (e.g., between the sides) of the tooth may deviate from being sharp (e.g., be rounded or beveled), for example, to account for manufacturing and tolerance requirements. For example, in some embodiments, the opposite sides of the cross-section of a tooth may not be perfectly parallel, the adjacent sides may not be perfectly perpendicular, and the corners may be rounded and/or chamfered. In some embodiments, the cross-sectional shape of a tooth in the axial and/or the radial planes may be an isosceles trapezoid (i.e., a trapezoid where the length of the opposite sides are equal). FIG. 4A illustrates a perspective view of an exemplary multi-part tooth 50 of an internal-rotor electric machine after the multiple parts that make up the tooth are assembled together. FIG. 4B illustrates an exemplary multi-part tooth 50 of an external-rotor electric machine. Only the external boundaries of the assembled tooth are shown in FIGS. 4A and 4B, and the boundaries of the different parts of the tooth are not shown. The width and length of each tooth 50 varies along the radial axis 90. For example, the length of tooth 50 varies from $l_1$ to $l_2$ in the radially outward direction (from the axis of rotation 20) along radial axis 90, and the width of tooth 50 varies from $w_1$ to $w_2$ in the radially outward direction along radial axis 90.

Figures 5A, 5B, 5C, 5D:
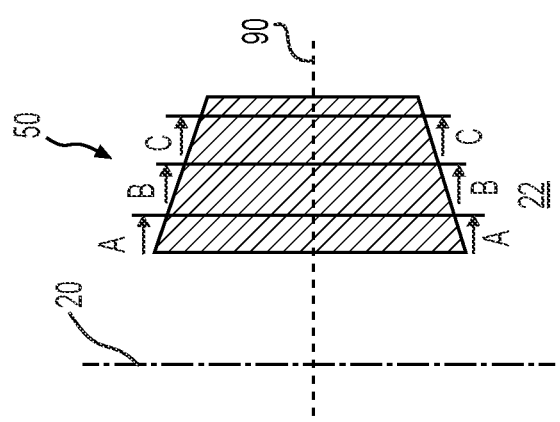
FIGS. 5A-5D illustrate cross-sectional views of an exemplary tooth in different planes consistent with some embodiments of the current disclosure.

FIGS. 5A-5D are cross-sectional images of a multi-part tooth 50 along different planes. FIG. 5A illustrates the cross-sectional image of tooth 50 in the axial plane 22 (compare with FIG. 2A). Tooth 50 is shown hatched in FIG. 5A. As evident from FIG. 5A, the cross-sectional shape of tooth 50 in the axial plane 22 is trapezoidal (i.e., a quadrilateral with one pair of opposing parallel sides and another pair of opposing non-parallel sides). In some embodiments, the cross-sectional shape of tooth 50 in the axial plane 22 may be an isosceles trapezoid. As also evident from FIG. 5A, the length of tooth 50 decreases with increasing distance in the radial direction along the radial axis 90. FIGS. 5B-5D illustrate cross-sections of tooth 50 at different planes (A-A, B-B, and C-C) perpendicular to the radial direction 90. FIG. 5B is the cross-sectional view of teeth 50 along plane A-A, FIG. 5C is the cross-sectional view of teeth 60 along plane B-B, and FIG. 5D is the cross-sectional view of teeth 60 along plane C-C. As can be seen from FIGS. 5B-5D, in planes perpendicular to the radial direction 90, tooth 50 may have a substantially rectangular cross-sectional shape. In should be noted that, although, perfect rectangles with square corners (i.e., 90° corners) are illustrated in FIGS. 5B-5D, this is only exemplary. As previously explained, these cross-sectional shapes of an actual tooth 50 may not be perfect rectangles (see, e.g., FIG. 4B). As illustrated in FIGS. 5B-5D, the rectangular shape gets shorter and wider as the distance in the radial direction increases. That is, as the distance along the radial axis 90 increases from the axis of rotation 20, the length of tooth 50 decreases (i.e., $a_1 > b_1 > c_1$ and $a_3 > b_3 > c_3$), and the width of the tooth 120 increases (i.e., $a_2 < b_2 < c_2$ and $a_4 < b_4 < c_4$). Although not required, in some embodiments, the opposite sides of the cross-sectional shape may be equal. That is, $(a_1 = a_3) > (b_1 = b_3) > (c_1 = c_3)$, and $(a_2 = a_4) < (b_2 = b_4) < (c_2 = c_4)$. In other words, tooth 50 gets progressively shorter and wider in the radially outward direction from the axis of rotation 20. The cross-sectional area of tooth 50 (i.e., the cross-sectional area in the plane perpendicular to the radial axis 90) also varies in the radially outward direction. In some embodiments where the rotor 40 is outside the stator 40 (e.g., FIGS. 2A, 2B), the cross-sectional area may increase in the radially outward direction (i.e., $S_A < S_B < S_C$). In other embodiments of electric machines, the area may vary in a different manner along the radial direction. For example, in electric machines with an inner rotor 40 and outer stator 30 (see FIG. 3A), the cross-sectional area may decrease in the radially outward direction along the radially axis 90 (i.e., increase in the radially inward direction).

With reference to FIGS. 5A-5D, the perimeter of each tooth 50 in the radial direction along the radial axis 90 may be substantially a constant, while the cross-sectional area of each tooth 50 in the radial direction may vary. That is, the perimeter of the cross-sections of tooth 50 along planes A-A, B-B, and C-C (see FIGS. 5B-5D) may be substantially the same, while its cross-sectional area in these planes may not be a constant (e.g., may vary). That is, while $(a_1+a_2+a_3+a_4) \approx (b_1+b_2+b_3+b_4) \approx (c_1+c_2+c_3+c_4)$, $S_A \neq S_B \neq S_C$. In electric machines of the current disclosure, regardless of the configuration of the electric machine (e.g., inner-rotor or outer-rotor), the perimeter of each tooth (in a cross-section perpendicular to the radial axis 90) may remain substantially a constant in the radial direction (e.g., along the radial axis 90) while its cross-sectional area may vary in this direction. In an embodiment where the rotor 40 is outside the stator 30 (FIGS. 2A-2B), the cross-sectional area of each tooth 50 may increase in the radially outward direction (see FIGS. 26B-26D), and in an embodiment where the rotor 40 is inside the stator 30 (FIG. 3A), the cross-sectional area of each tooth 50 may increase in the radially inward direction.

Figures 6A, 6B, 6C, 6D:
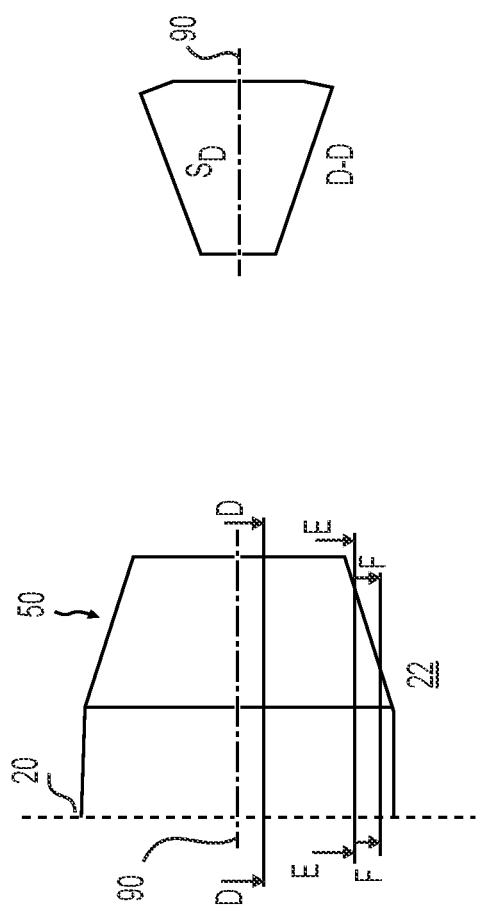
FIGS. 6A-6D illustrate cross-sectional views of an exemplary tooth in different planes consistent with some embodiments of the current disclosure.

FIGS. 6A-6D are cross-sectional views of tooth 50 along different planes. Like FIG. 5A, FIG. 6A illustrates the cross-sectional image of tooth 50 in the axial plane 22. FIGS. 6B-6D illustrate cross-sections of tooth 50 at different parallel radial planes 24 (D-D, E-E, and F-F) perpendicular to the axis of rotation 20 along the axial direction of tooth 50 (i.e., different parallel planes along the axis of rotation 20). FIG. 6B is the cross-sectional view of tooth 50 along plane D-D, FIG. 6C is the cross-sectional view of tooth 50 along plane E-E, and FIG. 6D is the cross-sectional view of tooth 50 along plane F-F. As illustrated in these figures, in the axial direction from the middle to the end of the tooth, the cross-sectional area of tooth 50 decreases. That is, $S_D > S_E > S_F$. In other words, the cross-sectional area of tooth 50 in a plane perpendicular to the radial axis 90 (or perpendicular to the radial direction) varies in the radial direction (see FIGS. 5B-5D), and the cross-sectional area of tooth 50 in a plane perpendicular to the axis of rotation 20 (or perpendicular to the axial direction or parallel to the radial direction or axis 90) varies in the axial direction (see FIGS. 6B-6D). In some embodiments of an electric machine with an outer rotor and inner stator (e.g., FIGS. 2A, 2B), the cross-sectional area of each tooth 50 increases in the radially outward direction (see FIGS. 5B-5D) and decreases in the axially outward direction (see FIGS. 6B-6D). Conversely, in some embodiments of an electric machine with an inner rotor and outer stator (e.g., FIG. 3A), the cross-sectional area of each tooth decreases in the radially outward direction and increases in the axially outward direction.

Figure 7A:
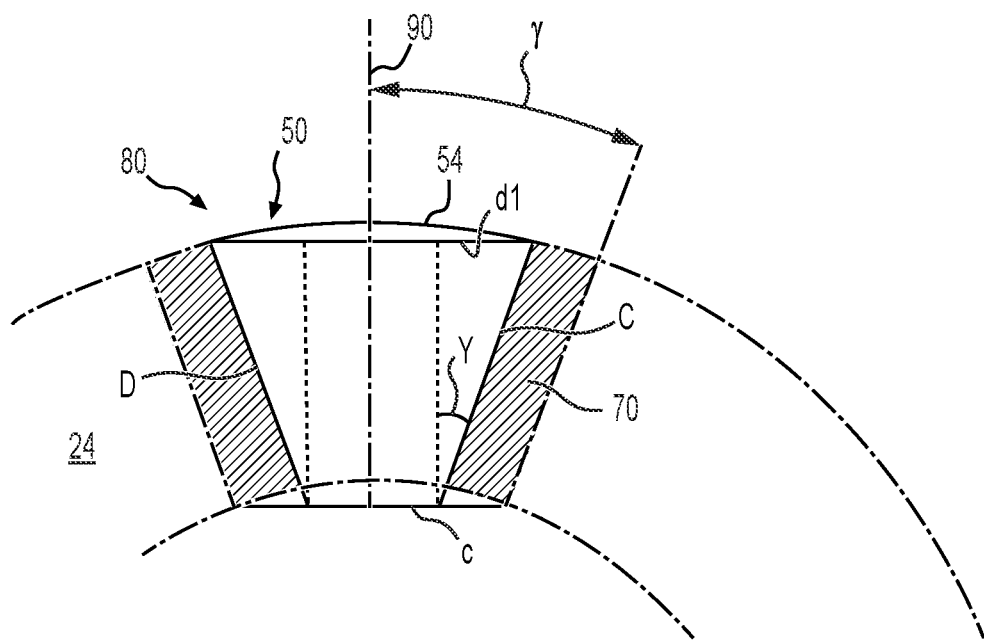
FIGS. 7A-7B illustrate various geometric features of an exemplary tooth consistent with some embodiments of the current disclosure.
Figure 7B:
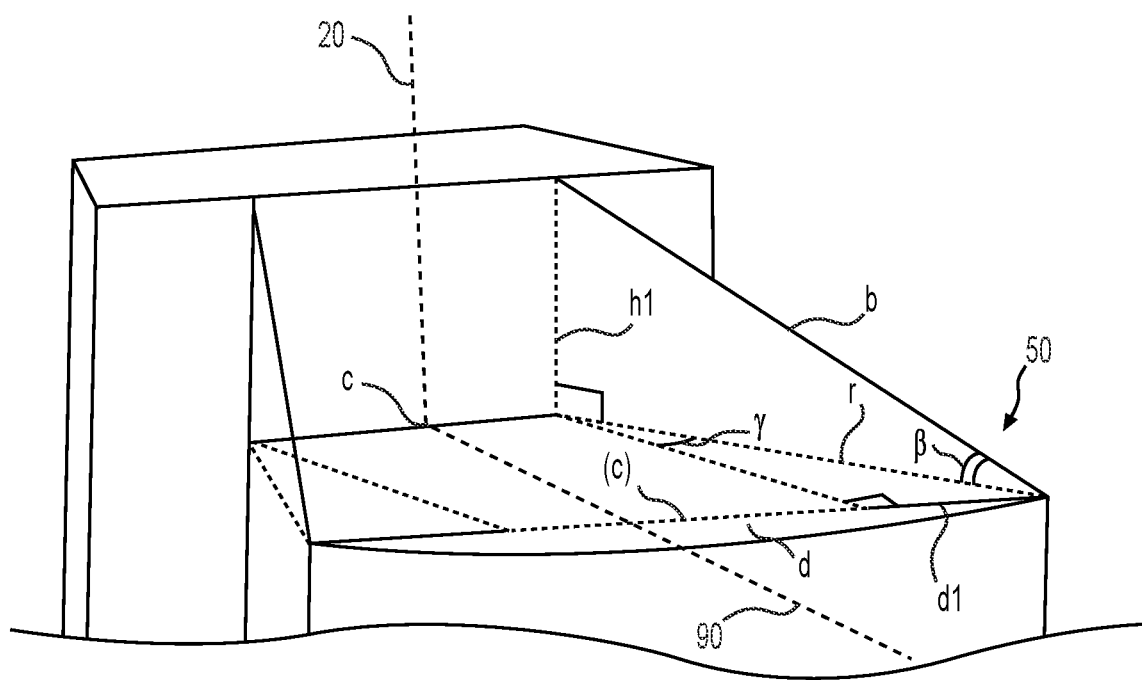

FIGS. 7A and 7B illustrate some geometrical details of an exemplary tooth 50 of FIG. 4A. FIG. 7A is a cross-sectional view of tooth 50 in the radial plane and FIG. 7B is a perspective view of tooth 50 (looking down on the tooth). As explained previously, each tooth 50 becomes wider (in the radial plane) as it extends radially outward along the radial axis 90 (see, e.g., FIGS. 4A, 4B). As shown in FIG. 7A, the opposite side surfaces C, D of tooth 50 forms an angle γ with the radial axis 90. The value of angle γ may depend on the number of teeth 50 in the electric machine. In general, angle 2γ (which is the angle between the opposite side surfaces C, D of tooth 50) may be equal to about 360 degrees divided by the number of teeth 50. That is, 2γ≈360°/n, where n is the number of teeth. For example, for an electric machine 10 with nine teeth 50 (see FIG. 2B), angle 2γ ~360/9=40°. Thus, each side surface C, D of tooth 50 may be inclined by about 200 (γ≈20°) from the radial axis 90. As explained with reference to FIGS. 2A and 2B, air gap 80 that exists between stator 30 and the rotor 40 is formed between the radially outermost end of each tooth 50 and rotor 40 (e.g., the permanent magnet segments 60 of rotor 40). In general, coil 70 may be mounted on each tooth 50 such the radially outermost end of coil 70 is positioned as close as possible to the radially outermost end of tooth 50 (and air gap 80) without protruding into air gap 80. In some embodiments, at its radially outermost end, tooth 50 may include a pole piece (not shown). Typically, the radial distance between the radially outermost end of coil 70 and the radially outermost end of tooth 50 (shown to be coincident in FIG. 7A) may be less than or equal to about 20% of the thickness of air gap 80. In some embodiments, as shown in FIG. 7A, the radially outermost end of tooth 50 may be rounded or curved such that all the teeth 50 together form a substantially circular profile. With reference to FIG. 7B, the front and back surfaces of tooth 50 may make an angle R in the axial plane 22 of the tooth 120. Angle R may also depend on the number of teeth in the electric machine. A tooth 50 having a substantially constant perimeter in the radial direction along the radial axis 90 may lead to the following correlations (see FIG. 7B): $h_1 = d_1$; $d_1 = r*Sin(γ)$; $h_1 = r*Tan(β)$; $r*Sin(γ) = r*Tan(β)$; $Sin(γ) = Tan(β)$; $= Arctan(Sin(γ))$, or $β = 1/Tan(Sin(γ))$.

With reference to FIGS. 2A and 2B, when electric power is provided to the coils 70 of stator 30, a magnetic field is generated. Based on the generated magnetic field, magnetic flux flows between the rotor 40 and the stator 30, thereby providing a rotary force to the rotor 40 to turn (or rotate) the shaft 16 coupled thereto. Electric machine 10 may be used as a power source in any application, for example, in an electric vehicle, electric machine 10 may drive the wheels of the electric vehicle.

As explained previously, an electromagnetic coil 70 may be mounted on each multi-part tooth 50 of electric machines 10, 10A, 10B, and 10C. Conventionally, the electrical conductor (e.g., a copper wire, copper foil) used to form coil 70 is wound around a tooth snugly to mount the coil on the tooth. However, winding a wire around a tooth is labor-intensive and time consuming. One approach that may be used to increase efficiency and save time during the assembly process is to place pre-wound or prefabricated coils around each tooth of the electric machine. Pre-wound coils may be prepared by winding a copper wire around a removable coil-form (e.g., a die) that has a shape similar to that of the tooth that the coil will be mounted on, removing the coil-form from the wound coil, and inserting the pre-wound coil on the tooth (e.g., like a ring on a finger). To ensure a tight or snug fit of the coil around the tooth, the cavity of the pre-wound coil may have substantially the same shape and size as that of the tooth. Since the teeth of the electric machines of the current disclosure have a trapezoidal cross-sectional shape that is non-uniform in the radial direction (a non-uniform trapezoidal cavity), inserting a pre-wound coil on a tooth in the conventional manner may not provide a snug fit of the coil along the entire radial distance of the tooth.

Therefore, in various embodiments of the current disclosure, each tooth may be formed of multiple parts that, when assembled together correspond to the shape of the non-uniform trapezoidal cavity of a coil 70. In other words, each tooth may be a multi-part tooth. In general, each part of a multi-part tooth may have any size and shape. The multi-part tooth may be formed of any number of parts and these multiple parts may be assembled together in any manner. For example, in some embodiments, the multiple parts may be assembled together and glued or attached together. In some embodiments, the multiple parts may be loosely or tightly placed together without attaching them together. In the discussion below, each part of a multi-part tooth may be referred to as a tooth.

Consistent with some disclosed embodiments, an electric machine includes a plurality of coils, wherein each coil of the plurality of coils defines a coil opening. As explained previously, an electromagnetic coil (which may be simply referred to herein as a "coil") refers to one or more turns of an electrical conductor (e.g., wire, multiple strands of wire twisted together, strip, foil, or another configuration of an electrical conductor). The one or more turns generates a magnetic field when an electric current is passed through the conductor (e.g., in electric motors), or generates a voltage across the conductor when a magnetic field passes over the coil. The term "coil opening" refers to an opening in the coil. For example, the coil may include a winding of the electrical conductor that extends around the coil opening (or cavity) of the coil. The coil opening may extend from a first end at one end of the coil to a second end at an opposite end of the coil and may be open at both its first and second ends.

Figure 8:
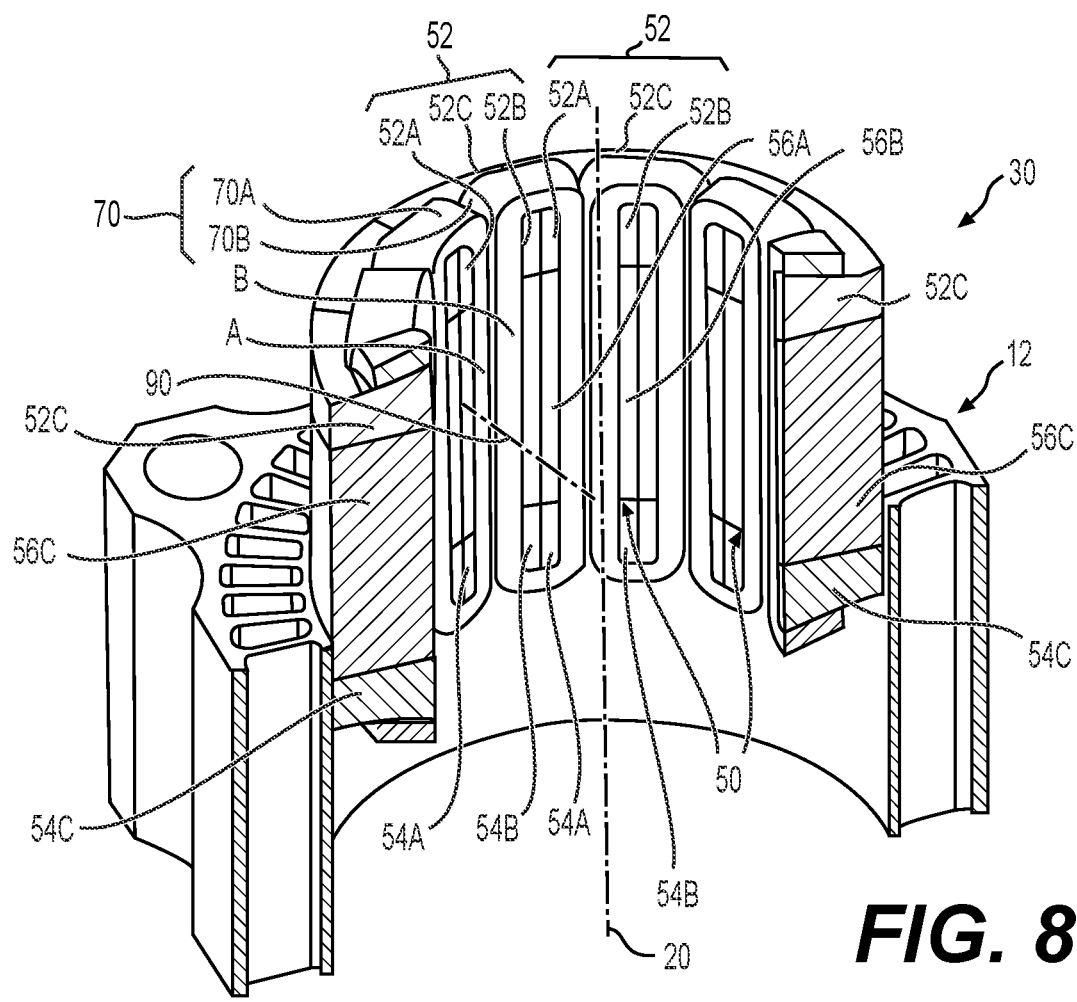
FIG. 8 illustrates an exemplary stator of an electric machine consistent with some embodiments of the current disclosure.
Figure 9A:
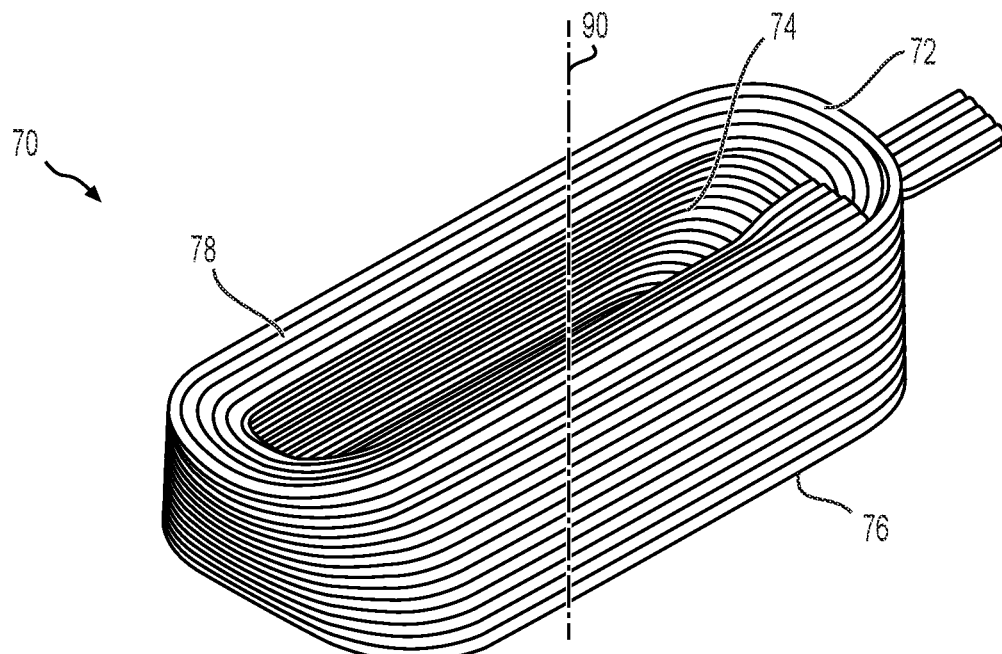
FIGS. 9A-9C illustrate different views of an exemplary electromagnetic coil of an electric machine consistent with some embodiments of the current disclosure.
Figure 9B:
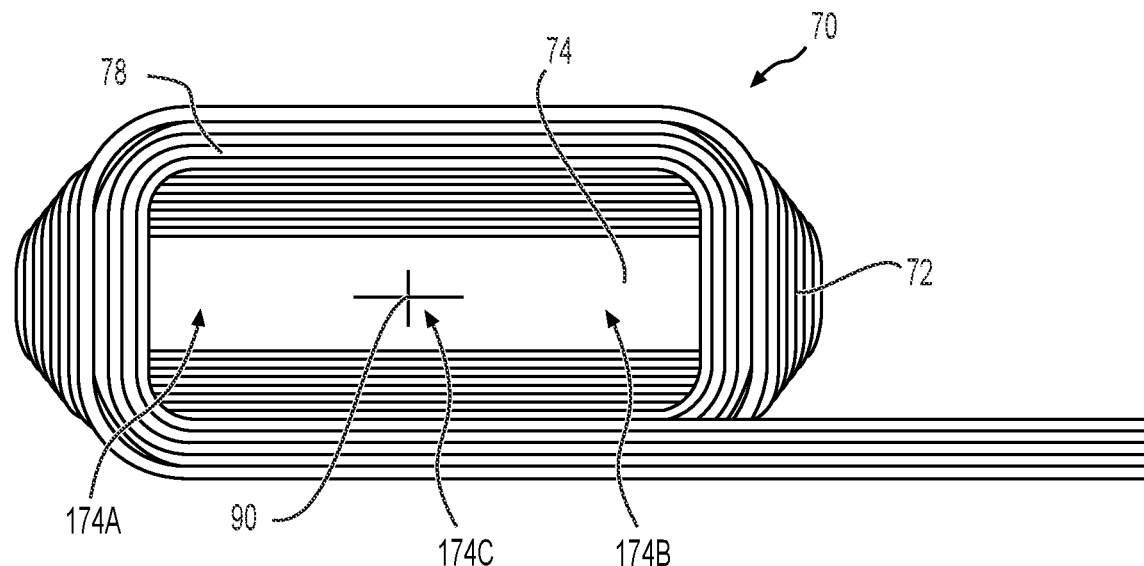
Figure 9C:
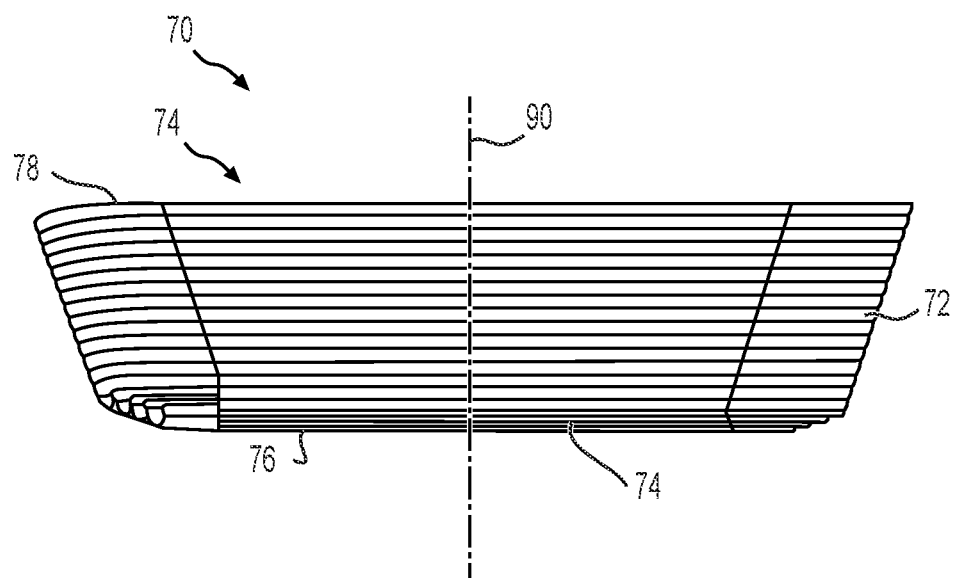

As explained with reference to FIGS. 2A and 2B, an exemplary electric machine 10 of the current disclosure includes a plurality of coils 70. FIG. 8 illustrates a sectional view of a portion of an exemplary inner-rotor electric machine 10D with its stator 30 partially removed (e.g., pulled out in the axial direction along the axis of rotation 20) from housing 12 to show a plurality of coils 70 on the stator 30. Note that the rotor which will be positioned radially inwards of the cylindrical stator 30 is not shown in FIG. 8. Each coil 70 may be mounted on a multi-part tooth 50 of stator 30. As explained previously, each multi-part tooth 50 of electric machine 10A may be formed of multiple parts that, when assembled together, form tooth 50 upon which a coil 70 is mounted. FIGS. 9A to 9C illustrate different views of an exemplary coil 70 separated from the tooth of stator 30. Coil 70 may include a winding of a copper wire 72 (or another electrical conductor) that extends from a first end 76 to a second end 78 around a coil opening 74 (or cavity). In some embodiments, wire 72 may have one of a square, rectangular, or circular cross-sectional shape. In some embodiments, coil 70 may include a winding of a copper stranded wire 72 in a spiral configuration around opening 74. In some embodiments, coil 70 may include a winding of a copper foil around opening 74. When coil 70 is mounted on a tooth (see, e.g., FIG. 2A, 2B), the coil opening 74 extends along the radial axis 90 with the first end 76 positioned closer to the axis of rotation 20 and the second end 78 positioned further away from the axis of rotation 20. Coil opening 74 may generally have the same shape as tooth 50. The size of opening 74 may also be substantially the same as the size of tooth 50. In some embodiments, coil opening 74 may be sized slightly smaller than tooth 50 such that, when installed on tooth 50, the wires 72 that form coil 70 stretches or expands to snugly receive the tooth in coil opening 74. In some embodiments, similar to the shape of tooth 50 (described previously, e.g., with reference to FIGS. 4-7B), the opening 74 may have a trapezoidal 3-dimensional shape with a rectangular cross-sectional area in planes perpendicular to an axis (e.g., radial axis 90 when assembled on tooth 50) that extends between the first and second ends 76, 78 of coil 70.

Consistent with some disclosed embodiments, an electric machine includes a plurality of U-shaped clips. As used herein, the term "clip" simply refers to a component, a part, or a piece that to at least some extent facilitates a function of holding, joining, and/or securing. Although not a requirement, in some embodiments, the clip may have a role (e.g., a minimal role, a small role, a substantial role, a significant role, etc.) in holding one or more objects together. For example, in some embodiments, the clip may have a role in holding together one or more coils of the plurality of coils of the electric machine. In some embodiments, the clip may have no role in holding together the coils or any other component of the electric machine. Instead, the clip may just be a part of the electric machine. A clip may also be referred to as a spacer in the description below. As used herein, a "U-shaped" clip indicates that at least some portions of the clip (e.g., the whole clip or one or more portions of the clip) resembles the capital letter U (e.g., has an opening between two joined sides). For example, when specific geometric details of the clip are ignored, the shape or configuration of one or more portions of the clip may generally resemble a U-shape. In some embodiments of a U-shaped clip, the entire clip may generally have a U-shape (e.g., see FIG. 11E, 12B-12D). And in some embodiments, of a U-shaped clip, the clip may have multiple generally U-shaped regions (see, e.g., FIGS. 11A-11C). In some embodiments, these U-shaped clips may form at least a portion of a multi-part tooth of an electric machine. For example, in some embodiments, multiple U-shaped clips may collectively form a multi-part tooth, and in some embodiments, one or more U-shaped clips may collectively form a multi-part tooth along with other parts or components (e.g., non U-shaped clips, such as, see FIG. 11D, 12A).

Figure 10B:
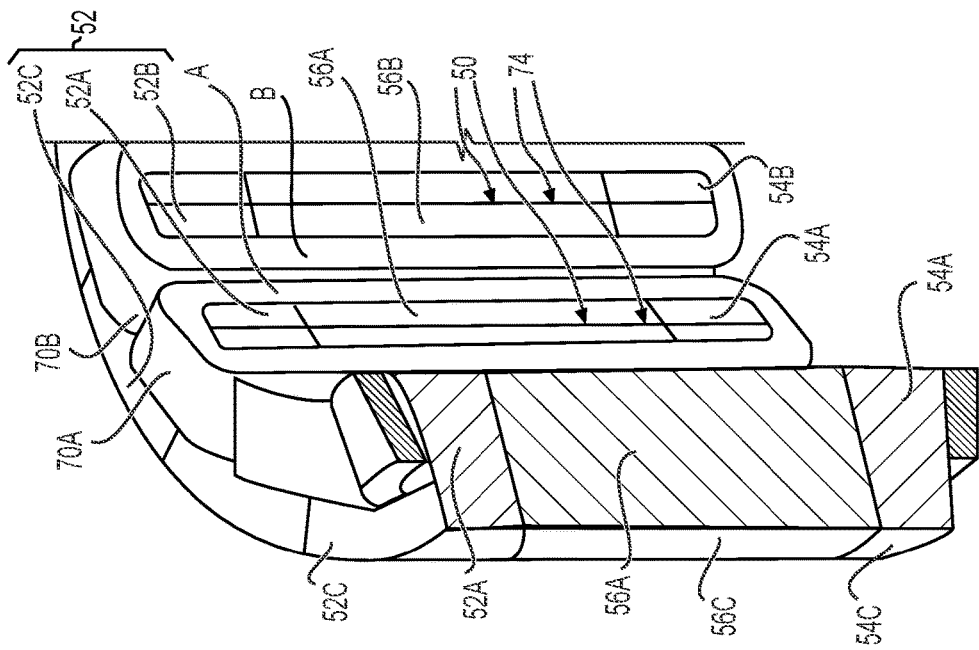
FIGS. 10A-10B are perspective illustrations of an exemplary multipart tooth of an electric machine consistent with some embodiments of the current disclosure.
Figure 10A:
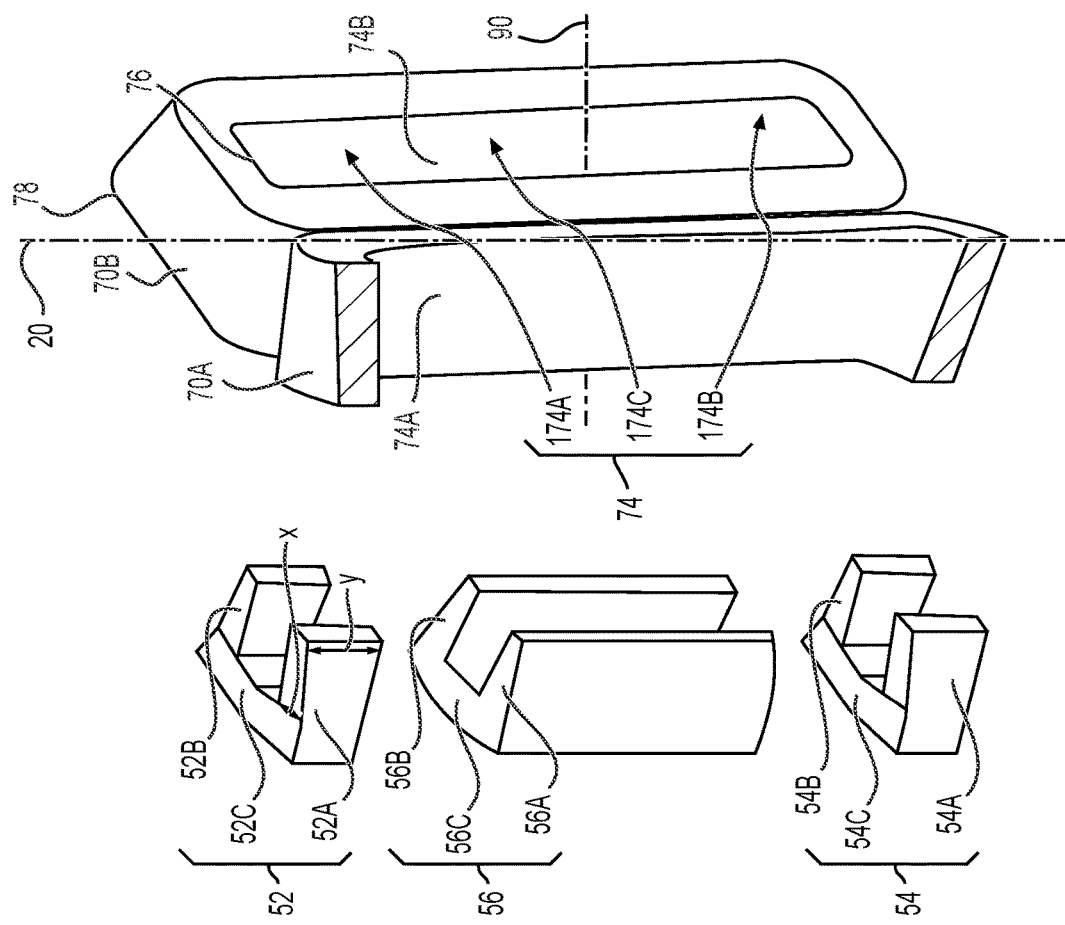

For example, in the exemplary electric machine 10D of FIG. 8, each multi-part tooth 50 is formed by tooth-portions of a plurality of U-shaped clips. The plurality of U-shaped clips in the embodiment of FIG. 8 includes multiple sets of a first U-shaped clip 52, a second U-shaped clip 54, and a third U-shaped clip. The first and second U-shaped clips are disposed on opposite sides (e.g., top and bottom) of the third U-shaped clip 56. For the sake of brevity, the U-shaped clips will simply be referred to as clips (e.g., first clip 52, second clip 54, and third clip 56). As will be explained in more detail below, these clips include one or more teeth (e.g., one tooth or multiple teeth) that may be positioned inside the coil opening 74 of coils 70 to collectively fill the coil openings and form a multi-part tooth 50. In some embodiments, only a portion of each coil opening 74 may be filled with the teeth of the U-shaped clips. The remaining portion of each coil opening may be filled with teeth of other parts (e.g., parts other than U-shaped clips). That is, in such embodiments, one or more teeth of the U-shaped clips and one or more teeth of these other parts collectively fill a coil opening and form a multi-part tooth 50. FIG. 10A illustrates an enlarged view of one set of first, second, and third clips 52, 54, 56 positioned near two adjacent coils 70A, 70B. Note that only a portion of coil 70A is shown in FIG. 10A. Although not a requirement, in some embodiments, as illustrated in FIG. 10A, the first and third clips 52, 54 may be substantially similar in shape and size. It is also contemplated that, in some embodiments, the first, second, and third clips 52, 54, 56 may be substantially similar in size and shape.

Figure 11F:
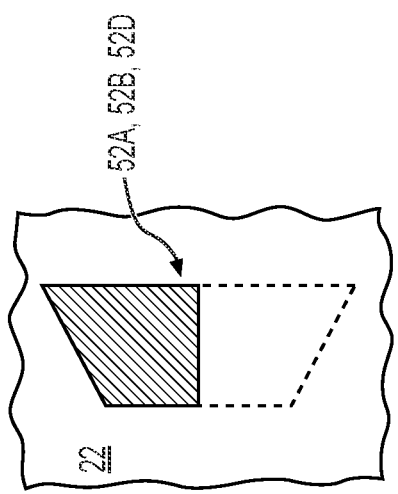
Figure 11E:
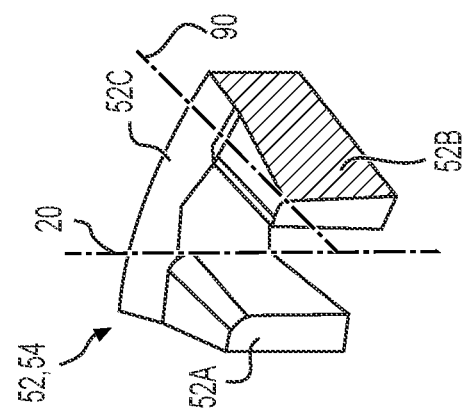
Figure 11D:
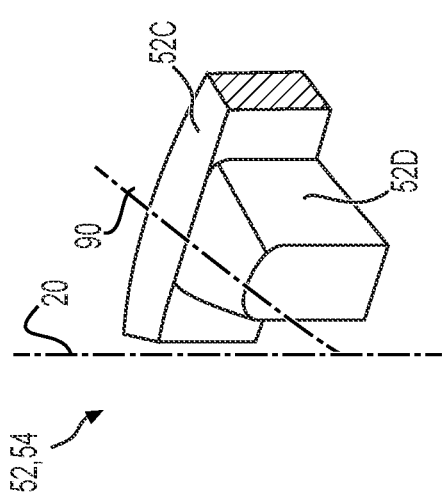

As explained above, the configuration of first, second, and third clips 52, 54, 56 illustrated in FIG. 10A is only exemplary, and the clips of the current disclosure may have many different configurations. For the sake of brevity, only the configuration of first clip 52 is discussed below. This discussion is also equally applicable to second clip 54. FIGS. 11A-11E illustrate some exemplary first clips 52 that may be used in electric machines of the current disclosure. For example, as illustrated in FIG. 11A, in some embodiments, first clip 52 may resemble a ring with multiple teeth 52D radially extending therefrom. When assembled on stator 30 (as illustrated in FIG. 8), the ring-shaped portion of the clip may extend around the axis of rotation 20 as illustrated in FIG. 11A. The ring-shaped portion of clip 52 may be cut at any location to form other embodiments of the clip. For example, FIGS. 11B-11E illustrate embodiments where the ring-shaped portion is cut at different locations to form an arc-shaped yokes 52C with teeth extending radially therefrom. In the embodiment of FIG. 11C, the ring-shaped portion (of FIG. 11A) is cut into two equal halves such that the arc-shaped yoke 52C is in the shape of a half-circle. In the embodiment of FIG. 11D, the ring-shaped portion (of FIG. 11A) is cut into multiple sections such that the arc-shaped yoke 52C has one tooth 52D extending centrally therefrom. In the embodiment of FIG. 11E, the ring-shaped portion (of FIG. 11A) is cut into sections through the centers of two adjacent teeth 52D such that the arc-shaped yoke 52C has two teeth (e.g., a first tooth 52A and a second tooth 52B) radially extending from the opposite ends of yoke 52C. As evident from FIGS. 11A-11E, the first and second clips 52, 54 of the current disclosure may include an arc-shaped yoke with any number of teeth extending radially (e.g., along radial axis 90) therefrom. In each embodiment (e.g., illustrated in FIGS. 11A-11E), as schematically illustrated in FIG. 11F, the shape of the cross-section of a tooth in the axial plane 22 is a half-trapezoid. In the embodiments of FIGS. 11A-11D, the shape of the cross-section of a tooth in the radial plane (perpendicular to the axis of rotation 20) is a trapezoid. And, in the embodiment of FIG. 11E, the cross-sectional shape of a tooth in the radial plane is a half-trapezoid. As explained previously, in some embodiments, the first and second clips 52, 54 may be substantially similar. For example, both first and second clips 52, 54 may have the same configuration (e.g., similar to one of FIGS. 11A-11E). However, this is not a requirement, and in some embodiments, first and second clips 52, 54 may have different configurations. For example, first clip 52 may have a configuration similar to one FIGS. 11A-11E and second clip 54 may have a configuration similar to another one FIGS. 11A-11E. In some embodiments, as illustrated in FIGS. 8, 10A, and 10B, both first and second clips 52, 54 may be used. In some embodiments, only one of first clip 52 or second clip 54 may be used (e.g., one of first clip 52 or second clip 54 may be eliminated).

Figure 12A:
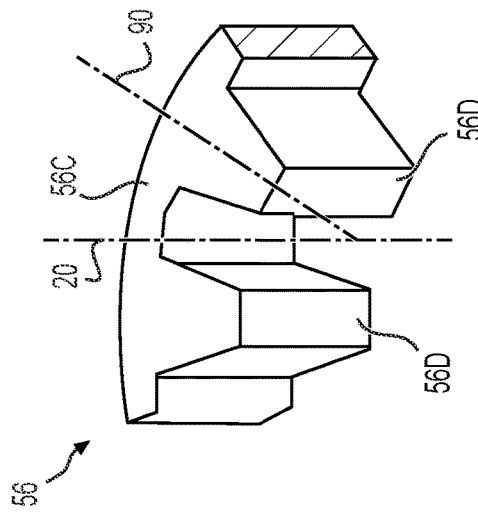
FIGS. 12A-12D are illustrations of other exemplary portions of a multi-part tooth arrangement consistent with some embodiments of the current disclosure.
Figure 12C:
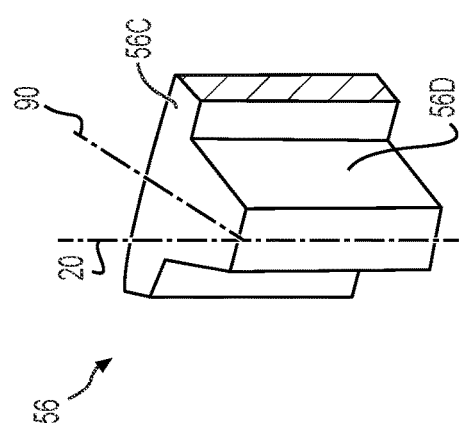
Figure 12B:
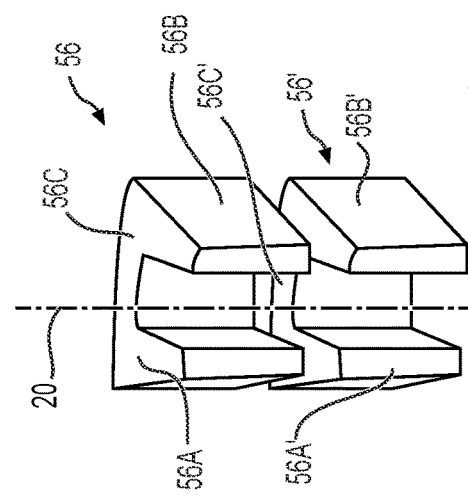
Figure 12D:
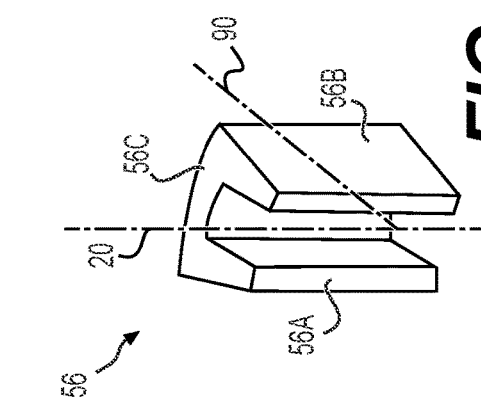

FIGS. 12A-12D illustrate some exemplary third clip 56 that may be used in electric machines of the current disclosure. In some embodiments, as illustrated in FIGS. 8, 10A, and 10B, third clip 56 may be positioned (or sandwiched) between first and second clips 52, 54 in the axial direction (e.g., along the axis of rotation 20). In some embodiments, a single third clip 56 may be positioned between the first and second clips 52, 54 (as shown in FIGS. 8, 10A, and 10B). In some embodiments, multiple third clips (e.g., 56, 56', etc.) may be positioned between the first and second clips 52, 54. As illustrated in the embodiments of FIGS. 12A-12D, in general, third clip 56 may include an arc-shaped yoke 56C with one or more teeth extending radially (e.g., along radial axis 90) therefrom. For example, as illustrated in FIG. 12A, third part 56 may include an arc-shaped yoke 56C with a single tooth 56D centrally positioned on the yoke 56C and extending radially therefrom. In some embodiments, as illustrated in FIG. 12B, the arc-shaped yoke 56C may be a section of a ring-like component with multiple teeth 56D radially extending therefrom. Although a yoke 56C with two teeth 56D is illustrated in FIG. 12B, this is only exemplary. In general, any number (3, 4, or any other integer) of equally spaced apart teeth 56D may extend radially from the yoke 56C to form a third clip 56. In some embodiments, the third clip of FIG. 12C may be cut through the center of two adjacent teeth 56D to form third clip 56 illustrated in FIG. 12C. Third clip 56 of FIG. 12C includes an arc-shaped yoke 56C with two teeth (e.g., a first tooth 56A and a second tooth 56B) extending radially therefrom. In some embodiments, as illustrated in FIG. 12D, any two (or more) similarly configured third clips 56, 56' may be stacked one atop another and positioned between the first and second clips 52, 54. Although two third clips having the configuration illustrated in FIG. 12C is shown stacked in FIG. 12D, this is only exemplary. Any third clip 56 (e.g., any one of the clips illustrated in FIGS. 12A-12C) may be stacked, and any number of such clips may be stacked.

Consistent with some disclosed embodiments, each U-shaped clip includes a first tooth, a second tooth, and a yoke interconnecting the first tooth and the second tooth. As explained previously, as used herein, a "tooth" simply refers to a projection or a protrusion. In a radial flux electric machine, this projection or protrusion may project or extend in the radial direction toward or away from the axis of rotation of the machine. A first tooth may refer to one tooth and a second tooth may refer to another tooth (different from the first tooth). The first and second teeth may have any shape and size. Although not a requirement, in some embodiments, the first tooth and the second tooth of the same clip may have the same shape and/or size. As used herein, a "yoke" refers to a part, portion, or component that couples two or more parts together. Thus, a yoke that interconnects two objects may be any part that connects (joins, couples, or attaches together) the two objects. The yoke may have any shape and size. In some embodiments, the yoke may be curved. In some embodiments, the yoke may have an arc-like shape. In other words, in some embodiments, the shape of the yoke (in the radial plane) may resemble a portion of the boundary of a circle.

With reference to the exemplary embodiments of U-shaped clips illustrated in FIG. 10A, first clip 52, second clip 54, and third clip 56 each includes two teeth interconnected by a yoke. For example, first clip 52 includes a first tooth 52A and a second tooth 52B interconnected by a yoke 52C. Similarly, second clip 54 includes a first tooth 54A and a second tooth 54B interconnected by a yoke 54C, and third clip 56 includes a first tooth 56A and a second tooth 56B interconnected by a yoke 56C. The exemplary embodiments of first and second clips 52, 54 illustrated in FIGS. 11A-11C and 11E also include multiple teeth interconnected by an arc-shaped yoke 52C. Similarly, the exemplary embodiments of third clips 56 illustrated in FIGS. 12B-12D also include multiple teeth interconnected by an arc-shaped yoke 56C.

Consistent with some disclosed embodiments, the first tooth of each U-shaped clip is disposed in one coil opening of the plurality of coils, and the second tooth of each U-shaped clip is disposed in another coil opening of an adjacent coil, with the yoke bridging two adjacent coils. As used herein, the terms "disposed in" refers to being at least partially positioned in or located in. For example, an object disposed in an opening may indicate that the object is at least partially positioned in (or located in) the opening. And the term "bridging" refers to at least partially extending between. For example, as used herein, a part bridging two adjacent objects may indicate that the part at least partially extends between (or spans) the two adjacent objects. For example, with reference to FIGS. 8, 10A, and 10B, when the clips 52, 54, and 56 are assembled together to form a multi-part tooth 50 (see FIG. 8), first tooth 52A of first clip 52 may be disposed in opening 74A of coil 70A when its second tooth 52B is disposed in opening 74B of coil 70B positioned adjacent to coil 70A. Similarly, first tooth 54A of second clip 54 may be disposed in coil opening 74A when its second tooth 54B is disposed in coil opening 74B, and first tooth 56A of third clip 56 may be disposed in coil opening 74A and its second tooth 56B disposed in coil opening 74B. When the first and second teeth of the clips 52, 54, and 56 are thus positioned in the coil openings 74A, 74B of adjacent coils 70A, 70B, the arc-shaped yokes 52C, 54C, and 56C of these clips 52, 54, and 56 may bridge the adjacent coils 70A, 70B (see FIG. 8). In the exemplary embodiments of first and second clips 52, 54 illustrated in FIGS. 11A-11C and 11E, when any two adjacent teeth 52D (or teeth 52A and 52B of FIG. 11E) of these clips are disposed in the coil openings of two adjacent coils, the arc-shaped yoke 52C between the two teeth 52D may bridge the two adjacent coils. Similarly, in the exemplary embodiment of the third clip 56 illustrated in FIGS. 12B-12D, when any two adjacent teeth 56D of these clips are disposed in the openings of adjacent coils, the arc-shaped yoke 56C between the adjacent teeth may bridge the two adjacent coils.

Consistent with some disclosed embodiments, two sidewalls of the two adjacent coils are sandwiched between the first tooth and the second tooth of each U-shaped clip. A "sidewall" refers to a surface, boundary, or face located on a side of something, in this instance, a side of a coil. For example, for an object having a closed shape (e.g., a cylinder, an oval, ellipse, square, rectangular, triangular, or any other shape where the sides meet to enclose a space), each side of the object may be a sidewall. The term "sandwiched" refers to being positioned or disposed at least partly between at least two things, in this instance, at least partly between two teeth. In some embodiments, when a first object is sandwiched between two objects, the first object may be squeezed or pressed between the two objects. For example, with reference to FIGS. 8, 10A, and 10B, when first tooth 52A of first clip 52 is positioned in coil opening 74A (of coil 70A) and its second tooth 52B is positioned in coil opening 74B (of adjacent coil 70B), the two sidewalls of the adjacent coils 70A and 70B (marked A and B in FIGS. 8 and 10B) which are positioned between first and second teeth 52A and 52B are sandwiched between these two teeth. Similarly, when first tooth 54A and second tooth 54B of second clip 54 are positioned in coil openings 74A and 74B respectively, the two sidewalls A and B of adjacent coils 70A and 70B are sandwiched between the two teeth 74A, 74B. And, when first tooth 56A and second tooth 56B of third clip 56 are positioned in coil openings 74A and 74B respectively, the sidewalls of adjacent coils 70A and 70B are sandwiched between teeth 76A, 76B. Meanwhile, as seen in FIG. 10B, the multiple teeth (e.g., 52A, 52B, 54A, 54B, 56A, 56B) disposed in each coil opening 74 collectively forms a multi-part tooth 50 that fills the opening 74. In some embodiments, the teeth may be sized such that the combined size of the teeth (e.g., the size of the multi-part tooth 50 formed by the multiple teeth) is slightly larger than the size of the opening 74. In such embodiments, the wires of the coil 70 may stretch to expand the opening 74 and receive the multiple pieces therein.

As explained previously, the teeth used to form a multi-part tooth 50 in some embodiments of electric machines may have differing configurations. FIGS. 13A and 13B illustrate an embodiment where a multi-part tooth 50 is formed using first and second clips 52, 54 having a configuration illustrated in FIG. 11B with a third clip 56 having a configuration illustrated in FIG. 12C. In this embodiment, as in the embodiment of FIGS. 10A and 10B, when one tooth of each clip 52, 54, 56 is disposed in a coil opening 74 of one coil 70 and another tooth of the same clip 52, 54, 56 is disposed in the coil opening 74 of an adjacent coil 70, the yoke of each clip bridges the two adjacent coils, and two sidewalls of the adjacent coils are sandwiched by the two teeth of each clip. Meanwhile, the multiple teeth in the coil openings 74 fills the coil opening 74 and collectively form a multi-part tooth 50. For example, two adjacent teeth 52D of the semi-circular first clip 52 are positioned in coil openings 74 of two adjacent coils such that the arc-shaped yoke 52C between the two adjacent teeth 52D (that interconnect the two teeth 52D) bridges the two adjacent coils 70 and the two teeth 52D sandwich the sidewalls of the two adjacent coils located between them. The teeth 54D of the similarly shaped second clip 54 are disposed in the adjacent coil openings 74 in a similar manner to sandwich the sidewalls of the two adjacent coils. As described with reference to FIGS. 10A and 10B, the two teeth 56A and 56B of each third clip 56 are also disposed in the coil openings 74 of adjacent coils 70 such that the two teeth 56A, 56B sandwich the sidewalls of the two adjacent coils while its yoke 56C bridges the two adjacent coils.

FIGS. 14A and 14B illustrate an embodiment where a multi-part tooth 50 is formed using first and second clips 52, 54 having a configuration illustrated in FIG. 11B with a third clip 56 having a configuration illustrated in FIG. 12A. In this embodiment, as described with reference to FIGS. 13A and 13B, when one tooth 52D of first clip 52 is disposed in a coil opening 74 of one coil 70 and another tooth 52D of the same first clip 52 is disposed in the coil opening 74 of an adjacent coil 70, the yoke 52C that interconnects the two teeth 52D bridges the two adjacent coils 70. And while in this configuration, two sidewalls of the adjacent coils 70 are sandwiched by the two teeth 52D of first clip 52. Similarly, when one tooth 54D of a second clip 54 is disposed in a coil opening 74 of one coil 70 and another tooth 54D of the same second clip 54 is disposed in the coil opening 74 of an adjacent coil 70, the yoke 54C of that second clip 54 bridges the two adjacent coils 70, and two sidewalls of the adjacent coils 70 are sandwiched by the two teeth 54D.

Figure 15A:
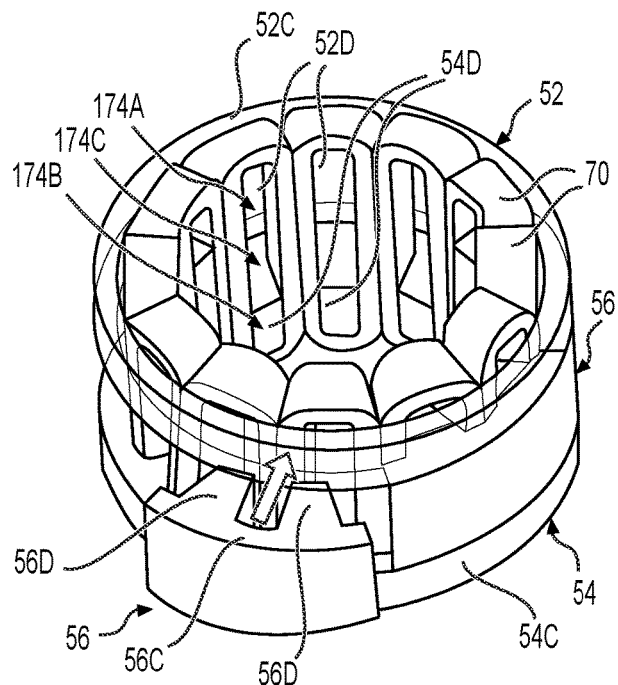
FIGS. 15A-15C are schematic illustrations of further exemplary multipart tooth arrangements of an electric machine consistent with some embodiments of the current disclosure.
Figure 15B:
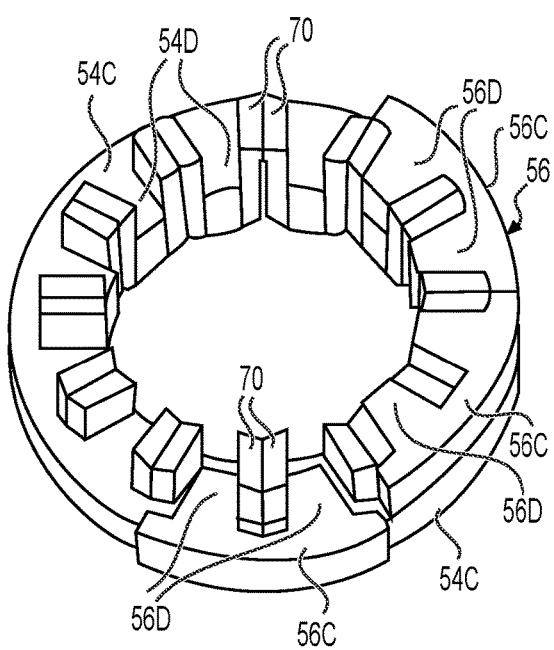
Figure 15C:
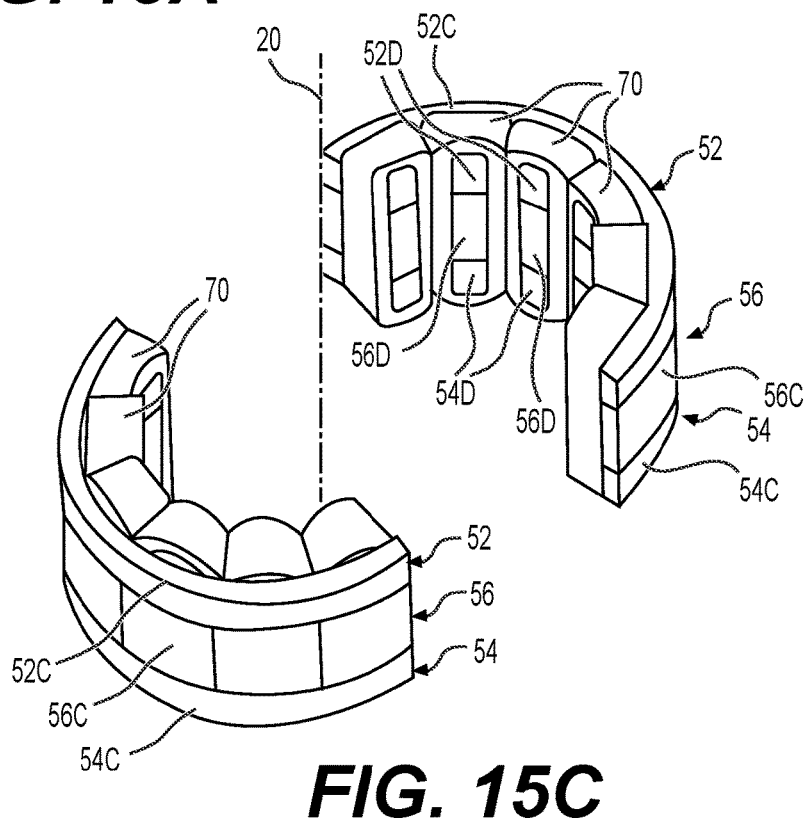

FIGS. 15A-15C illustrate an embodiment where a multi-part tooth 50 is formed using first and second clips 52, 54 having a configuration illustrated in FIG. 11B with a third clip 56 having a configuration illustrated in FIG. 12B. In this embodiment also, as described with reference to FIGS. 13A and 13B, when one tooth 52D, 54D of each clip 52, 54 is disposed in a coil opening 74 of one coil 70 and another tooth of the same clip 52, 54 is disposed in the coil opening 74 of an adjacent coil 70, the yoke 52C, 54C of that clip 52, 54 bridges the two adjacent coils 70, and two sidewalls of the adjacent coils 70 are sandwiched by the two teeth 52D, 54D of that clip 52, 54. Furthermore, in this embodiment, when one tooth 56D of third clip 56 is disposed in a coil opening 74 of one coil 70 and its other tooth 56D is disposed in the coil opening 74 of an adjacent coil 70, the yoke 56C of clip 56 bridges the two adjacent coils 70 and two sidewalls of these coils 70 are sandwiched by the two teeth 56D. In some embodiments, an electric machine includes a stator positioned radially outwards of a rotor, and the plurality of U-shaped clips form a part of the stator. As explained previously, in some embodiments, the disclosed electric machine may be an inner-rotor electric machine where the rotor is positioned radially inwards of the stator. For example, FIG. 8 illustrates an exemplary inner-rotor electric machine where a rotor 40 (not shown in FIG. 8) is positioned radially inwards of the stator 30. As illustrated in FIGS. 8 and 10A-10B, the teeth of first clip 52, second clip 54, and third clip 56 form each multi-part tooth 50 of stator 30.

In some disclosed embodiments, each coil opening includes multiple teeth arranged along a length of the opening. A tooth is arranged along a length of an opening when at least a portion of the tooth extends at least partially along a height of an opening. By way of a non-limiting example, a single tooth may extend the full height of a coil opening. In some embodiments, the plurality of coils 70 may be symmetrically arranged along the axis of rotation 20 such that a length dimension of the coil openings 74 extend along the axis of rotation 20 (see, e.g., FIGS. 8, 13B, 14A, 14B, and 15A-15C). In some embodiments, multiple teeth may be arranged along the length of each coil opening (see, e.g., FIGS. 8, 10B, 13B, 14A, and 15C. For example, in the embodiment of electric machines illustrated in FIGS. 8 and 10B, teeth 52A, 56A, and 54A (or teeth 52B, 56B, 54B) are arranged along the length of each coil opening 74. And in the embodiment of FIGS. 13B, teeth 52D, 56A (or 56B), and 54D extend along the length of each coil opening 74. Similarly, in the embodiments of FIGS. 14A and 15C, teeth 52D, 56D, and 54D are arranged along the length of the opening. In some embodiments, these multiple teeth may fill an entire length of the opening 74 of each coil such that facing sidewalls of the teeth and the coil in opening 74 engage with each other at least along a portion of the length of the opening 74.

In some disclosed embodiments, one or more teeth of the multiple teeth fills an entire width of each opening. Filling an entire width of an opening refers to a situation where a tooth extends between opposing sidewalls of a coil opening, such that the width dimension of the tooth substantially corresponds to the width dimension of the coil. As explained previously, the coils 70 may be arranged about the axis of rotation 20 such that the length dimension of each coil opening 74 extends along the axis of rotation 20. When thus arranged, the width dimension of each coil opening 74 may extend perpendicular to its length dimension. In some embodiments of electric machines, one or more teeth of the multiple teeth, that are arranged along the length of each opening 74, may fill an entire width of opening 74 at least along a portion of the length of the one or more teeth. As used herein, when a tooth (e.g., tooth A) fills an entire width of opening 74, the facing sidewalls of tooth A and coil 70 inside opening 74 may engage with each other at least along a portion of the length of tooth A. It should be noted that, in some embodiments, wires 72 (see, e.g., FIGS. 9A-9C) that form coils 70 may be coated with thin layer of a nonconductive insulating material (e.g., plastic, enamel, or another nonconductive material) to prevent current from passing between wire turns. Therefore, when the facing sidewalls of a coil and a tooth engages with each other they may not make direct physical contact with each other. Instead, they may indirectly contact via the insulating material. In the embodiments of FIGS. 8 and 10B, teeth 52A and 52B may jointly fill an entire width of each opening 74 at one end of the opening, teeth 54A and 54B may fill an entire width of each opening 74 at the opposite end of the opening, and teeth 56A and 56B may fill an entire width of each opening between the two opposite ends. Similarly, in the embodiment of FIG. 13B, a single tooth 52D may fill an entire width of the coil opening at one end, tooth 54D may fill an entire width of the opening at the opposite end, and teeth 56A and 56B together may fill an entire width of the opening in a region between its opposite ends. And in the embodiments of FIGS. 14A and 15C, tooth 52D may fill an entire width of each opening 74 at one end, tooth 54D may fill an entire width of the opening at its opposite end, tooth 56D may fill an entire width of the opening in a region between the two ends.

In some disclosed embodiments, a single tooth of the multiple teeth fills an entire width of each opening. Multiple teeth filling an entire width of an opening refers to a situation where more than one tooth "cooperate" to fill the width of the coil opening. For example, the collective widths of two teeth in a coil opening may substantially match the width of the coil opening. As explained above, in some embodiments of the disclosed electric machines, a single tooth fills an entire width of a coil opening. For example, in the embodiment of FIG. 13B, a single tooth 52D may fill an entire width of the coil opening at one end of the opening and a single tooth 54D may fill an entire width of the opening at the opposite end of the opening. Similarly, in the embodiments of FIGS. 14A and 15C, a single tooth 52D may fill an entire width of an opening 74 at one end of the opening, a single tooth 54D may fill an entire width of the opening at its opposite end, tooth 56D may fill an entire width of the opening in a region between the two opposite ends.

In some disclosed embodiments, the multiple teeth includes at least an upper tooth, a lower tooth, and a middle tooth, and at least one of the upper tooth or the lower tooth fills an entire width of each opening and includes an arc-shaped yoke with a plurality of teeth extending therefrom. The terms "upper," "lower," and "middle" indicate relative positions with reference to the orientation (of the electric machine) being displayed or viewed. In any orientation, an "upper" tooth may be any tooth positioned above a "middle" tooth; and a "lower" tooth may be any tooth positioned below the middle tooth. For example, in FIG. 8, teeth 52A and 52B may be upper teeth, teeth 56A and 56B may be middle teeth, and teeth 54A and 54B may be lower teeth. When the orientation is flipped (or rotated by 180°), the selection may reverse. For example, in the flipped orientation of FIG. 8 (e.g., when the papers is rotated by 180°), teeth 54A and 54B may be the upper teeth and teeth 52A and 52B may be the lower teeth. The term "arc" refers to a curve having a constant or a variable radius. Thus, an "arc-shaped" yoke may refer to a yoke that is similarly curved in shape. In some embodiments, the arc or curve may follow a chord of a circle. Thus, in some embodiments, an arc-shaped yoke may be shaped like the chord of a circle (e.g., may be curved with a constant radius). In each of the exemplary embodiments of electric machines illustrated in FIGS. 13B, FIGS. 14A, and 15C, the multiple teeth in each coil opening 74 includes at least an upper tooth (52D), a lower tooth (54D), and a middle tooth (56A and 56B in FIGS. 13B and 56D in FIGS. 14A and 15C). And, in each of these embodiments, both the upper tooth 52D and the lower tooth 54D fills an entire width of opening 74 and includes an arc-shaped yoke 52C, 54C (see, e.g., FIG. 11B) with a plurality of teeth 52D extending from the yoke. In some embodiments, these teeth 54D may extend radially along the radial axis 90 of the electric machine.

Consistent with some disclosed embodiments, each coil opening contains at least one first tooth of a first group of the plurality of U-shaped clips and at least one first tooth of a second group of the plurality of U-shaped clips, and wherein the first group differs from the second group. A tooth from each of two differing groups may be located in each opening. For example, in the exemplary embodiments of electric machine illustrated in FIGS. 8 and 10B, each coil opening 74 contains first teeth 52A, 54A, 56A of first clip 52, second clip 54, and third clip 56, respectively. Among these clips, third clips 56 may form a first group of clips, and the first and second clips 52, 54 may form a second group of clips. As explained previously, the first and third clips 52, 54 may be similar in shape and size and may be interchangeable. As evident from, for example, FIGS. 10A, 11E and 12C, the first clips 52 and second clips 54 are different from the third clips 56. In some embodiments, the at least one first tooth of the first group has a length greater than a length of the at least one first tooth of the second group. For example, in the exemplary embodiment of FIGS. 8 and 10B, first tooth 56A of third clip 56 has a greater length than first tooth 52A of first clip 52 and first tooth 54A of second clip 54 (see, e.g., FIGS. 10A, 10B, 11E and 12C). In some embodiments, at least two first tooths in the second group have a common length. As explained above, in the embodiments of FIGS. 8 and 10B, first clips 52 and second clips 52, 54 may form the second group of clips. As also explained above, teeth 52A of first clips 52 and teeth 54A of second clips 54 may be similar in shape and size and may be interchangeable. Thus, teeth 52A and 54A may have a common length. (See, e.g., FIG. 10A). In some embodiments, a plurality of first tooths and a plurality of second tooths are disposed in each coil opening, and wherein at least one pair of a particular first tooth and a particular second tooth have a length greater than a length of other first tooths and second tooths disposed in each coil opening. For example, as explained above, in the embodiment of FIGS. 8 and 10A-10B, multiple first tooths (e.g., first tooth 52A, 54A, 56A) and multiple second tooths (e.g., 52B, 54B, and 56B) are disposed in each coil opening 74. And, as also explained above, the first tooth 56A and second tooth 56B in an opening 74 have a length greater than that of the other first and second tooths in that opening.

Consistent with some disclosed embodiments, a group of the plurality of U-shaped clips have first tooths disposed in the coil opening of one of the plurality of coils, and at least one U-shaped clip in the group has a first tooth that is wedge-shaped. "Wedge-shaped" refers to a shape having a broader end and a narrower end. For example, one end of a wedge-shaped part may be wider than the opposite end and the part may taper from the wider end to the narrower end. In the exemplary embodiment illustrated in, for example, FIGS. 10A and 10B, a group of U-shaped clips including first clip 52, second clip 54, and third clip 56 have their first teeth disposed in coil opening 74 of coil 70. For example, first tooth 52A of first clip 52, first tooth 54A of second clip 54, and first tooth 56A of third clip 56 are disposed in coil opening 74. And, as best seen in FIG. 10A, each first tooth 52A, 54A, and 56A is wedge-shaped. For example, each tooth has a width "x" (e.g., a dimension that extends perpendicular to radial axis 90 in the radial plane) that tapers from a broader end to a narrower end along radial axis 90. In some embodiments, the at least one U-shaped clip in the group has a second tooth that is wedge-shaped. As can also be seen in FIG. 10A, the second tooth 52B of first clip 52, second tooth 54B of second clip 54, and second tooth 56B of third clip 56 are also wedge-shaped. In some embodiments, the first tooth and second tooth of the same clip may have a similar shape (e.g., first tooth 52A may have a similar shape as second tooth 52B, first tooth 56A may have a similar shape as second tooth 56B, etc.). In some embodiments, the first tooth and second tooth of the same clip may be mirror symmetric about an axial plane that passes centrally through the yoke which interconnects the first and second tooth. In some embodiments, each wedge-shaped first tooth has a length dimension that varies from one end of the coil opening towards an opposite end of the coil opening. The length dimension of a clip may refer to the dimension of the clip in the axial plane that extends parallel to an axis of rotation. As explained previously with reference to FIG. 10A, the first tooth 52A, 54A, and 56A of first, second, and third clips 56 are wedge-shaped. As can also be seen in FIG. 10A, in addition to the varying width "x" of first tooth 52A (e.g., the wedge shape), the length "y" of first tooth 52A of first clip 52 (and first tooth 54A of second clip 54) also varies along the radial axis 90 from second end 78 of coil opening 74 to its first end 76.

Consistent with some embodiments, the at least one U-shaped clip in the group is made of an SMC material. Soft Magnetic Composites (SMCs) are a class of magnetic materials that consist of finely powdered magnetic particles embedded in a non-magnetic or insulating binder material. Any suitable SMC may be used. In general, SMC parts may be made from bonded iron powders coated with an insulating layer and pressed into a solid material using a die before final heat treatment to cure the bond. For example, parts made of ferromagnetic powder may be coated with a uniform layer of an electrical insulating film and pressed to form the part. In various embodiments of the current disclosure, the SMC may include one or more isotropic ferromagnetic materials, having a magnetic saturation induction of at least 1.6 Tesla, and an electrical resistivity over 10 micro-ohm/m. With reference to FIG. 10A, in some embodiments, one or more of first clip 52, second clip 54, and third clip 56 (disposed in each coil opening 74) may be made of an SMC. In some embodiments, all of the U-shaped clips in the group are made of an SMC material. For example, each of the first, second, and third clips 52, 54, and 56 (disposed in each coil opening 74) may be made of SMC. In some embodiments, all of the U-shaped clips in the group are made of laminated steel. Laminated steel, also known as "composite steel" or "layered steel," is a type of material that consists of multiple layers of steel bonded or otherwise connected together. For example, one or more (e.g., all) of the clips 52, 54, and 56 (e.g., of FIG. 10A) may be made of steel laminations or other suitable materials.

As explained previously, electric machines of the current disclosure may include a plurality of U-shaped clips with each clip having a first tooth and a second tooth interconnected by a yoke. In some embodiments, the plurality of yokes cooperate to form a ring. As used herein, a "ring" is a substantially circular shape. For example, an arrangement of one or more parts or things in a substantially circular shape. As used herein, the term "cooperate" means works jointly. For example, the yokes jointly or collectively form a substantially circular shape. In embodiments of the current disclosure, the yokes 52C, 54C, and 56C of each of the first, second, and third clips 52, 54, 56 cooperate to form a ring. In some embodiments, the plurality of yokes cooperate to form a first ring and a second ring. For example, in the embodiment of FIGS. 8 and 10B, when first tooth 52A and second tooth 52B of first clips 52 are positioned in coil opening 74 of each coil 70, the yokes 52C of adjacent first clips 52 cooperate to form a ring (see, e.g., FIGS. 8, 10B). Similarly, when first tooth 54A and second tooth 54B of second clips 54 are positioned in each coil opening 74, yokes 54C of adjacent second clips 54 also cooperate to form another ring (see, e.g., FIG. 8). Additionally, when first tooth 56A and second tooth 56B of third clips 56 are positioned in each coil opening 74, the yokes 56C also cooperate to form yet another ring. In some embodiments, the yokes of a group from the plurality of U-shaped clips are interconnected. In the embodiments illustrated in FIGS. 13A-15C, after assembly, the yokes 52C of the first clips 52 cooperate to form one ring, and the yokes 54C of the second clips 54 cooperate to form another ring (see, FIGS. 13A-15C). In these embodiments, the first and second clips 52, 54 have a configuration as illustrated in FIG. 11B. In first clip 52 and second clip 54 illustrated in FIG. 11B, multiple U-shaped clips are interconnected by a common yoke.

In some embodiments, a plurality of standalone U-shaped clips are disposed between the first ring and the second ring. As used herein, a "standalone" U-shaped clip refers to a clip that is able to be used alone or separately. For example, a U-shaped clip that is not connected to anything else such as, for example, other U-shaped clips, may be referred to as a standalone U-shaped clip. As explained previously, the term "U-shaped" clip indicates that at least some portions of the clip (e.g., the whole clip or one or more portions of the clip)

resembles the capital letter U. A standalone U-shaped clip may be a clip where the entire part may generally have a U-shape. Some embodiments of a standalone U-shaped clip are illustrated in 11E, 12B-12D. It should be noted that these illustrations of standalone U-shaped clips are merely exemplary, and many other configurations are contemplated. In some embodiments of the current disclosure, a plurality of standalone U-shaped third clips 56 are disposed between the two rings collectively formed by the yokes 52C of first clips 52 and the yokes 54C of the second clips 54 (see, e.g., FIGS. 8, 10A-10B, and 13A-13B).

In some embodiments, the opening 74 of each coil 70 may include (or be filled with) a plurality of toothed spacers that collectively form a multi-part tooth 50 (see, e.g., FIG. 2C). Consistent with some disclosed embodiments, an electric machine includes a plurality of coils, wherein each coil defines a coil opening. As described an exemplified previously, an electromagnetic coil (referred to herein as a "coil") may include one or more turns of an electrical conductor (e.g., wire, multiple strands of wire twisted together, strip, foil, or another configuration of an electrical conductor) that defines a "coil opening" and which may extend from one end of the coil to an opposite end of the coil. For example, FIGS. 9A to 9C illustrate different views of an exemplary coil 70 formed by a winding of a copper wire 72 that extends from a first end 76 to a second end 78 around a coil opening 74 (or cavity). In general, coils 70 may be associated with the rotor 40 or the stator 30 of an electric machine. However, in the current description, the coils 70 may be described as being associated with the stator 30. As best seen in FIG. 2B, the electric machine may include a plurality of coils 70. These coils may be symmetrically arranged about the axis of rotation 20 such that opening 74 of each coil extends along the radial axis 90 of the machine. A multi-part tooth 50 may be disposed in each coil opening 74. As explained previously, the coil opening 74 may generally have the same shape (e.g., trapezoidal 3-dimensional shape) and size as tooth 50.

In some embodiments, each coil opening includes a first section, a second section, and an intermediate section between the first section and the second section. As used herein, a "section" refers to a portion or a region of the coil opening. There need not be any perceivable boundary between sections. For example, an intermediate section may refer to an area of the opening between to other areas that bound it. As an example, a round hole may be divided into four sections with each section representing a different quadrant of the hole. In this example, the round hole may also be divided into two sections with the portion below an imaginary diameter line representing one section (e.g., a lower section) and the portion above the imaginary diameter line representing another section (e.g., an upper section). It should be noted that since the line separating the different regions is imaginary, there may be no physical demarcations or boundaries between the different regions. Thus, as used herein, first section, second section, and intermediate section refer to three different regions into which each coil opening may be arbitrarily divided with the first and second sections positioned on opposite sides of the intermediate section. For example, as illustrated in FIG. 9B, coil opening 74 may include a first region 174A, a second region 174B, and an intermediate region 174C positioned between the first and second regions. When the coils 70 are symmetrically arranged about the axis or rotation 20 (see FIG. 10A), the first region 174A may represent a portion of the opening 74 near its top end, the second region 174B may represent a portion of the opening 74 near its bottom end, and the intermediate region 174C may represent a portion of the opening 74 between its top and bottom ends. As explained above, since a virtual line demarcates the first, second, and intermediate regions 174A, 174B, 173C of the opening 74, there are no physical boundaries between these different regions.

Consistent with some embodiments, an electric machine includes at least one first yoke, at least one second yoke, and at least one intermediate yoke between the at least one first yoke and the at least one second yoke. As explained previously, a "yoke" refers to a part, portion, or component that couples two or more parts together, regardless of shape. In other words, the term yoke does not imply any requirements on the shape, structure, or configuration of the part. Unless a particular shape is expressly specified, a yoke may have any shape and configuration (linear, curved, or other shape). First yoke, second yoke, and intermediate yoke refer to three distinct yokes with the intermediate yoke positioned between the first and second yokes. These three yokes may each have any shape (e.g., same, or different shapes). For example, as explained previously with reference to FIG. 10A, first clip 52, second clip 54, and third clip 56 each includes a yoke. For example, first clip 52 includes a yoke 52C, second clip 54 includes a yoke 54C, and third clip 56 includes a yoke 56C. In embodiments of electric machines where third yoke 56C is positioned between yokes 52C and 54C (see, e.g., FIGS. 10A-10B), yoke 56C may be referred to as intermediate yoke. When these spacers or clips (52, 54, 56) are assembled in an electric machine (see, e.g., FIG. 10B), the yokes 52C, 54C, 56C of each of these clips cooperate to (or collectively) form a ring around the axis of rotation 20. The exemplary embodiments of spacers or clips 52, 54 illustrated in FIGS. 11A-11C and 11E also include a yoke 52C and the exemplary embodiments of spacers or clips 56 illustrated in FIGS. 12B-12D include a yoke 56C. In each of these embodiments, the yokes (e.g., yokes 52C, 54C, 56C) are curved and arc-shaped. As previously explained, in an arc-shaped yoke, the yoke may be shaped like the chord of a circle (e.g., it may be curved with a constant radius). In embodiments of electric machines where yoke 56C is positioned between yokes 52C and 54C (see, e.g., FIGS. 13A-15C), yoke 56C may be referred to as an intermediate yoke with one of yokes 52C or 54C the first yoke and the other the second yoke. When these spacers or clips 52, 54, 56 are assembled in an electric machine (see, e.g., FIGS. 13A-15C), the yokes of each clip cooperate to form a ring extending around the axis of rotation 20.

Some disclosed embodiments include a plurality of first wedge-shaped teeth integrally formed with and extending from the at least one first yoke; a plurality of second wedge-shaped teeth integrally formed with and extending from the at least one second yoke; and a plurality of intermediate wedge-shaped teeth integrally formed with and extending from the at least one intermediate yoke. The terms "teeth" (and its singular "tooth") and "wedge-shaped" may be interpreted as described and exemplified previously. For example, teeth (and tooth) may include any projections or protrusions, and wedge-shaped refers to a shape having a broader end and a narrower end. Thus, a wedge-shaped tooth (or teeth) may refer to a projection that is wider at one end than its opposite end. For example, a wedge-shaped tooth may taper from a wider end to a narrower end. In some exemplary embodiments (e.g., in a radial flux electric machine), a tooth may be a projection that protrudes along the radial axis of the machine (e.g., towards or away from the axis of rotation). For example, in the exemplary outer-rotor electric machine 10 of FIG. 2A, the teeth 50 projects from the stator 30 towards the rotor 40 in a radial direction away from the axis of rotation 20, and in the exemplary inner-rotor electric machine 10A of FIG. 2C, the teeth 50 projects from the stator 30 towards the rotor 40 in a radial direction towards the axis of rotation 20. Thus, in such embodiments, a wedge-shaped tooth may be a projection that is wider at one of its ends along the radial axis and narrower at its other end along the radial axis. The term "integrally formed" refers to being connected together so as to make up a single complete piece or unit. Integral formation may occur when portions are made from the same piece of material, are made from differing pieces of material bonded together, or are otherwise joined together to establish a connection intended to be permanent. For example, an integrally formed part may be incapable of being easily dismantled into sub-parts without destroying the integrity of the part. An integrally formed part may also work together as a single complete piece or unit.

With reference to the exemplary embodiments illustrated in FIG. 10A, yoke 52C (of first clip 52) includes a plurality (or a pair) teeth (e.g., first tooth 52A and a second tooth 52B), yoke 54C (of second clip 54) includes a plurality of teeth (e.g., first tooth 54A and a second tooth 54B), and yoke 56C (of third clip 56) includes a plurality of teeth (e.g., first tooth 56A and a second tooth 56B). Similarly, in the exemplary embodiments illustrated in FIGS. 11A-11C and 11E, yoke 52C includes a plurality of teeth, and in the exemplary embodiments illustrated in FIGS. 12B-12D, yoke 56C includes a plurality of teeth. In each of these embodiments, the plurality of teeth are integrally formed with the yoke and extend from the yoke along the radial axis 90 towards the axis of rotation 20. Moreover, each tooth (52A, 52B, 52D, 54A, 54B, 54D, 56A, 56B, 56D) in these embodiments is wedge-shaped. For example, one end of the tooth along the radial axis 90 is wider than its opposite end (see, e.g., FIGS. 10A-10B, 11A-11E, 12A-12D). In some embodiments, the at least one first yoke, the at least one second yoke, and the at least one intermediate yoke are arc-shaped. As explained previously, an arc-shaped has a curved shape, such as in the shape of a chord of a circle (e.g., curved with a constant radius). As illustrated in FIGS. 11A-11E, the first and second yokes 52C, 54C of the first and second clips 52, 54 are arc-shaped in some embodiments. Similarly, in some embodiments, as illustrated in FIGS. 12A-12D, the intermediate yoke 56C of the third clip 56 is also arc-shaped. In some embodiments, the at least one intermediate yoke includes two stacked intermediate yokes. Stacked refers to one adjacent (e.g., on top of) another. In some embodiments, a third clip having the configuration illustrated, for example, in FIG. 12D may be used to form the multi-part teeth 50. In such embodiments of electric machines, the intermediate yoke may include two intermediate yokes 56C, 56C' stacked one on top of the other. Consistent with some embodiments, the plurality of first wedge-shaped teeth and the plurality of second wedge-shaped teeth share a common size and shape. Teeth that share a common size and shape have substantially the same contour. In some embodiments, the first clip 52 may have the same size and shape, and may be interchangeable with, the second clip 54 (see, e.g., FIGS. 11A-11E). In such embodiments, the teeth of these clips 52, 54 may also have the same size and shape.

In some disclosed embodiments, each of the plurality of first wedge-shaped teeth extend into a differing one of the plurality of coil openings in the first section thereof. Extending into differing openings refers to a situation where each of the first wedge-shaped teeth are located in its own opening, and particularly in this example, the same section (first section) of the differing openings. For example, with reference to FIGS. 10A and 10B, when the spacers or first clips 52 are assembled with the plurality of coils 70, first tooth 52A of each first clip 52 extends into first section 174A of coil opening 74 of coil 70A and second tooth 52B of that first clip 52 extends into first section 174A of coil opening 74 of the adjacent coil 70B. Similarly, with reference to FIGS. 13A and 13B, when the half-ring shaped first clip 52 (of FIG. 11C) is assembled into coils 70, each tooth 52D of the first clip extends into the first section 174A of a different one of the plurality of coil openings 74. Similarly, with reference to FIGS. 15A-15C, when first clip 52 (of FIG. 11B) is assembled into coils 70, each tooth 52D of the first clip extends into the first section 174A of a different one of the plurality of openings 74 of coil 70. In some embodiments, each of the plurality of second wedge-shaped teeth extend into a differing one of the plurality of coil openings in the second section thereof. Similar to the explanation provided above, extending into differing openings in this context refers to a situation where each of the second wedge-shaped teeth are located in its own opening, and particularly in this example, the same section (second section) of the differing openings. For example, with reference to FIGS. 10A and 10B, when the spacers or second clips 54 are assembled with the plurality of coils 70, first tooth 54A of each second clip 54 extends into second section 174B of coil opening 74 of coil 70A and second tooth 54B of that second clip 54 extends into second section 174B of coil opening 74 of the adjacent coil 70B. Similarly, with reference to FIGS. 13A and 13B, when the half-ring shaped second clip 54 (of FIG. 11C) is assembled into coils 70, each tooth 52D of the second clip extends into the second section 174B of a different one of the plurality of coil openings 74. Similarly, with reference to FIGS. 15A-15C, when second clip 52 (of FIG. 11B) is assembled into coils 70, each tooth 52D of the second clip extends into the second section 174B of a different one of the plurality of openings 74 of coil 70. In some embodiments, the plurality of intermediate wedge-shaped teeth extend into a differing one of the plurality of coil openings in the intermediate section thereof. Like the prior explanations extending into differing openings in this context refers to a situation where each of the intermediate wedge-shaped teeth are located in its own opening, and particularly in this example, the same section (intermediate section) of the differing openings. For example, with reference to FIGS. 10A and 10B, when the spacers or the intermediate third clips 56 are assembled with the plurality of coils 70, first tooth 56A of each third clip 56 extends into intermediate section 174C of coil opening 74 of coil 70A and second tooth 56B of that third clip 56 extends into intermediate section 174C of coil opening 74 of the adjacent coil 70B. Similarly, with reference to FIGS. 13A and 13B, when the intermediate third clip 56 is assembled into coils 70, first tooth 56A and second tooth 56B of the third clip extends into the intermediate section 174C of a different one of the plurality of coil openings 74. Similarly, with reference to FIGS. 15A-15C, when the intermediate third clip 56 (of FIG. 12B) is assembled into coils 70, each tooth 56D of the intermediate clip extends into the intermediate section 174C of a different one of the plurality of openings 74 of coil 70.

Consistent with some disclosed embodiments, a pair of intermediate wedge-shaped teeth are disposed in each coil opening. A pair of intermediate wedged-shaped teeth disposed in the same opening refers to a situation where two intermediate teeth occupy the intermediate section of a common coil opening. For example, as illustrated in the embodiments of FIGS. 8, 10B, and 13B, in some embodiments, a pair of intermediate wedge-shaped teeth 56A, 56B are disposed in opening 74 of each coil 70. In these exemplary embodiments, a first tooth 56A of a first third clip 56 extends into intermediate section 174C of opening 74 of coil 70A (see FIGS. 10A-10B) and second tooth 56B of that same third clip 56 extends into intermediate section 174C of opening 74 of the adjacent coil 70B. Meanwhile, a second tooth 56B of an adjacent third clip 56 (e.g., a third clip on the right side of the first third clip) extends into the intermediate section 174C of coil 70A to form a pair or intermediate wedge-shaped teeth with the first tooth 56A of the first third clip 56. And, a first tooth 56A of another adjacent third clip 56 (e.g., a third clip on the left side of the first third clip) extends into the intermediate section 174C of coil 70B to form a pair or intermediate wedge-shaped teeth with the second tooth 56B of the first third clip 56. In some embodiments, the pair of intermediate wedge-shaped teeth 56A, 56B in each coil opening 74 fills the entire width of the coil opening 74. In some embodiments, the combined width of the pair of intermediate wedge-shaped teeth 56A, 56B may be slightly greater than the corresponding width of the coil opening 74 such that the wires of the coil stretch (or are deformed) to slightly expand the coil opening and snugly receive the pair of teeth 56A, 56B. This phenomena is sometimes referred to as a friction fit.

In some embodiments, only one first wedge-shaped tooth and only one second wedge-shaped tooth are disposed in each coil opening. In this example, only two teeth are located in each coil opening. For example, as illustrated in the embodiment of FIGS. 13A and 13B, along with the pair of intermediate wedge-shaped teeth 56A, 56B in the intermediate section 174C of each coil opening, a single wedge-shaped tooth 52D of a first clip 52 and a single wedge-shaped tooth 54D of a second clip 54 are disposed in each coil opening 74. Specifically, first tooth 52D of first clip 52 is disposed in the first section 174A of the coil opening 74 on one side of the pair of intermediate wedge-shaped teeth 56A, 56B and second tooth 54D of second clip 54 is disposed in the second section 174B on the opposite side of the pair of intermediate teeth 56A, 56B. In some embodiments, a pair of first wedge-shaped teeth and a pair of second wedge-shaped tooth are disposed in each coil opening. For example, as illustrated in the embodiment of FIGS. 8, 10A, and 10B, along with the pair of intermediate wedge-shaped teeth 56A, 56B in the intermediate section 174C of each coil opening 74, a pair of first wedge-shaped teeth 52A, 52B are disposed in the first section 174A of coil opening 74 and a pair of second wedge-shaped teeth 54A, 54B are disposed in the second section 174A of each coil opening 74. In each of these embodiments, the multiple wedge-shaped teeth in each coil opening 74 may collectively form a multi-part tooth 50 having a non-uniform trapezoidal configuration as discussed previously (e.g., with reference to FIGS. 4-7B). In some embodiments, a single intermediate wedge-shaped tooth is disposed in each coil opening. In this example, only one intermediate wedge shaped tooth is located in each coil opening. As illustrated, for example, in the embodiment illustrated in FIGS. 15A-15C, in some embodiments, a single intermediate wedge-shaped tooth 56D is disposed in the intermediate section 174C of each coil opening 74. In such embodiments, the first and section sections 174A, 174B of the coil opening 74 may each include a single wedge-shaped tooth (see, e.g., FIGS. 15A-15C) or a pair of wedge-shaped teeth. For example, in embodiments of electric machines where the first and second clips 52, 54 have a configuration illustrated, for example, in FIG. 11E and the intermediate third clip 56 has a configuration illustrated, for example, in FIG. 12B, a multi-part tooth 50 will be formed in each coil opening 74 with a single intermediate wedge-shaped tooth 56D and a pair wedge-shaped teeth 52A, 52B on one side of the intermediate tooth 56D and another pair of wedge-shaped teeth 54A, 54B on the opposite side of the intermediate tooth 56D.

Consistent with some embodiments, the plurality of coils are symmetrically arranged about an axis of rotation of the electric machine, and the coil opening of each coil contains a tooth construction formed of a single first wedge-shaped tooth, a single second wedge-shaped tooth, and a pair of adjacently positioned intermediate wedge-shaped teeth. "Symmetrical" refers to a balanced or harmonious arranged (in this case coils) about an axis. For example, the coils may be made up of similar parts facing each other or around an axis. Each coil of the plurality of coils, for example, may have a similar configuration or shape and may be placed around the axis of rotation. For example, two symmetrical objects or symmetrical portions of an arc in which the objects are located may repeat or mirror each other. For example, as illustrated in FIG. 13B, in some embodiments, the plurality of coils 70 may be symmetrically arranged about the axis of rotation 20 such that the coil opening 74 of each coil 70 extends along the radial axis 90. A "tooth construction" refers to a tooth constructed, or made up of, multiple constituent parts. For example, coil opening 74 of each coil 70 may contain a multi-part tooth 50 formed of a single first wedge-shaped tooth 52D, a single second wedge-shaped tooth 54D, and a pair of adjacently positioned intermediate wedge-shaped teeth 56A, 56B. In some embodiments, the plurality of coils are symmetrically arranged about an axis of rotation of the electric machine, and the coil opening of each coil contains a tooth construction formed of a single first wedge-shaped tooth, a single second wedge-shaped tooth, and a single intermediate wedge-shaped tooth. For example, as illustrated in FIGS. 15A-15B, in some embodiments, each coil opening 74 of the plurality of coils 70 symmetrically arranged about the axis of rotation 20 may include multi-part tooth 50 formed of a single first wedge-shaped tooth 52D, a single second wedge-shaped tooth 54D, and single intermediate wedge-shaped teeth 56D.

In some embodiments, the intermediate wedge-shaped teeth have a wedge shape that differs from a wedge shape of at least some of the first wedge-shaped teeth and second wedge-shaped teeth. As described and exemplified previously, wedge-shaped refers to a shape having a broader end and a narrower end. The difference in wedge shapes (e.g., the difference between the wedge shapes of a first tooth and an intermediate tooth, and a second tooth and an intermediate tooth) may be of any type. For example, in some embodiments their configuration may be different (e.g., wedge shaped along one plane, wedge shaped along multiple planes, or another difference in shape), in some embodiments the width of the wider end and/or the narrower end of the wedge-shaped teeth may be different, in some embodiments the taper between the wider end and the narrower end may be different, etc. In some embodiments, the width of wider end and the narrower end, and the taper between the wider and the narrower end, may each be the same in the first, second, and the intermediate wedge-shaped teeth. In some embodiments, the intermediate wedge-shaped teeth are wedge-shaped in a first plane, and the first wedge-shaped teeth and the second wedge-shaped teeth are wedge-shaped in a second plane transverse to the first plane. In some embodiments, the first wedge-shaped teeth and the second wedge-shaped teeth are also wedge-shaped in the first plane. Consistent with some embodiments, the first plane is perpendicular to an axis of rotation of the electric machine. For example, each first and second wedge-shaped tooth may be wedge shaped in both the radial plane (e.g., plane perpendicular to the axis of rotation 20) and the axial plane (plane on which the axis of rotation 20 lies). For example, the wedge-shaped first tooth 52A, 52B, 52D of each of the exemplary first and second clips 52, 54 illustrated in, for example FIGS. 11A-11E are wedge shaped in both the radial and the axial planes. Specifically, in the radial plane, the width of tooth 52A, 52B, 52D decreases along the radial axis 90 towards the axis of rotation 20, and in the axial plane, the width of tooth 52A, 52B, 52D increases along the radial axis 90 towards the axis of rotation 20. Thus, each first wedge-shaped tooth of these exemplary first and second clips 52, 54 is wedge shaped or tapered on two mutually perpendicular planes (axial and radial planes). Meanwhile, each intermediate wedge-shaped tooth may be wedge shaped in only the radial plane and not in the axial plane in some embodiments. For example, the wedge-shaped intermediate tooth 56A, 56B, 56D of the exemplary third clips 56 illustrated in, for example FIGS. 12A-12D are wedge shaped in the radial plane and not wedge shaped in the axial plane. In other words, in the radial plane, the width of intermediate tooth 56A, 56B, 56D decreases along the radial axis 90 towards the axis of rotation 20, and in the axial plane, the width of intermediate tooth 56A, 56B, 56D is a constant along the radial axis 90.

Consistent with some embodiments, the at least one first yoke includes a plurality of first yokes, wherein a pair of first wedge-shaped teeth extend from each of the plurality of first yokes. For example, in the embodiment, illustrated in FIGS. 8, 10A, and 10B, a pair of first wedge-shaped teeth 52A, 52B extend from yoke 52C of each first clip 52 (see, e.g., FIG. 11E). When these wedge-shaped teeth 52A, 52B of the first clips 52 are positioned in the openings 74 of adjacent coils 70, the yokes 52C of the first clips 52 are arranged symmetrically about the axis of rotation 20 to form a first ring (see, e.g., FIG. 8) around the plurality of coils 70. In some embodiments, the at least one second yoke includes a plurality of second yokes, and wherein a pair of second wedge-shaped teeth extend from each of the plurality of second yokes. A pair of second wedge-shaped teeth 54A, 54B also extend from yoke 54C of each second clip 54 (see, e.g., FIG. 11E). When the wedge-shaped teeth 54A, 54B of the second clips 54 are positioned in the openings 74 of adjacent coils 70, the yokes 54C of the second clips 54 are also arranged symmetrically about the axis of rotation 20 to form a second ring around the plurality of coils 70 spaced apart from the first ring along the axis of rotation 20. Similarly, in the embodiments of FIGS. 13A-13B, 14A-14B, and 15A-15C also, a plurality of first yokes 52C and a plurality of second yokes 54C are symmetrically arranged about the axis of rotation 20 to form spaced apart rings, and at least one pair of wedge-shaped teeth extend from each of the yokes 52C, 54C (see, e.g., FIGS. 11B, 11C).

In some embodiments, the at least one first yoke, the at least one second yoke, and the at least one intermediate yoke are part of a stator of the electric machine. As explained previously, the disclosed multi-part teeth 50 (and the first, second, and third clips that form these teeth) may be part of the stator or the rotor of an electric machine. In the exemplary embodiments described herein, the multi-part teeth 50 are described as being a part of the stator of an electric machine. For example, FIG. 8 illustrates an exemplary stator 30 of an electric machine with multi-part teeth 50 disposed within the openings 74 of its coils 70. As can be seen in FIG. 8, a plurality of first yokes 52C, a plurality of second yokes 54C, and a plurality of intermediate yokes 56C are arranged about the axis of rotation 20. Each of these yokes 52C, 54C, and 56C collectively form axially spaced apart rings around the plurality of coils 70. Consistent with some embodiments, the electric machine further includes a rotor positioned radially inwards of the stator. Radial inward positioning refers to a location closer to the axis of rotation. For example, as illustrated in FIG. 2C, the electric machine also includes a rotor 40 positioned radially inwards of the stator 30. The rotor 40 rotates inside the stator 30 about the axis of rotation 20.

Consistent with some disclosed embodiments, the first, the second, and the intermediate wedge-shaped teeth in each coil opening collectively forms a multi-part tooth that extends in a radial direction of the electric machine. A radial direction refers to an orientation toward a central axis. As explained previously, the multi-part tooth in the coil opening of each coil is formed by wedge-shaped teeth of the first, second, and third (or intermediate) clips. For example, in the embodiment of FIGS. 8 and 10A-10B, the multi-part tooth 50 in each coil opening 74 is formed by putting together the first and second teeth 52A, 52B of the first clip 52, the first and second teeth 54A, 54B of the second clip 54, and the first and second teeth 56A, 56B of the third clip 56. Similarly, in the embodiment of FIGS. 12A-13B, the multi-part tooth 50 in each coil opening 74 is formed by teeth 52D and 54D of the first and second clips 52, 54 respectively, and the first and second tooth 56A, 56B of the third clip 56. And in the embodiment of FIGS. 15A-15C, the multi-part tooth 50 is formed by teeth 52D, 54D, and 56D of the first, second, and third clips, respectively. As can also be seen in the above-mentioned figures, each multi-part tooth 50 extends in the radial direction along the radial axis 90. In an inner-rotor electric machine (see, e.g., FIGS. 2C, 8, 10A-10B, 13A-13B, 14A-14B, 15A-15C), each tooth 50 extends from the rings formed by the yokes 52C, 54C, 56C (see FIGS. 8, 13B, 15C) along the radial axis 90 towards the axis of rotation 20. In some embodiments, the multiple wedge-shaped teeth that forms a multi-part tooth 50 may be attached together (e.g., using an adhesive). In some embodiments, each multi-part tooth is shaped such that a plurality of cross-sectional areas of the multi-part tooth in a plurality of planes perpendicular to the radial direction vary and perimeters of the plurality of cross-sections are substantially the same across the plurality of planes. For example, as explained previously, for example, with reference to FIGS. 5A-5D, each multi-part tooth 50 is shaped such that the area of its cross-section (i.e., the cross-sectional area) in a plane perpendicular to the radial axis 90 varies along the radial axis 90 while the perimeter of the cross-section remains substantially a constant along the radial axis 90. In some embodiments, the cross-sectional area of each multi-part tooth in a plane perpendicular to the radial direction increases toward an axis or rotation of the electric machine. For example, as also explained previously, in embodiments where the electric machine is an inner-rotor electric machine, the cross-sectional area of each multi-part tooth 50 (in a plane perpendicular to the radial axis 90) may increase along the radial axis 90 in the radially inward direction towards the rotor and the axis of rotation 20. In some embodiments, a cross-sectional shape of each multi-part tooth in at least one of an axial plane or a radial plane of the electric machine is a trapezoid. As explained previously (e.g., with reference to FIGS. 4A and 4B), each multi-part tooth 50 may have a trapezoidal cross-sectional shape in two mutually perpendicular planes (namely, the axial and radial planes). In some embodiments, the cross-sectional shape of each tooth 50 in the axial and/or the radial planes may be an isosceles trapezoid. As explained previously, an isosceles trapezoid is a trapezoid where the lengths of the opposite sides are equal.

Consistent with some disclosed embodiments, the electric machine is an electric generator or an electric motor. As explained previously, although the disclosed electric machines are described as an electric motor, they may be electric motors or electric generators. An electric motor is an electrical machine that converts electrical energy into mechanical energy, and electric generator is an electric machine that converts mechanical energy into electrical energy. As used herein, an electric motor may be any device or apparatus that converts electrical energy to mechanical energy, and conversely, an electric generator may be any device or apparatus that converts mechanical energy into electrical energy.

Since many components are assembled together to form an electric machine, to ensure that all the components fit together well, manufacturing tolerance may be included in the dimensions of the components. Including manufacturing tolerances may enable an electric machine to be manufactured efficiently and economically while still meeting the required design and functional specifications. In some embodiments, to enable easy assembly of multi-part teeth in the electromagnetic coils, one or more parts of a multi-part tooth may include manufacturing tolerances. For example, in some embodiments, one or more edges or sides of one or more parts that form a multi-part tooth may be tapered so that they fit together even if the dimensions of the different parts vary slightly, e.g., due to inaccuracies or imperfections during manufacturing. For example, when the multi-part teeth have the previously described yoke/tooth construction (see, e.g., FIGS. 10A-15C), one or more edges of a yoke/tooth construction may be tapered. As an example, an exemplary yoke/tooth construction may include radial tapers on each tooth and axial tapers on each yoke.

Consistent with some disclosed embodiments, each electromagnetic coil defines a trapezoidally-shaped and tapered coil opening. As previously explained, a trapezoid is a two-dimensional flat closed shape having four substantially straight sides with only one pair of parallel sides. Correspondingly, a "trapezoidally-shaped" opening is an opening that has a trapezoidal cross-sectional shape in at least one plane. In some embodiments, a trapezoidally-shaped opening may have a trapezoidal cross-sectional shape in multiple planes. For example, in two mutually perpendicular planes. The term "taper" refers to the varying (e.g., narrowing or widening) of a dimension (e.g., length, width, or any other measurable extent), an object, or the sloping of a surface of the object in a direction. For example, a taper may indicate a dimension narrowing along a direction or a surface sloping in the direction. In general, taper refers to a dimension varying or a surface sloping in any direction for any length. In some embodiments, the dimension may vary, or the surface may slope, from one end of the object to another end (e.g., an opposite end). In some embodiments, the dimension may vary, or the surface may slope, gradually.

As explained and exemplified previously, electric machines of the current disclosure may include a plurality of electromagnetic coils 70 (see, e.g., FIG. 8-10B, 13A-15C). These coils 70 may be symmetrically arranged about the rotational axis, or axis of rotation 20, of the electric machine. In some embodiments, each coil 70 may include a winding of an electrical conductor (e.g., copper wire, or another configuration of an electrical conductor) defining a coil opening 74 and may extend from a first end 76 to a second end 78 (see, e.g., FIGS. 9A-9C). A multi-part tooth 50 (e.g., of stator 30) may be disposed within each opening 74 and each opening 74 may extend along the radial axis 90 of the electric machine (see, e.g., FIG. 8, 10B, 13A-15C). As explained previously, each multi-part tooth 50 may have a trapezoidal cross-sectional shape in both the axial plane 22 (see, e.g., FIGS. 2A, 2C, 5A) and the radial plane 24 (see, e.g., FIG. 2B), and a rectangular cross-sectional shape in planes perpendicular to the radial axis 90 (see, e.g., FIGS. 5A-5D). In some embodiments, each multi-part tooth 50 may be snugly disposed in opening 74 of coil 70 (see, e.g., FIGS. 8, 10B, 13A-15C) such that the coil opening 74 has a similar shape as that of the tooth 50 within the opening 74. In other words, opening 74 of each coil 70 may be a non-uniform trapezoidal cavity corresponding to the shape of the tooth that is received in the opening.

As explained previously, the length (f) and width (w) of each tooth 50 may vary in the radial direction along the radial axis 90 (see, e.g., FIGS. 4A, 4B). For example, for both outer-rotor electric machines (see, e.g., FIG. 4A) and inner-rotor electric machines (see, e.g., FIG. 4B), length (f) may increase, and width (w) may decrease in the radial direction towards the axis of rotation 20 of the electric machine. The length and width of a coil opening 74 that receives each tooth 50 may similarly vary in the radial direction (e.g., along radial axis 90). In other words, when the coils 74 are symmetrically arranged about the axis of rotation 20, the length of coil opening 74 may increase and the width of coil opening 74 may decrease in the radial direction (e.g., along radial axis 90) towards the axis of rotation 20. Thus, the pair of opposite side surfaces of opening 74 that defines its length (e.g., the top and bottom surfaces of opening 74), and the pair of opposite side surfaces of opening 74 that defines its width (e.g., left, and right-side surfaces of openings 74) are both tapered. For example, the opposite side surfaces of opening 74 that defines its length are tapered such that opening 74 becomes larger (in the length direction) towards the axis of rotation 20, and the opposite side surfaces of opening 74 that defines its width are tapered such that opening 74 becomes narrower (in the width direction) towards the axis of rotation 20.

Consistent with some disclosed embodiments, the plurality of electromagnetic coils are arranged circumferentially about an axis of rotation of the electric machine. A circumferential arrangement refers to a pattern or configuration in which objects or elements (in this instance coils) are positioned around the circumference or outer edge of a circle or a circular-like shape. As described and exemplified previously, when an electric machine operates, its rotor 40, and shaft 16 coupled to the rotor, rotates, and the axis about which the rotor 40 and shaft 16 rotates is the axis of rotation 20. Coils arranged "circumferentially" about the axis of rotation indicates that the coils are arranged in a manner that they surround or encircle the axis of rotation. For example, the coils may form a substantially circular array around the axis of rotation. In some embodiments, the circumferentially arranged coils may be positioned at or near the circumference of a virtual circle formed around the axis of rotation. As can be seen, for example, in FIGS. 8 and 12A-15C, the plurality of electromagnetic coils 70 may be circumferentially arranged about the axis of rotation 20 with opening 74 of each coil 70 extending along the radial axis 90 of the electric machine. In some embodiments, these coils 70 may be symmetrically arranged about the axis of rotation 20, and each coil 70 may be equally spaced apart (e.g., in the radial direction) from the axis of rotation 20.

Figure 16A:
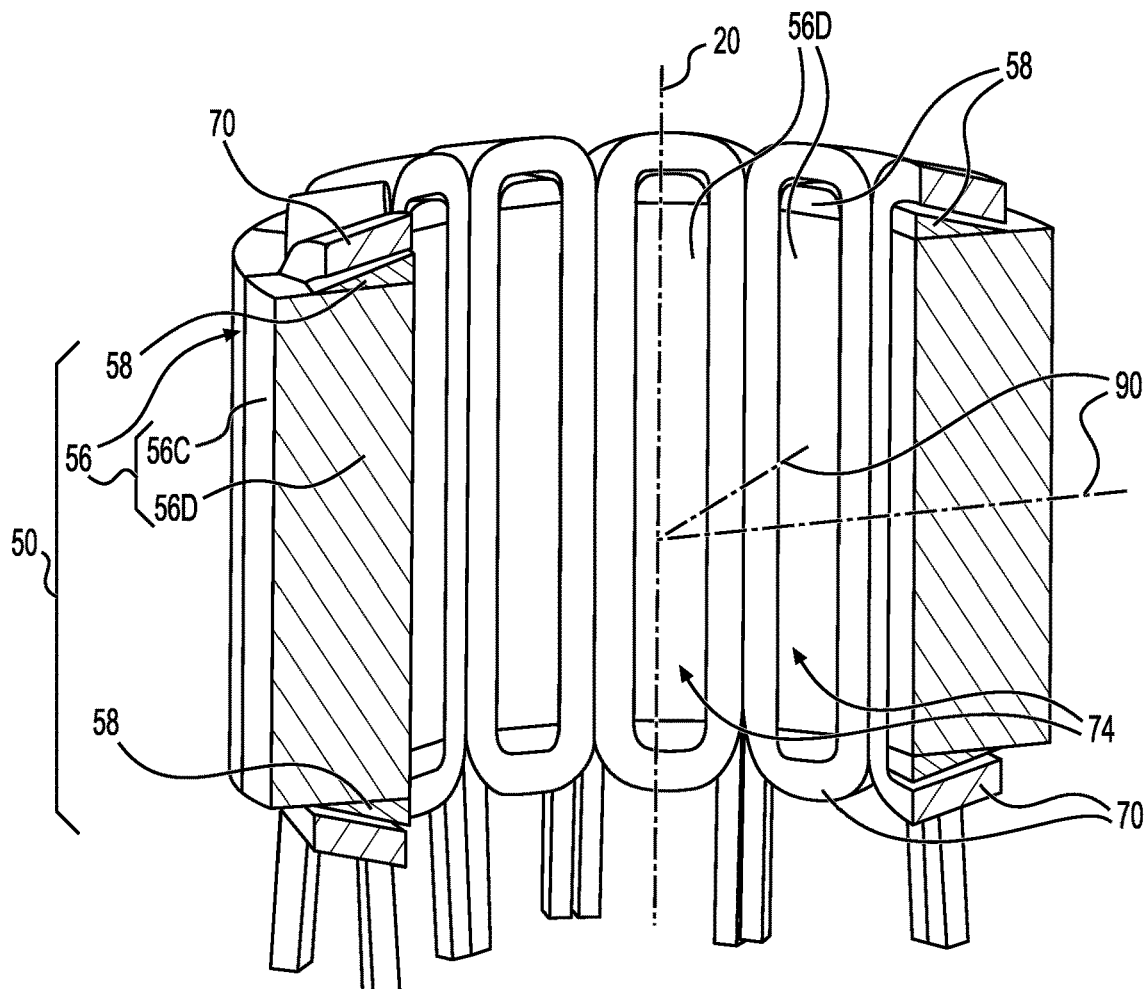
FIGS. 16A-16B illustrate different views of a portion of an exemplary electric machine consistent with some embodiments of the current disclosure.

Some disclosed embodiments may include a plurality of yokes each extending in an axial direction. As used herein, "axial direction" refers to the direction of the axis of rotation of the electric machine. This direction may also be referred to as the length direction of the electric machine. Thus, the yokes (as described earlier) may extend in a lengthwise direction of the electric machine. For example, axial direction may be a direction parallel to the axis of rotation 20 (see, e.g., FIGS. 2A, 2C, 8, 11A-11E, 12A-15C). For example, with reference to FIG. 10A, first clip 52, second clip 54, and third clip 56 (or spacers) each includes a yoke. For example, first clip 52 includes a yoke 52C, second clip 54 includes a yoke 54C, and third clip 56 includes a yoke 56C. When these spacers or clips (52, 54, 56) are assembled in an electric machine (see, e.g., FIGS. 10B, 13A-15C), the yokes (52C, 54C, 56C) of each spacer cooperate to (or collectively) form a ring around the axis of rotation 20. FIG. 16A illustrates (a portion of) another embodiment of an electric machine with a plurality of coils 70 circumferentially and symmetrically arranged about axis of rotation 20. As in the embodiments discussed previously, for example, with reference to FIGS. 8, 10A-10B, 13A-15C, each opening 74 of coil 70 includes a multi-part tooth 50 positioned therein. In the embodiment of FIG. 16A, multi-part tooth 50 is formed by a pair of shims 58 positioned on axially opposite sides of an intermediate tooth 56D of spacer 56.

FIGS. 17A-17C are perspective views of an exemplary spacer 56 and an exemplary shim 58 of FIG. 16A. As best seen in FIG. 17A, spacer 56 includes a yoke 56C from which an intermediate tooth 56D protrudes. Although a single tooth 56D protrudes from yoke 56C in the embodiment of FIG. 17A, this is only exemplary. For example, as discussed with reference to, for example, FIGS. 12A-12D, in some embodiments, multiple teeth (56D, 56A, 56B, 56A', 56B') protrude in the radial direction from yoke 56C. When intermediate tooth 56D of each spacer 56 is positioned in opening 74 of each coil 70 (see, e.g., FIGS. 16A-16B), yoke 56C extends in the axial direction (i.e., along axis of rotation 20). In the radial plane, yoke 56C of spacer 56 is arc-shaped such that the yokes 56C of adjacent spacers 56 collectively form a circumferential ring about the axis of rotation 20 around the plurality of coils 70. As also illustrated, for example, in FIGS. 10B and 13A-15C, the yokes (e.g., yokes 52C, 54C, 56C) of the clips or spacers of these embodiments are also arc-shaped in the circumferential direction (e.g., the direction around the axis of rotation 20) and extend in the axial direction.

Figure 16B:
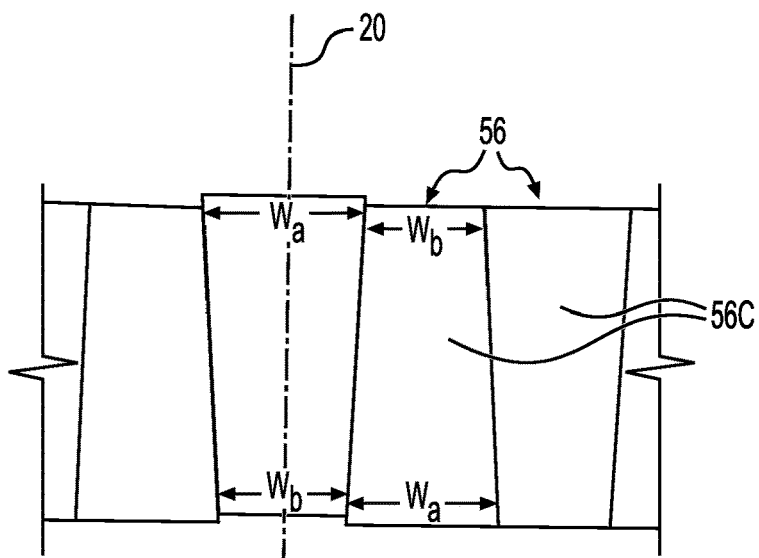
Figure 18A:
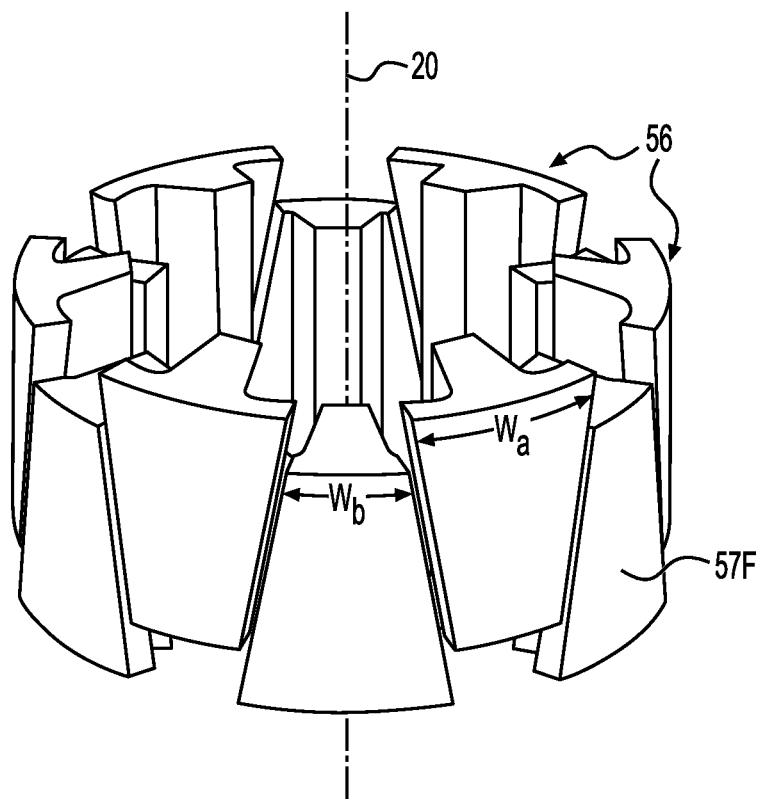
FIGS. 18A-18B are illustrations showing the assembly of an exemplary multi-part tooth consistent with some embodiments of the current disclosure.
Figure 18B:
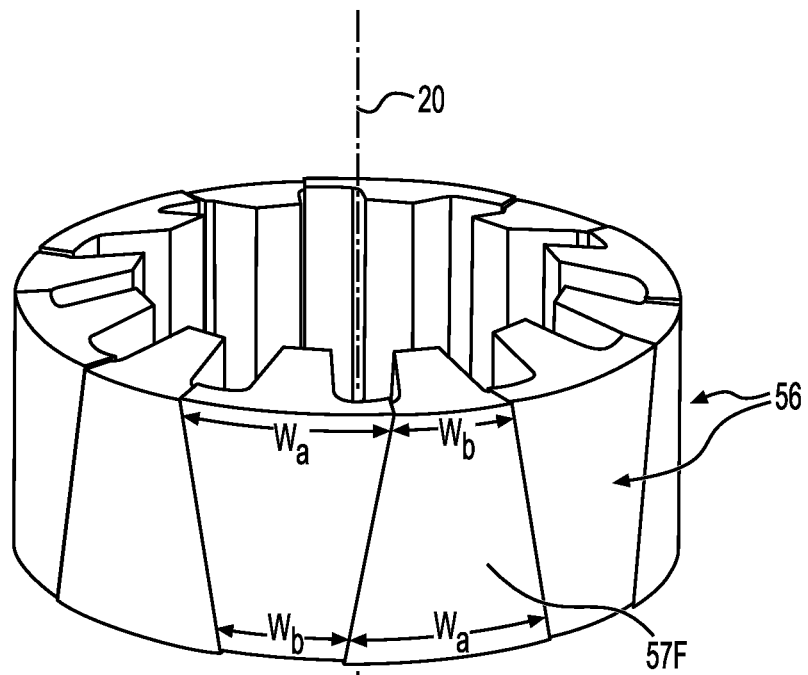

Consistent with some disclosed embodiments, at least one of the plurality of yokes is tapered in the axial direction. As explained previously, tapered in the axial direction indicates that a dimension of a yoke varies (e.g., narrows) or a surface of the yoke slopes in the axial direction. In some embodiments, the dimension may vary (or the surface may slope) from one end of the yoke to another end (e.g., an opposite end). In some embodiments, the variation may be gradual. FIGS. 18A and 18B illustrate the arrangement of adjacent yokes 56C of spacers 56. As best seen in FIGS. 16B and 18A-18B, yoke 56C of spacer 56 tapers in the axial direction (i.e., along axis of rotation 20). For example, in the axial direction, the width ($w_a$) at one end of yoke 56C is greater than the width ($w_b$) at the opposite end of yoke 56C. In other words, yoke 56C tapers from a width of $w_a$ to a width of $w_b$ in the axial direction. In some embodiments, each yoke of the plurality of yokes is tapered along two edges in the axial direction such that one side of the yoke is wider than another side of the yoke. For example, multiple surfaces or edges of spacer 56 may be tapered (see, e.g., FIG. 17A). As best seen in FIGS. 17A and 18A, the opposite edges 57D, 57E of yoke 56C in the circumferential direction may be tapered such that the width ($w_a$) at one axial end of yoke 56C is greater than the width ($w_b$) at its opposite axial end. Consistent with some disclosed embodiments, a wide side of each yoke is arranged adjacent a narrower side of an adjacent yoke. Such adjacent placement results in a wide side of a first yoke lying adjacent the narrow side of a second yoke, while the narrow side of the first yoke lies adjacent the wide side of the second yoke. As previously explained, when intermediate teeth 56D of spacers 56 are positioned in openings 74 of adjacent coils 70, yokes 56C of adjacent spacers 56 cooperate to form a ring around axis of rotation 20. When in this configuration, as best seen in FIGS. 18A-18B, the wider side (e.g., the side having a width $w_a$) of a yoke 56C may be positioned adjacent to the narrower side (e.g., the side having a width $w_b$) of its adjacent yokes 56C (e.g., yokes of spacers on either side).

Consistent with some embodiments, outer surfaces the plurality of yokes cooperate to form a cylindrical shape. Cooperating to form a cylindrical shape refers to a situation where, when viewed as a whole, a cylindrical shape is apparent. For example, in some embodiments, when intermediate teeth 56D of spacers 56 are positioned in openings 74 of adjacent coils 70, the radially outer-most surfaces 57F of yokes 56C cooperate to form a cylindrical shape (see, e.g., FIG. 18B). In some embodiments, the spacers 56 may be similarly (or identically shaped) parts. However, due to possible dimensional variations during fabrication, dimensional variations may exist between different spacers 56. Due to this possible dimensional variation, in some embodiments, the radially outer-most surfaces 57F of the yokes may together form a substantially cylindrical shape. The tapered yokes of the current disclosure may enable the stator to be assembled while maintaining the critical dimensions of the electric machine even when there are dimensional variations in the spacers 56. Consistent with some embodiments, an edge of at least one yoke of the plurality of yokes is not aligned with an edge of an adjacent yoke. Not aligned refers to at least one yoke edge not being in line with an adjacent yoke edge. For example, as illustrated in FIG. 16B, due to the dimensional variations between different spacers 56, one end (or edge) of a yoke 56C may be axially misaligned with (e.g., spaced apart in the axial direction from) a corresponding end (or edge) of an adjacent spacer 56. However, in some embodiments, the yokes 56C of adjacent yokes 56C may be substantially axially aligned.

Consistent with some disclosed embodiments, the electric machine may include a plurality of teeth, wherein at least one tooth of the plurality of teeth extends from each of the plurality of yokes. The term "teeth" (and its singular "tooth") may be interpreted consistent with the previous description of this term. For example, teeth refers to projections or protrusions. Although not a requirement, in some embodiments, one or more teeth may protrude from, or extend from, a body. As illustrated in, for example, FIGS. 8, 10A-10B, 11A-11E, 12A-18B, the disclosed electric machine includes a plurality of teeth (e.g., teeth 52A, 52B, 52D, 54A, 54B, 54D 56A, 56B, 56D). In some embodiments, one or more of these teeth may extend from a yoke. For example, in the embodiments of the spacers illustrated in FIGS. 11A-11C and 15A-15C, more than two teeth (52D, 54D) extend from each yoke (52C, 54C), in the embodiments illustrated in FIGS. 10A-10B, 11E, 12B-12D, 13A-13B, and 15A-15C, two teeth (e.g., teeth 52A, 52B, etc.) extend from each yoke (52C, etc.), and in the embodiments illustrated in FIGS. 11D, 12A, 14A-14B, 16A, and 17A, a single tooth (e.g., tooth 56D) extends from each yoke (e.g., yoke 56C). Each of these teeth may extend from its yoke in the radial direction (along radial axis 90) into opening 74 of a coil 70. In some disclosed embodiments, only one of the plurality of teeth extends from each of the plurality of yokes. Only one extending tooth in this example refers to a one-to-one relationship between a yoke and a tooth. For example, in the embodiments illustrated in, for example, FIGS. 12A, 14A-14D, and 17A, only a single tooth 56D extends from each yoke 56C. In some disclosed embodiments, at least one yoke has two of the plurality of teeth extending therefrom. Two teeth extending from at least one yoke refers to a situation where there is a two to one relationship between teeth and at least one of the yokes. For example, in the embodiments of FIGS. 12B and 15A-15C, yoke 56C has two teeth 56D extending therefrom.

In some disclosed embodiments, the plurality of teeth are each tapered in a radial direction to enable the plurality of teeth to fit within a corresponding trapezoidally-shaped and tapered coil opening. "Radial direction" refers to the direction toward a central axis. For example, in FIGS. 4A and 4B, the tooth tapers as it extends along the radial axis 90 of the electric machine. As explained previously, each tooth of the plurality of multi-part teeth 50 are tapered in the radial direction (i.e., along the radial axis 90). For example, with reference to FIGS. 4A and 4B, the width of an exemplary multi-part tooth 50 increases from $w_1$ to $w_2$ and its height decreases from $l_1$ to $l_2$ along the radial axis 90 radially outwards from the axis of rotation 20. Therefore, the width of tooth 50 tapers in the radially inward direction (e.g., towards axis of rotation 20) and its height tapers in the radially outward direction (e.g., away from axis of rotation 20). Thus, both the width and the height of tooth 50 tapers in the radial direction. Since the height (l) of tooth decreases from $l_1$ to $l_2$ in the radially outward direction, the top and bottom surfaces (see FIGS. 4A and 4B) are inclined (or sloping) with respect to the radial plane 24. And since the width (w) of tooth 50 increases from $w_1$ to $w_2$ in the radially outward direction, the two side surfaces of tooth 50 are also inclined with respect to the axial plane 22. Each multi-part tooth 50 is made of multiple constituent parts. For example, with reference to FIGS. 16A and 17A-17C, multi-part tooth 50 (see FIG. 16A) is formed by a pair of shims 58 positioned on axially opposite sides of an intermediate tooth 56D of a spacer 56 (see, e.g., FIGS. 17A-17C). The constituent parts of a multi-part tooth 50 (e.g., teeth 56D and shims 58) may also be tapered in the radial direction. For example, the width of both tooth 56D and shim 58 increases in the radially outward direction (e.g., away from axis of rotation 20). That is, the width of tooth 56D and shim 58 tapers towards the axis of rotation 20. As a result of the varying width, the two side surfaces 57B and 57C of tooth 56D (see FIG. 17A) are inclined towards the radial axis 90 in the radially inward direction (e.g., towards axis of rotation 20). Similarly, the height of shim 58 increases towards the axis of rotation 20 (see FIGS. 17B-17C). Therefore, the height of shim 58 tapers away from the axis of rotation 20. As explained, for example, with reference to FIGS. 5A-5D, tooth 56D and the pair of shims 58 positioned on axially opposite surfaces of tooth 56D collectively form a multi-part tooth 50 that may have a trapezoidal cross-sectional shape in both the axial plane 22 (see, e.g., FIGS. 2A, 2C, 5A) and the radial plane 24 (see, e.g., FIG. 2B), and a rectangular cross-sectional shape in planes perpendicular to the radial axis 90 (see, e.g., FIGS. 5A-5D). As also explained previously, each multi-part tooth 50 may be snugly disposed in a coil opening 74 (see, e.g., FIGS. 8, 10B, 13A-15C) and may have a similar shape as the opening. In other words, each multi-part tooth 50 may be shaped to fit within a corresponding trapezoidally-shaped tapered coil opening 74.

Consistent with some embodiments, each tooth of the plurality of teeth is tapered in four planes. Each surface may be defined by a plane. When a tooth tapers in four planes, four surfaces are tapered. For example, as explained previously with reference to FIGS. 4A and 4B, since the height (l) of multi-part tooth 50 decreases from $l_1$ to $l_2$ in the radially outward direction, the top and bottom surfaces (see FIGS. 4A and 4B) are inclined with respect to the radial plane 24, and since the width (w) of tooth 50 increases from $w_1$ to $w_2$ in the radially outward direction, the two side surfaces of tooth 50 are inclined with respect to the axial plane 22. Thus, tooth 50 is tapered in four planes (e.g., the top and bottom surfaces and the two side surfaces). In some embodiments, each tooth of the plurality of teeth is tapered in two planes, and wherein the electric machine further includes a pair of shims disposed on opposite sides of each tooth of the plurality of teeth. A "shim" is a piece of material inserted or placed between two objects or surfaces to adjust the fit, alignment, or clearance between them. Shims may be located on opposite sides of each tooth for fit, alignment, and/or clearance adjustment purposes. As explained above, the top and bottom surfaces and the two side surfaces of each multi-part tooth 50 are tapered. The top and bottom surfaces are tapered with respect to the radial plane 24 and the two side surfaces are tapered with respect to the axial plane 22 (see, e.g., FIG. 4A). In some embodiments, a shim may be a tapered or a wedge-shaped part. For example, with reference to FIGS. 16A and 17A-17C, multi-part tooth 50 (see FIG. 16A) is formed by a pair of shims 58 positioned on axially opposite sides (e.g., top, and bottom sides) of an intermediate tooth 56D of spacer 56 (see, e.g., FIGS. 17A-17C). Here, the shims 58 may fill the space between the top and bottom surfaces of tooth 56D and the axially opposite surfaces of coil opening 74 (see, e.g., FIG. 16A). As another example, in the embodiment illustrated, for example, in FIGS. 10A-10A and 13A-15C, a pair of shims (see, e.g., FIGS. 11A-11E) in the form of the wedge-shaped teeth (e.g., teeth 52A, 52B, 52D, 54A, 54B, 54D) are positioned on the top and bottom surfaces of an intermediate tooth. In some embodiments, at least three sides of each shim are tapered. For example, with reference to FIG. 17C, due to the changing width and height of shim 58 in the radial direction, the top and bottom surfaces 59A, 59B and the two opposite side surfaces of shim 58 are tapered. Similarly, the two pairs of opposite sides of the shims in the embodiments of, for example, FIGS. 10A-10A and 13A-15C, are also tapered (see, e.g., FIGS. 11A-11E). In some embodiments, the two tapered planes are transverse to each other. Planes that are transverse means that as the planes extend, they will cross each other (e.g., the planes of the tapered surfaces are not parallel to each other.) As explained above, the top and bottom surfaces of multi-part tooth 50 are tapered with respect to the radial plane 24 and its two side surfaces are tapered with respect to the axial plane 22 which is transverse to the radial plane 24 (see, e.g., FIG. 4A).

Consistent with some embodiments, a disclosed electric machine includes a rotor positioned radially inwards of the plurality of electromagnetic coils. And in some embodiments, a disclosed electric machine includes a rotor positioned radially outwards of the plurality of electromagnetic coils. Inward positioning refers to being closer to a central axis, and outward positioning refers to being further from a central axis. As discussed previously, aspects of the current disclosure may be applicable to both inner-rotor electric machines and outer-rotor electric machines. As illustrated in FIG. 2C, an inner-rotor electric machine 10A includes a rotor 40 positioned radially inwards of the stator 30. And, as illustrated in FIG. 2A, in an outer-rotor electric machine 10, a rotor 40 is positioned radially outwards of the stator 30. In both embodiments, during operation, the rotor 40 rotates about the axis of rotation 20.

In some embodiments, the plurality of teeth are formed of SMC material, and in some embodiments, the plurality of teeth are formed of laminated steel. Just as the clips, as described earlier may be made of SMC material or laminated steel, teeth may be similarly constructed, or may be constructed of any other suitable material. Consistent with some embodiments, a cross-sectional shape of each multi-part tooth in at least one of an axial plane or a radial plane of the electric machine is a trapezoid. As explained previously, a cross-sectional shape of each multi-part tooth 50 in both the axial plane 22 and the radial plane 24 is trapezoidal (see, e.g., FIGS. 2A-2C). In some embodiments, the cross-sectional shape in one or both of the axial plane 22 and the radial plane 24 may be an isosceles trapezoid.

Consistent with some embodiments, the plurality of teeth within each coil opening together forms a wedge-shaped multi-part tooth that extends in a radial direction of the electric machine and is shaped such that a plurality of cross-sectional areas of the multi-part tooth in a plurality of planes perpendicular to the radial direction vary and perimeters of the plurality of cross-sections are substantially the same across the plurality of planes. The term "wedge-shaped" may be interpreted as described and exemplified previously. In this example, two or more elements or pieces of material together form a wedge-shaped multi-part tooth. For example, as described previously and illustrated, for example, in FIGS. 4A and 4B, each multi-part tooth 50 of the disclosed electric machines may be wedge-shaped and may extend in the radial direction (along radial axis 90) of the electric machine. As also described previously (for example, with reference to FIGS. 5A-5D), the perimeter of each tooth 50 in the radial direction along the radial axis 90 may be substantially a constant, while the cross-sectional area of each tooth 50 in the radial direction may vary. In some embodiments, the cross-sectional area of each multi-part tooth in a plane perpendicular to the radial direction increases toward an axis of rotation of the electric machine. In embodiments of electric machines with an inner rotor 40 and outer stator 30 (see, e.g., FIGS. 2C, 3A), the cross-sectional area may increase in the radially inward direction towards the axis of rotation 20. In some embodiments, the cross-sectional area may monotonically increase in the radially inward direction. In some embodiments, the taper of the outer surfaces (e.g., side surfaces and top and bottom surfaces) of each multi-part tooth 50 may be such that the rate of variation of the cross-sectional area in the radial direction may be a constant. For example, in some embodiments, the rate of increase of the cross-sectional area in the radially inward direction may be a constant.

Electric machines of the current disclosure may be air cooled or liquid cooled. During operation of an electric machine, the components of the electric machine (such as, for example, coils 70) may generate heat. The generated heat may increase the temperature of components (e.g., teeth 50, stator 30, etc.) of the electric machine. In an air-cooled electric machine, the generated heat may be removed using ambient or atmospheric air to maintain the temperature of the electric machine within acceptable levels. In a liquid cooled electric machine, at least a portion of the generated heat may be removed by a cooling liquid. In some embodiments of electric machines, a portion of the generated heat may be removed by atmospheric air and a portion of the heat may be removed by a cooling liquid circulating through the electric machine.

Consistent with some embodiments, an air coolable electric machine may include a stator and a rotor. In an "air coolable" electric machine, refers to a motor or generator where at least a portion of the electric machine may be cooled using a flow of air (or air flow). For example, an electric machine which at least partially uses air as a cooling medium is an air-cooled electric machine. As described and exemplified previously, a stator is a stationary part and the rotor is rotatable part of the electric machine. In an inner-rotor electric machine 10A, the rotor 40 may be positioned radially inwards of the stator 30 (see, e.g., FIG. 2C), and in an outer-rotor electric machine 10 (see, e.g., FIG. 2A-2B), the rotor 40 may be positioned radially outwards of the stator 30. In some embodiments, the electric machine may also include a heat dissipation plate. "Heat dissipation" is the movement or transfer of heat, from a hotter location to a cooler location. Because materials like metal are heat conductive, a plate may be used to conduct heat away (dissipate heat) from portions of the electric machine. For example, the heat may be dissipated from its source into the surrounding environment via such a plate. Thus, a heat dissipation plate is a component that is physically positioned in the path of such a heat transfer. For example, heat is transferred from the hotter location to the cooler location through the heat dissipation plate. For example, the heat dissipation plate may dissipate the heat from the source to atmospheric air. The heat dissipation plate may be a single part or combination of parts that act together. In some embodiments, the heat dissipation plate is formed of aluminum. In general, the heat dissipation plate may be made of any (e.g., one or more) heat-conducting material to conduct and remove heat from the heat source(s). For example, in some embodiments, the heat dissipation plate may be an integral or single component formed of aluminum.

Figure 19:
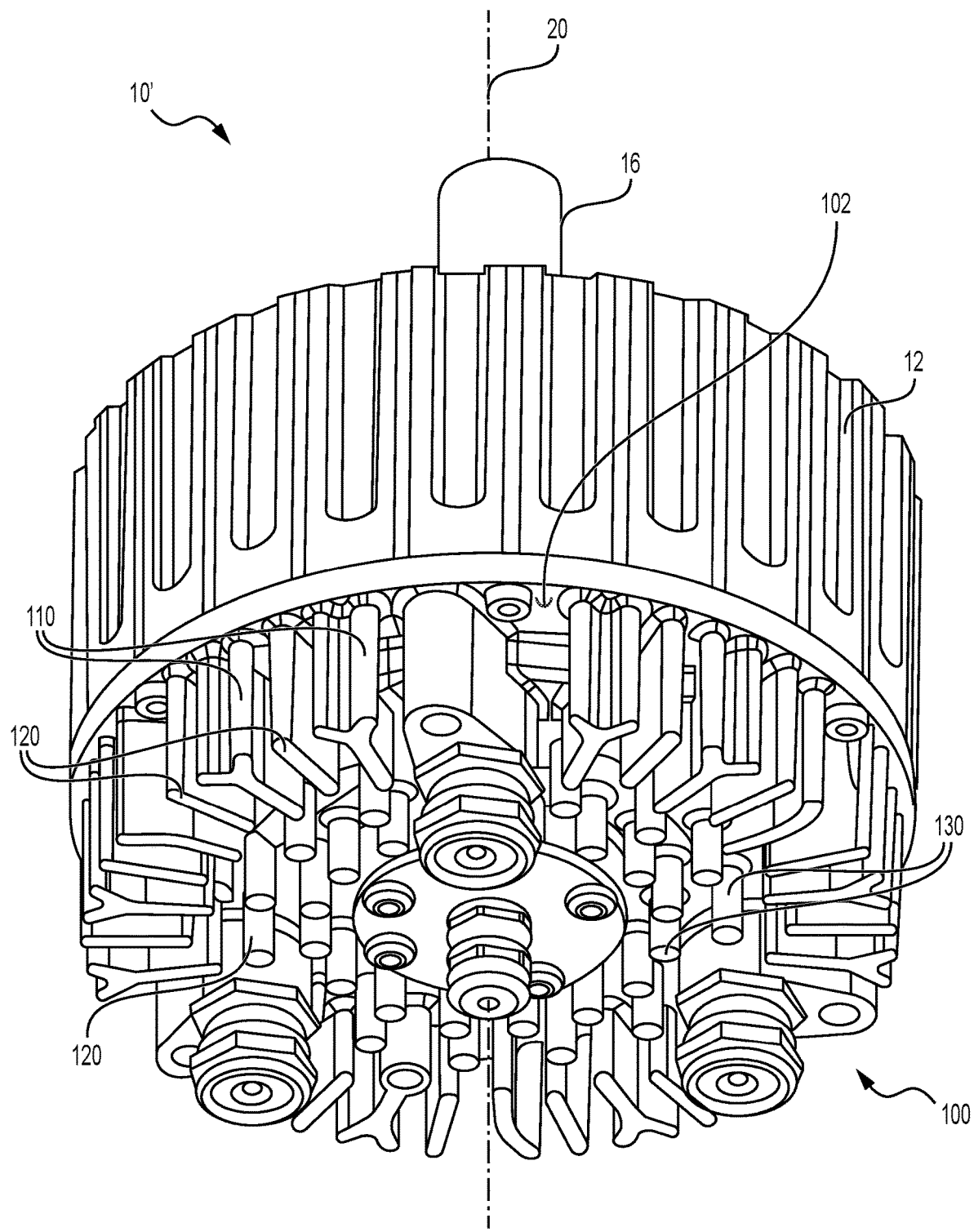
FIG. 19 illustrates a perspective view of an exemplary electric machine consistent with some embodiments of the current disclosure.

FIG. 19 illustrates an exemplary electric machine 10' with a heat dissipation plate 100 attached to its housing 12. Heat dissipation plate 100 may assist in dissipating the heat generated by the electric machine (e.g., the components within housing 12) to atmospheric air. In some embodiments, housing 12 may be thermally connected to heat dissipation plate 100 such that the heat may be also dissipated through the housing 12. Housing 12 may be made of heat-conducting material and contain ribs to increase its heat transfer surface. FIGS. 20A-20C and 22 illustrate some exemplary embodiments of heat dissipation plates 100 separated from the electric machine. The heat dissipation plate 100 may generally have a plate-like or disk-like configuration with a thickness smaller than its radius. In some embodiments, as illustrated in FIGS. 20A-20C and 22, heat dissipation plate 100 may have a circular shape when viewed along the axis of rotation 20 (e.g., in the radial plane).

Consistent with some embodiments, the heat dissipation plate includes a first side arranged for thermal communication with the stator. "First side" may refer to any side or surface of the heat dissipation plate configured to face the stator. "Thermal communication" with the stator refers to the spatial proximity between the heat dissipation plate and the stator such that good heat transfer occurs between them. In some embodiments, when two bodies are in thermal communication, or are thermally connected, heat transfer between the two bodies occurs by conduction heat transfer mechanism. That is, the two bodies may be in contact (direct physical contact or contact via a thermal interface material between the two bodies). For example, in some embodiments, when two bodies are in thermal communication, a surface of one body may directly contact a surface of the other body. In some embodiments, when two bodies are in thermal communication, a surface of one body may contact a surface of the other body through a thermal interface material (e.g., thermally conductive grease, thermal gel, or another thermal medium) between the two surfaces. In general, the first side of the heat dissipation plate may be arranged to contact any part or portion of the stator. For example, with reference to FIGS. 19 and 22, heat dissipation plate 100 includes a first side 104 that faces the interior of housing 12. First side 104 may include regions or features configured to contact one or more portions of the stator 30 (not shown in FIGS. 19 and 22). For example, in the embodiment of FIG. 22, first side 104 includes an annular groove 106 that is configured to be in thermal communication with the outer surface of each coil 70 the plurality of coils 70. The annular groove 106 may extend around the axis of rotation 20 and may be shaped and arranged to receive the coils 70 therein when the electric machine is assembled. In some embodiments, the outer surface of the coils 70 may contact (e.g., directly or via an interface material) the surface of the groove 106 to transfer heat from the coils 70 to the heat dissipation plate 100.

In some embodiments, each coil 70 of the plurality of electromagnetic coils and/or other portions of the stator 30 (e.g., the stator core) may be in contact with the heat dissipation plate 100 directly or through a thermally-conductive (or interface) material disposed therebetween. The thermally-conductive material may be any material that improves the transfer of heat between the interfacing surfaces. The thickness of the thermally-conductive material and its thermal conductivity may affect heat transfer through the material. As such, in some embodiments, a thin layer of the thermally-conductive material may be used to reduce its thermal resistance. The thickness of the thermally-conductive material depends on the application. In applications were the thermal conductivity of the thermally-conductive material is high, the thickness of the thermally-conductive material can be higher. In some embodiments, heat dissipation plate 100 may include a cylindrical hub 150 extending from first side 104. The cylindrical hub 150 may extend around the axis of rotation 20 and may be made of heat-conducting material.

In some embodiments, the heat dissipation plate may have a central opening therein and an outer periphery. An "outer periphery" refers to the boundary of a body or outer edge of a structure. Therefore, outer periphery refers to the outer edge of the heat dissipation plate. A "central opening" in this context refers to an aperture or gap located at the center of the heat dissipation plate. In embodiments where the heat dissipation plate 100 has a circular shape, outer periphery refers to the circumference of the circular plate, and central opening refers to an opening at the center of the circular plate. For example, heat dissipation plate 100 includes an outer periphery (e.g., a circular outer periphery) and a central opening 140. In some embodiments, central opening 140 may allow ambient or atmospheric air to flow into the housing 12 of the electric machine therethrough. Additionally or alternatively, in some embodiments, the central opening 140 may allow the shaft 16 of electric machine 10' to extend therethrough.

Consistent with some embodiments, a plurality of circumferentially distributed Y-shaped or ψ-shaped cooling fins may extend from a second side of the heat dissipation plate opposite the first side. In general, "second side" may be any side or surface of the heat dissipation plate different from the first side. In some embodiments, the second side may be a surface of the heat dissipation plate that is opposite its first side that is in thermal communication with the stator. "Cooling fins" refer to structures that extend from a surface (in this case, from the second side) to increase the rate of heat transfer between (e.g., from or to) the surface and the environment by, for example, by increasing convection. Cooling fins increase the surface area of the surface from which it extends and thereby increases the heat transfer from the surface. Cooling fins may be made of any heat-conducting material. In some embodiments, the cooling fins may be made of the same material as the object that it extends from. For example, when the heat dissipation plate is made of aluminum, the structures that form the cooling fins may also be made of aluminum. In general, the cooling fins may have any shape and configuration. In some embodiments, the cooling fins may include plate-like structures that protrude from the second side of the heat dissipation plate. The spacing between the cooling fins may allow ambient air to flow through these spaces and create turbulence that may assist in breaking up any boundary layers that may exist in the surface and thereby increase the convective heat transfer coefficient of the surface. In some embodiments, the cooling fins may be shaped generally shaped like a Y or a ψ.

It should be noted that the symbols (Y and ψ) only indicate the approximate shape of the cooling fins. For example, FIG. 21A illustrates an exemplary cooling fin 100 having a Y-shape, and FIG. 21B indicates an exemplary cooling fin 100' having a W shape. Cooling fins distributed "circumferentially" indicates that the cooling fins are arranged in a generally circular pattern on the second side. For example, as illustrated in FIGS. 19, 20A-20C, and 22, the cooling fins (100, 100') may be arranged to form a substantially circular array, for example, around the central opening 140 and the axis of rotation 20 of the electric machine 10'. In some embodiments, the Y-shaped or ψ-shaped cooling fins are symmetrically arranged about the central opening. A symmetrical arrangement in this context refers to a balanced or harmonious distribution. For example, a distribution pattern may provide symmetry. For example, as illustrated in FIGS. 19, 20A-20C, and 22, the Y-shaped cooling fins 110 and the ψ-shaped cooling fins 110' are arranged symmetrically about the central opening 140 and the axis of rotation 20. In some embodiments, the Y-shaped or ψ-shaped cooling fins are arranged such that they radiate outwardly from a center of the cooling plate. Outward radiation refers to a situation where the cooling fins extend generally in an elongated direction, and that direction is from an inner location on the plate in a direction toward an outer edge of the plate. For example, the Y-shaped cooling fins 110 and the ψ-shaped cooling fins 110' may be symmetrically arranged about the axis of rotation 20 such that virtual lines extending from the linear segments 116 of these cooling fins (see, e.g., FIGS. 21A, 21B) meet at the axis of rotation 20.

In some embodiments, each cooling fin includes a radially extending leg portion and a V-shaped or E-shaped deflector portion, wherein each V-shaped or E-shaped deflector portion faces the outer periphery of the heat dissipation plate to deflect a first portion of airflow outwardly, and wherein each radially extending leg portion is arranged to direct portion of airflow inwardly toward the central opening. A leg refers to an elongated or linear structure and a deflector portion includes branches off the leg. As can be seen by way of example in FIG. 21A, the illustrated Y-shaped cooling fin 110 includes a pair of linear segments 112 arranged in a V-shape to form a deflector portion that extends from a distal end 116B of a linear (or leg) segment 116. When the heat dissipation plate 100 is assembled on electric machine 10' (see FIG. 19), the leg segment 116 may extend along the radial axis 90 from a proximal end 116A positioned closer to the axis of rotation 20 and the distal end 116B positioned further away from the axis of rotation 20. In this configuration, the open end of the V-shaped segments 112 (or the V-shaped deflector) may face the outer periphery of the heat dissipation plate 100. Although segments 112 and 116 are described as being linear, this is only exemplary. In some embodiments, one or both of segments 112, 116 may be curved. For example, in some embodiments, segments 112 may be curved (e.g., away from radial axis 90 to have a U, a rotated C, or a cup shaped deflector portion) and segment 116 may be linear. The illustrated ψ-shaped cooling fin 110' of FIG. 21B includes the pair of linear segments 112 arranged in a V-shape extending from distal end 116B of linear segment 116 (as in the Y-shaped cooling fin of FIG. 21A), and an additional linear segment 114 extending from the distal end 116B between the pair of linear segments 112. In some embodiments, some, or all of segments 112, 114, 116 may be curved. For example, in some embodiments, segments 112 may be curved (e.g., to have a U or a cup shape) and segments 114, 116 may be linear such that the distal portion of the ψ-shaped cooling fin 110' forms a deflector portion having an approximate E-shape. As illustrated using arrows in FIG. 20B, the each V-shaped deflector portion of the Y-shaped cooling fins 100 (and each E-shaped deflector portion of a y-shaped cooling fin 100') faces the outer periphery of the heat dissipation plate and deflects a portion of airflow outwardly (e.g., away from the central opening 140 and the axis of rotation 20) and each radially extending leg segment 116 directs a portion of airflow inwardly (e.g., toward the central opening 140 and the axis of rotation 20).

Figure 20A:
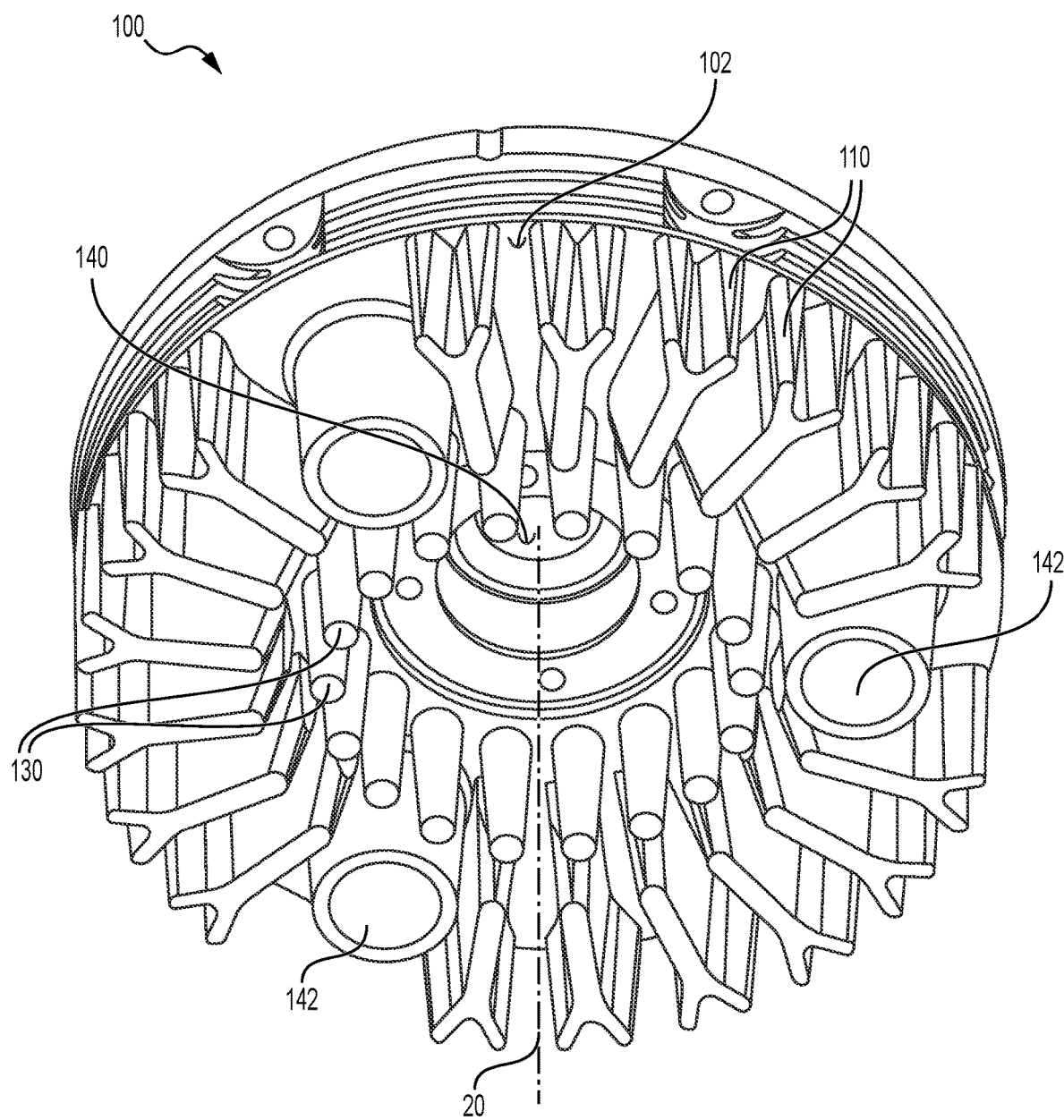
FIGS. 20A-20C are illustrations of an exemplary thermal dissipation plate of an electric machine consistent some embodiments of the current disclosure.
Figure 20B:
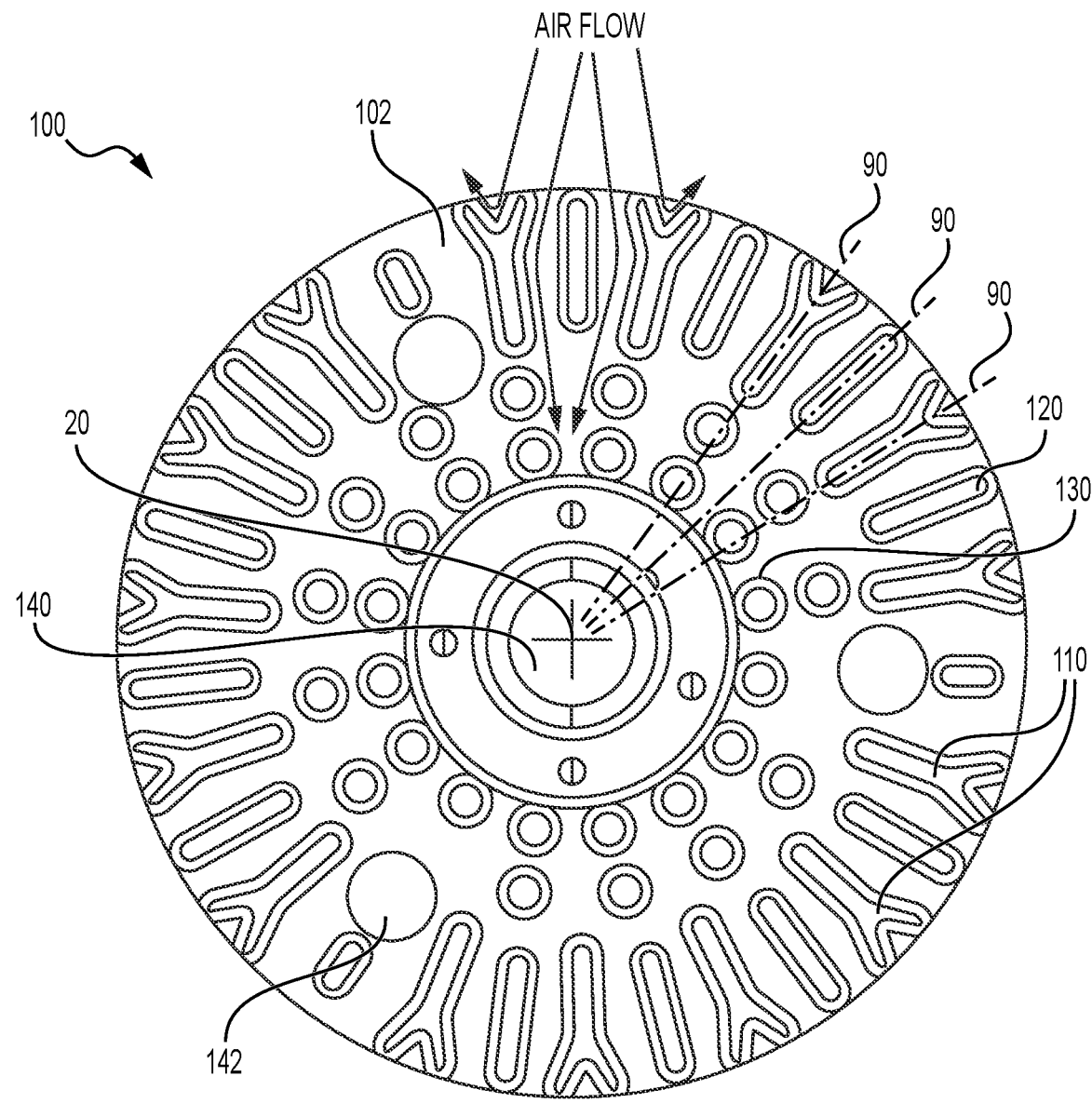
Figure 20C:
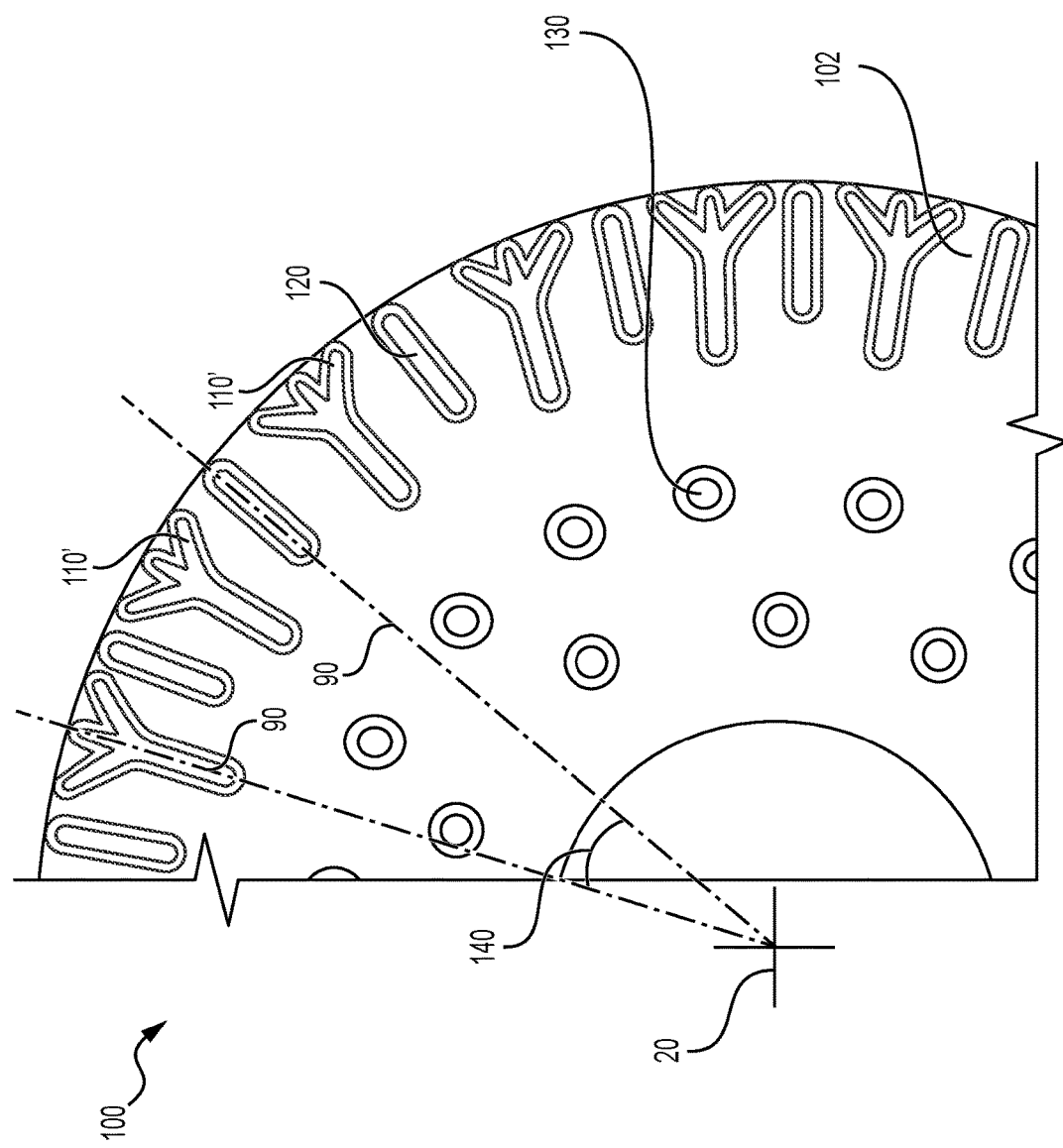
Figure 21B:
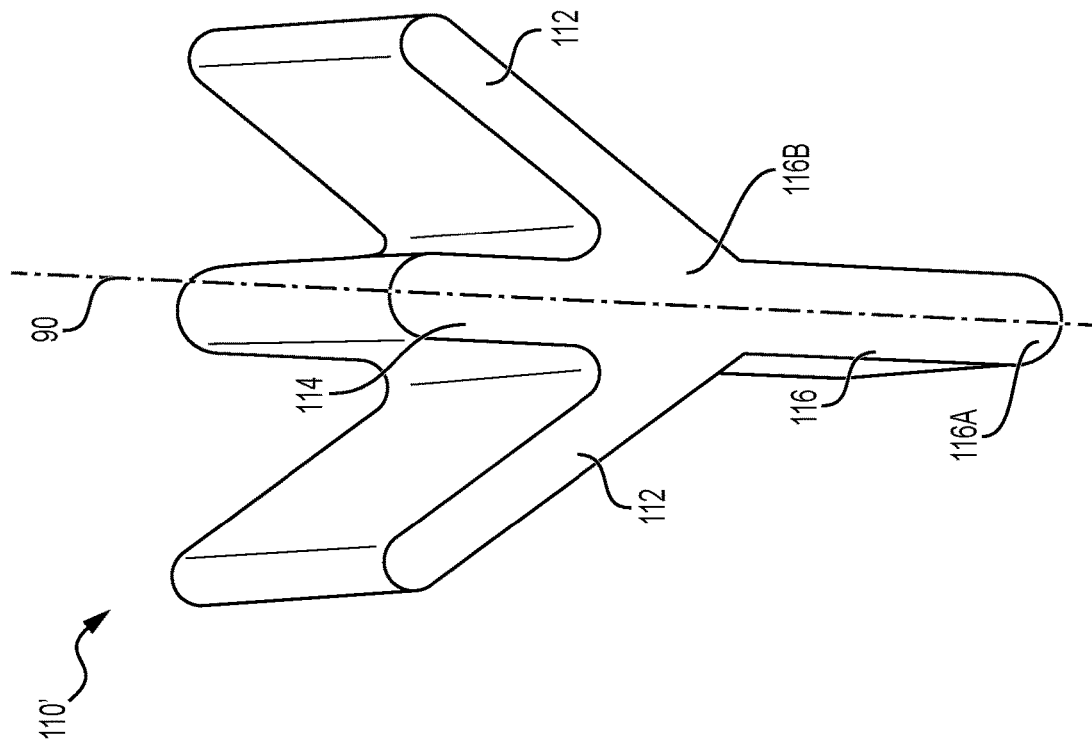
FIGS. 21A-21B illustrate exemplary shapes of cooling fins consistent with some embodiments of the current disclosure.
Figure 21A:
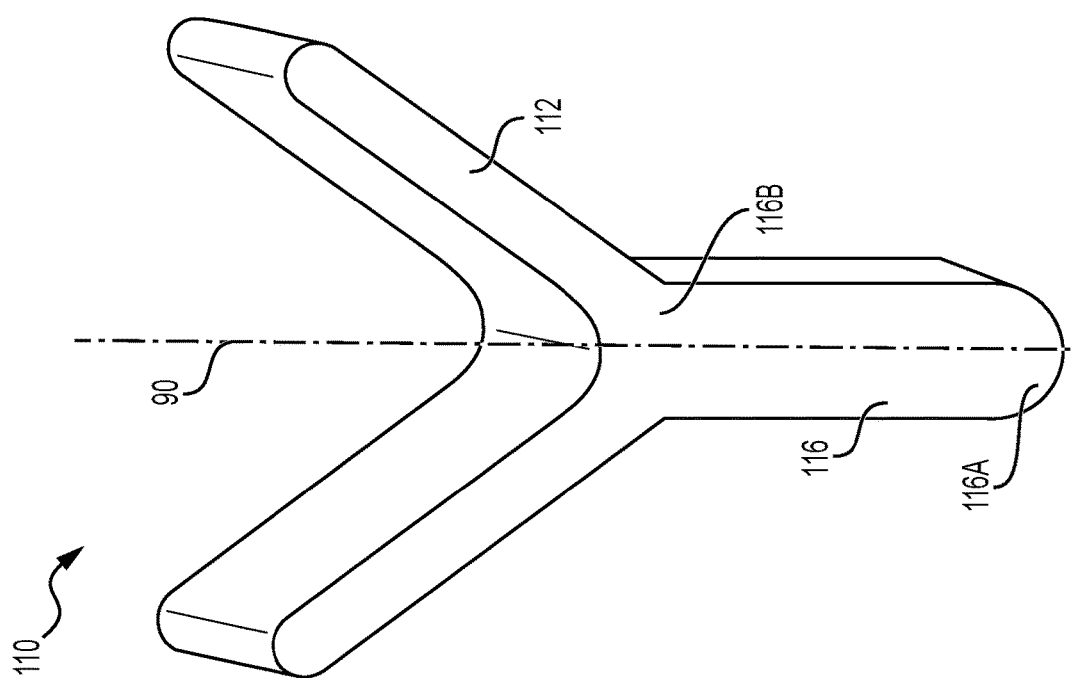
Figure 22:
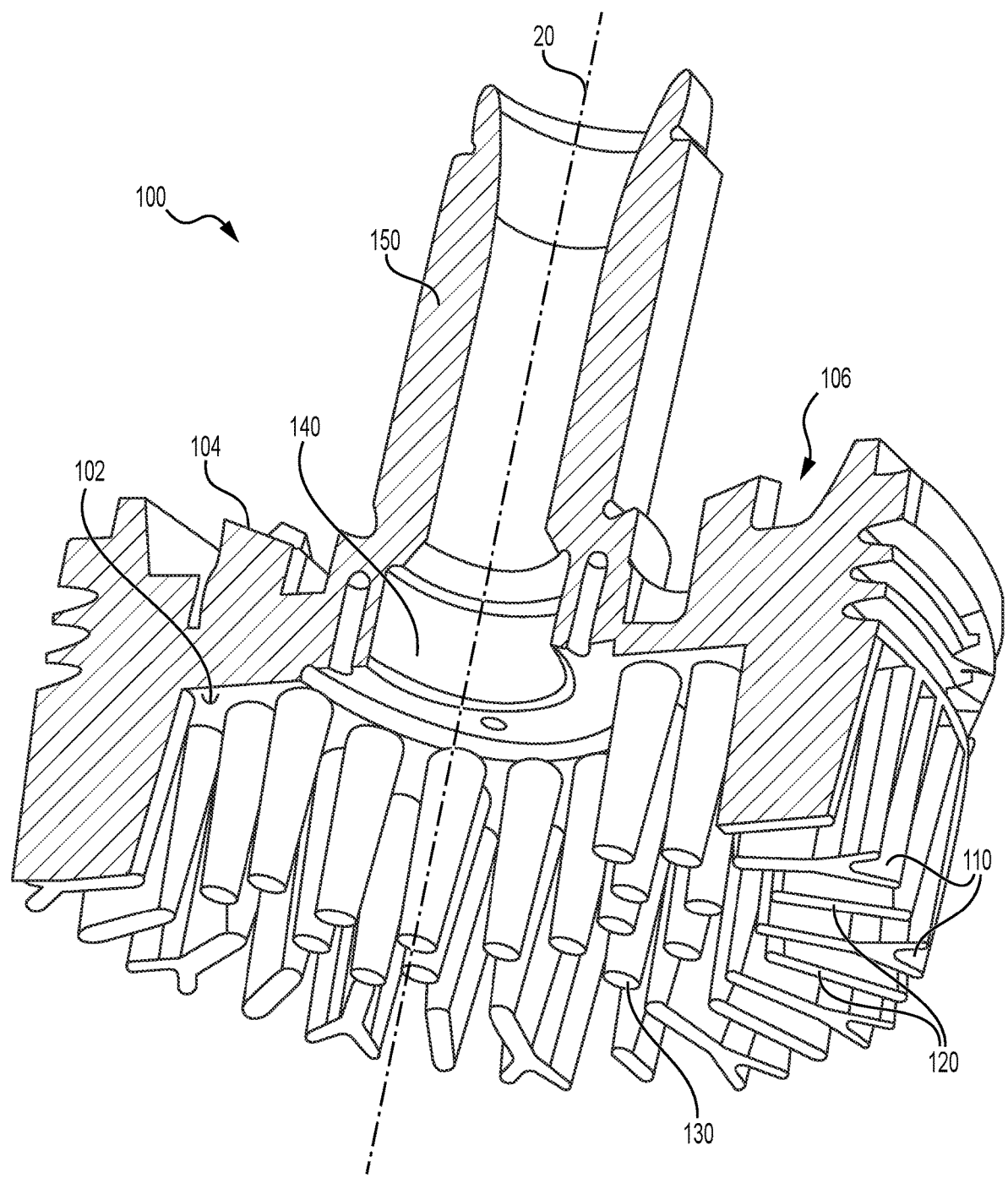
FIG. 22 illustrates a cross-sectional perspective view of another exemplary thermal dissipation plate of an electric machine consistent with some embodiments of the current disclosure.

FIGS. 19, 20A, 20B, and 22 indicate an exemplary heat dissipation plate 100 with a Y-shaped cooling fins 110 extending from the second side 102 of the heat dissipation plate 100. And FIG. 20C is a schematic illustration of a heat dissipation plate 100 with ψ-shaped cooling fins 100'. As can be seen in these figures, the Y-shaped cooling fins 110 (and the ψ-shaped cooling fins 100') may be circumferentially arranged or distributed on the heat dissipation plate 100 with their linear segments 116 extending along radial axis 90. The open ends of the V-shaped deflector portion of the Y-shape cooling fins 110, and the open ends of the E-shaped deflector portion, may face the circular outer periphery of heat dissipation plate 100. In some embodiments, as shown in these figures, the distal-most ends of the V-shaped and E-shaped segments may extend to the outer periphery of heat dissipation plate 100. In some embodiments, as illustrated in FIG. 20C, the Y-shape cooling fins 110 of heat dissipation plate 100 may be replaced with ψ-shaped cooling fins 110'.

Consistent with some embodiments, the second side of the heat dissipation plate further includes non-Y and non-ψ shaped cooling fins disposed between adjacent Y-shaped or ψ-shaped cooling fins. Non-Y and non-ψ shaped cooling fins are cooling fins that have a different shape than the previously described Y-shaped and ψ-shaped cooling fins. They may include cooling fins of any shape different from the Y-shaped and ψ-shaped cooling fins. For example, as best seen in FIGS. 20B and 20C, non-Y and non-ψ shaped cooling fins in the form of cooling fins 120 may be disposed between adjacent Y-shaped or ψ-shaped cooling fins, in some embodiments. Although not a requirement, in some embodiments, all the non-Y and non-ψ shaped cooling fins may have the same shape. In some embodiments, the non-Y and non-ψ shaped cooling fins are linear cooling fins extending from the outer periphery of the heat dissipation plate towards the central opening. For example, as illustrated, in FIGS. 20B and 20C, cooling fins 120 are linear cooling fins that extend from the outer periphery of the heat dissipation plate 100 towards the central opening 140 (and the axis of rotation 20). As illustrated in these figures, in some embodiments, cooling fins 120 may extend along the radial axis 90 of the electric machine.

Consistent with some embodiments, the second side of the heat dissipation plate further includes a plurality of cooling pins disposed radially inwards of the Y-shaped or ψ-shaped cooling fins. Cooling pins are cooling fins that have a columnar structure. These pins may have any cross-sectional shape (round, square, or another suitable shape). As illustrated, for example, in FIGS. 19, 20A-20C, and 22, the second side 102 of the heat dissipation plate 100 includes cooling pins 120 radially inwards of cooling fins 110, 110'. In some embodiments, the plurality of cooling pins are arranged at a common radial distance from the central opening. As illustrated in these figures, in some embodiments, these cooling pins 120 may be arranged in a circular pattern between cooling fins 110 (or 110') and the central opening 140. In some embodiments, the plurality of cooling pins are symmetrically arranged about the central opening. For example, cooling pins 120 may be symmetrically arranged about the central opening 140 and the axis of rotation 20. In some embodiments, the plurality of cooling pins include a first set of cooling pins arranged at a first common radial distance from the central opening and a second set of cooling pins arranged at a different second common radial distance from the central opening. In some embodiments, a single circular array of cooling pins 120 may be provided (see, e.g., FIG. 20A), while in some embodiments, multiple circular arrays of cooling pins 120 may be arranged between the cooling fins 110, 110' and the central opening 140 (see, e.g., FIGS. 19, 20B, 20C).

Consistent with some embodiments, the heat dissipation plate further includes a plurality of cavities that extend from the second side to the first side, the plurality of cavities being symmetrically positioned about the central opening. Cavities refer to divots, indentations, or openings. For example, as can be seen in FIGS. 20A and 20B, in some embodiments, cavities 142 may extend through the heat dissipation plate 100. In some embodiments, these cavities may serve as attachment points for components of the electric machine. In some embodiments, these cavities 142 may serve as air holes. In general, any number of cavities (3, 4, 5, or any other number) may be provided. In some embodiments, these cavities 142 may be symmetrically disposed about the central opening 140 and may be positioned between the sets of cooling fins 110, 110'. In some embodiments, the electric machine is an electric generator, and in some embodiments, the electric machine is an electric motor. As explained previously, electric machine 10' may be an electric motor or an electric generator.

While FIGS. 19-22 illustrate various examples of fins, deflectors, pins, and cavities, the arrangements of such structures and their symmetries are provided as examples only, it being understood that other arrangements of the disclosed elements or variations thereof may be employed within the scope and spirit of this disclosure.

In embodiments where the coils 70 and/or other parts of the stator 30 are thermal contact with heat dissipation plate 100 due to direct physical contact heat from the coils 70

(and/or other stator components) may conduct directly into heat dissipation plate 100. In embodiments, where a thermally-conductive material is provided between the mating parts, heat may be conducted through the thermally-conductive material. Thus, thermal communication between the coils 70 and/or other stator components and heat dissipation plate 100 provides a direct pathway for the heat to conduct out of the stator 30. Air flow across the cooling fins 110 or 110' and the pins 120 on the opposite side of the heat dissipation plate 100 may then remove the heat from the heat dissipation plate 100. Thus, the heat dissipation plate 100 may act as an air-cooled radiator for the electrical machine. The Y-shaped or ψ-shaped cooling fins 110, 110' improves the air flow over the heat dissipation plate 100 and the removal of heat therefrom.

An exemplary method of assembling a stator of an electric machine will now be described with reference to FIGS. 23A-23I. It should be noted that, for the sake of brevity, the exemplary method is only described using some configuration of components (e.g., first, second, and third clips, 52, 54, 56, etc.). However, this is only exemplary and the stator may be similarly assembled using any disclosed configuration of components (e.g., clips). A plurality of electromagnetic coils 70 may be provided for installation on the composite teeth of the stator. These coils may be manufactured, acquired, or provided for assembly in some manner. As previously described, each of these coils may have an opening 74. When the stator is assembled (see, e.g., FIG. 8), the coil opening 74 may have a length that extends along the axis of rotation 20 and a depth that extends along the radial axis 90 (see, e.g., FIG. 9A).

The shape of the coil opening 74 may correspond to (e.g., may be similar to) the wedge-shaped shape of the assembled composite or multi-part tooth (see, e.g., FIGS. 10A-10B). A first clip 52 may be placed on a second clip 54 as illustrated, for example, in FIG. 23B, such the two clips 52, 54 are mirror symmetric about a plane perpendicular to the axis of rotation 20. In other words, the first and second clips 52, 54 are stacked one on top of another. In some embodiments, the first and second clips 52, 54 may be positioned close to each other. In general, a first clip 52 (with a first arcuate yoke 52C with one or more wedge-shaped teeth 52D, see FIGS. 11A-11D) and a second clip 54 (with a second arcuate yoke 54C with wedge-shaped teeth 54D, see FIGS. 11A-11D) may be positioned along the axis of rotation 20 on, or next to, each other (see, e.g., FIGS. 23A, 23B). When the first and second clips 52, 54 are placed on each other (see, e.g., FIG. 23B), the cross-section of the combined tooth portion (formed by tooth 52D of clip 52 and tooth 54D of clip 54) of the two clips 52, 54 in the axial plane forms a trapezoid.

Figure 23I:
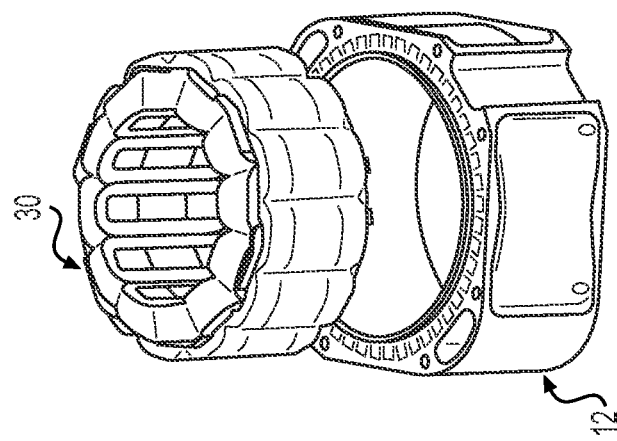
Figure 23H:
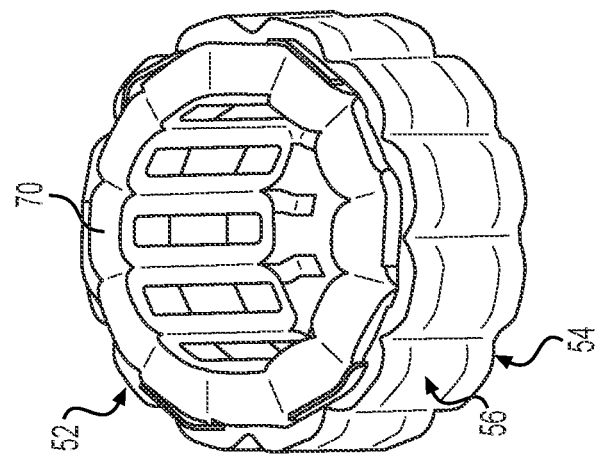

With the two clips 52, 54 placed on (or close to) each other, the combined tooth portion (i.e., tooth 52D and 54D) of the two clips 52, 54 is inserted into the opening 74 of a coil 70 (see, e.g., FIGS. 23B, 23C). When so inserted, the combined tooth portion may fill the depth of the opening 74 with a gap along the length of the opening 74. If the teeth 52D, 54D of the clips 52, 54 are inserted into the middle region of the opening 74 (see, e.g., FIG. 23C), there may be a first gap between the top of tooth 52D of clip 52 and the top surface of the opening 74 and there may be a second gap between the bottom of tooth 54D of clip 54 and the bottom surface of the opening 74. The two clips 52, 54 with their wedge-shaped teeth 52D, 54D may then be moved (or displaced) in the opposite directions (see arrow A in FIG. 23D) along the axis of rotation 20 until they stop moving. That is, until the two teeth 52D, 54D push against the top and bottom surfaces, respectively, of the opening 74 and create a gap between the two teeth 52D, 54D. In some embodiments, as illustrated in FIGS. 23A-23I, the first and second clips 52, 54 may have an arcuate semicircular configuration (see also, FIGS. 11B-11C). Adjacent teeth 56D of a third or intermediate clip or spacer 56 may then be inserted into the gap in the coil opening 74 between the first and second clips 52, 54 (see, e.g., FIGS. 23E, 23F). When so inserted, one tooth 56D (of spacer 56) will fill the gap between the teeth 52D, 54D (of the first and second clips 52, 54) in a coil opening 74. In some embodiments, when inserted, tooth 56D of the spacer 56 may push against, and move, the teeth 52D, 54D of the first and second clips 52, 54 (e.g., upwards, and downwards along the axis of rotation 20) to push against the interior walls of the opening 74 such that the composite tooth snugly fits in the coil opening 74.

Figure 23G:
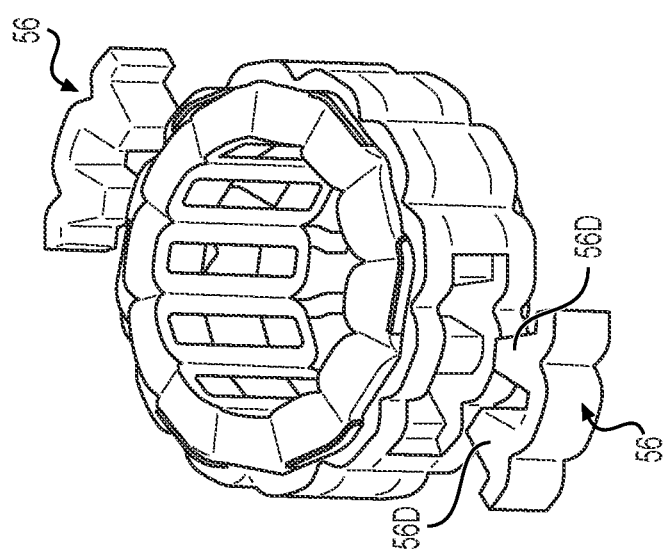

When first and second clips 52, 54 having a semicircular configuration is used, two arcuate semicircular portions (or halves) of the stator may be assembled as described above (see, e.g., FIG. 23F). The two arcuate halves (each with two terminal or free ends) may then be joined together to form a ring shaped stator 30 (see, FIGS. 23F, 23G). As illustrated in FIGS. 23F and 23G, in some embodiments, the two arcuate halves may be joined by inserting adjacent teeth 56D of a spacer 56 into openings in each half. For example, as best seen in FIG. 23G, one teeth 56D of a spacer 56 is inserted into a coil opening at one terminal end of a semicircular half and another teeth 56D of the same spacer 56 is inserted into the coil opening 74 at a terminal end of another semicircular half to connect the two terminal ends of the two semicircular halves together. Another spacer 56 may be used to similarly connect the other two terminal ends of the two semicircular halves. By connecting two semicircular halves together a ring shaped stator 30 is formed. The assembled stator 30 may then be installed in the housing 12. Here, the two-toothed spacer 56 acts as a clamp that holds the two halves of the stator together before being installed into the housing 12. It should be noted that, although first and second clips 52, 54 having the configuration illustrated in FIG. 11B, and spacer 56 having the configuration illustrated in FIG. 12B, is used to describe the exemplary method above, this is only exemplary. In general, any previously-described configuration of first and second clips 52, 54 (e.g., illustrated in FIGS. 11A-11F) and any previously-described configuration of spacer 56 (e.g., illustrated in FIGS. 12A-12D) may be used to assemble a stator in a similar manner.

Moreover, the above-described embodiments of electric machines are merely exemplary Many variations are possible. Some possible variations are described in U.S. Pat. Nos. 9,502,951, 10,056,813, and PCT publication WO 2022/058939 A1 (published on Mar. 24, 2022), each of which is incorporated by reference herein in its entirety which are incorporated by reference in their entirety herein. Furthermore, although some aspects of the electric machine are described with reference to an electric machine of a particular configuration, the described aspects may be used in an electric machine having any configuration.

Listed below are clauses relating to exemplary electric machines of the current disclosure.

Clause 1. An electric machine, comprising:
  a plurality of coils, wherein each coil of the plurality of coils defines a coil opening;
  a plurality of U-shaped clips, wherein each U-shaped clip includes a first tooth, a second tooth, and a yoke interconnecting the first tooth and the second tooth; and
  wherein the first tooth of each U-shaped clip is disposed in one coil opening of the plurality of coils, and the second tooth of each U-shaped clip is disposed in another coil opening of an adjacent coil, with the yoke bridging two adjacent coils, and wherein two sidewalls of the two adjacent coils are sandwiched between the first tooth and the second tooth of each U-shaped clip.

Clause 2. The electric machine of clause 1, wherein each coil opening includes multiple teeth arranged along a length of the opening.

Clause 3. The electric machine of each preceding clause, wherein one or more teeth of the multiple teeth fills an entire width of each opening.

Clause 4. The electric machine of each preceding clause, wherein a single tooth of the multiple teeth fills an entire width of each opening.

Clause 5. The electric machine of each preceding clause, wherein the multiple teeth includes at least an upper tooth, a lower tooth, and a middle tooth, and wherein at least one of the upper tooth or the lower tooth fills an entire width of each opening and includes an arc-shaped yoke with a plurality of teeth extending therefrom.

Clause 6. The electric machine of each preceding clause, wherein each coil opening contains at least one first tooth of a first group of the plurality of U-shaped clips and at least one first tooth of a second group of the plurality of U-shaped clips, and wherein the first group differs from the second group.

Clause 7. The electric machine of each preceding clause, wherein the at least one first tooth of the first group has a length greater than a length of the at least one first tooth of the second group.

Clause 8. The electric machine of each preceding clause, wherein at least two first teeth in the second group have a common length.

Clause 9. The electric machine of each preceding clause, wherein a group of the plurality of U-shaped clips have first tooths disposed in the coil opening of one of the plurality of coils, and wherein at least one U-shaped clip in the group has a first tooth that is wedge-shaped.

Clause 10. The electric machine of each preceding clause, wherein the at least one U-shaped clip in the group has a second tooth that is wedge-shaped.

Clause 11. The electric machine of each preceding clause, wherein the at least one U-shaped clip in the group is made of an SMC material.

Clause 12. The electric machine of each preceding clause, wherein all of the U-shaped clips in the group are made of an SMC material.

Clause 13. The electric machine of each preceding clause, wherein all of the U-shaped clips in the group are made of laminated steel.

Clause 14. The electric machine of each preceding clause, wherein each wedge-shaped first tooth has a length dimension that varies from one end of the coil opening towards an opposite end of the coil opening.

Clause 15. The electric machine of each preceding clause, wherein the plurality of yokes cooperate to form a ring.

Clause 16. The electric machine of each preceding clause, wherein the plurality of yokes cooperate to form a first ring and a second ring.

Clause 17. The electric machine of each preceding clause, wherein a plurality of standalone U-shaped clips are disposed between the first ring and the second ring.

Clause 18. The electric machine of each preceding clause, wherein the yokes of a group from the plurality of U-shaped clips are interconnected.

Clause 19. The electric machine of each preceding clause, wherein a plurality of first tooths and a plurality of second tooths are disposed in each coil opening, and wherein at least one pair of a particular first tooth and a particular second tooth have a length greater than a length of other first tooths and second tooths disposed in each coil opening.

Clause 20. The electric machine of each preceding clause, wherein the electric machine includes a stator positioned radially outwards of a rotor, and the plurality of U-shaped clips form a part of the stator.

Clause 21. An electric machine as recited in this clause alone or in combination with any of the preceding clauses, comprising:
a plurality of coils, wherein each coil defines a coil opening, and wherein each coil opening includes a first section, a second section, and an intermediate section between the first section and the second section;
at least one first yoke;
a plurality of first wedge-shaped teeth integrally formed with and extending from the at least one first yoke, and wherein each of the plurality of first wedge-shaped teeth extend into a differing one of the plurality of coil openings in the first section thereof;
at least one second yoke;
a plurality of second wedge-shaped teeth integrally formed with and extending from the at least one second yoke, and wherein each of the plurality of second wedge-shaped teeth extend into a differing one of the plurality of coil openings in the second section thereof;
at least one intermediate yoke between the at least one first yoke and the at least one second yoke;
a plurality of intermediate wedge-shaped teeth integrally formed with and extending from the at least one intermediate yoke, and wherein the plurality of intermediate wedge-shaped teeth extend into a differing one of the plurality of coil openings in the intermediate section thereof.

Clause 22. The electric machine of each preceding clause, wherein a pair of intermediate wedge-shaped teeth are disposed in each coil opening.

Clause 23. The electric machine of each preceding clause, wherein only one first wedge-shaped tooth and only one second wedge-shaped tooth are disposed in each coil opening.

Clause 24. The electric machine of each preceding clause, wherein a single intermediate wedge-shaped tooth is disposed in each coil opening.

Clause 25. The electric machine of each preceding clause, wherein the intermediate wedge-shaped teeth have a wedge shape that differs from a wedge shape of at least some of the first wedge-shaped teeth and second wedge-shaped teeth.

Clause 26. The electric machine of each preceding clause, wherein the intermediate wedge-shaped teeth are wedge-shaped in a first plane, and the first wedge-shaped teeth and the second wedge-shaped teeth are wedge-shaped in a second plane transverse to the first plane.

Clause 27. The electric machine of each preceding clause, wherein the first plane is perpendicular to an axis of rotation of the electric machine.

Clause 28. The electric machine of each preceding clause, wherein the first wedge-shaped teeth and the second wedge-shaped teeth are also wedge-shaped in the first plane.

Clause 29. The electric machine of each preceding clause, wherein the at least one first yoke includes a plurality of first yokes, wherein a pair of first wedge-shaped teeth extend from each of the plurality of first yokes, wherein the at least one second yoke includes a plurality of second yokes, and wherein a pair of second wedge-shaped teeth extend from each of the plurality of second yokes.

Clause 30. The electric machine of each preceding clause, wherein the at least one first yoke, the at least one second yoke, and the at least one intermediate yoke are part of a stator of the electric machine.

Clause 31. The electric machine of each preceding clause, further including a rotor positioned radially inwards of the stator.

Clause 32. The electric machine of each preceding clause, wherein the plurality of first wedge-shaped teeth and the plurality of second wedge-shaped teeth share a common size and shape.

Clause 33. The electric machine of each preceding clause, wherein the plurality of coils are symmetrically arranged about an axis of rotation of the electric machine, and the coil opening of each coil contains a tooth construction formed of a single first wedge-shaped tooth, a single second wedge-shaped tooth, and a pair of adjacently positioned intermediate wedge-shaped teeth.

Clause 34. The electric machine of each preceding clause, wherein the plurality of coils are symmetrically arranged about an axis of rotation of the electric machine, and the coil opening of each coil contains a tooth construction formed of a single first wedge-shaped tooth, a single second wedge-shaped tooth, and a single intermediate wedge-shaped tooth.

Clause 35. The electric machine of each preceding clause, wherein the at least one first yoke, the at least one second yoke, and the at least one intermediate yoke are arc-shaped.

Clause 36. The electric machine of each preceding clause, wherein, the at least one intermediate yoke includes two stacked intermediate yokes.

Clause 37. The electric machine of each preceding clause, wherein the first, the second, and the intermediate wedge-shaped teeth in each coil opening collectively forms a multi-part tooth that extends in a radial direction of the electric machine and is shaped such that a plurality of cross-sectional areas of the multi-part tooth in a plurality of planes perpendicular to the radial direction vary and perimeters of the plurality of cross-sections are substantially the same across the plurality of planes.

Clause 38. The electric machine of each preceding clause, wherein the cross-sectional area of each multi-part tooth in a plane perpendicular to the radial direction increases toward an axis or rotation of the electric machine.

Clause 39. The electric machine of each preceding clause, wherein a cross-sectional shape of each multi-part tooth in at least one of an axial plane or a radial plane of the electric machine is a trapezoid.

Clause 40. The electric machine of each preceding clause, wherein the electric machine is an electric generator or an electric motor.

Clause 41. An electric machine as recited in this clause alone or in combination with any of the preceding clauses, comprising:

a plurality of electromagnetic coils with each electromagnetic coil defining a trapezoidally-shaped and tapered coil opening, wherein the plurality of electromagnetic coils are arranged circumferentially about an axis of rotation of the electric machine;

a plurality of yokes each extending in an axial direction, wherein at least one of the plurality of yokes is tapered in the axial direction; and a plurality of teeth, wherein at least one tooth of the plurality of teeth extends from each of the plurality of yokes, and wherein the plurality of teeth are each tapered in a radial direction to enable the plurality of teeth to fit within a corresponding trapezoidally-shaped and tapered coil opening.

Clause 42. The electric machine of each preceding clause, wherein only one of the plurality of teeth extends from each of the plurality of yokes.

Clause 43. The electric machine of each preceding clause, wherein each yoke of the plurality of yokes is tapered along two edges in the axial direction such that one side of the yoke is wider than another side of the yoke.

Clause 44. The electric machine of each preceding clause, wherein a wide side of each yoke is arranged adjacent a narrower side of an adjacent yoke.

Clause 45. The electric machine of each preceding clause, wherein each tooth of the plurality of teeth is tapered in four planes.

Clause 46. The electric machine of each preceding clause, wherein each tooth of the plurality of teeth is tapered in two planes, and wherein the electric machine further includes a pair of shims disposed on opposite sides of each tooth of the plurality of teeth.

Clause 47. The electric machine of each preceding clause, wherein the two tapered planes are transverse to each other.

Clause 48. The electric machine of each preceding clause, wherein at least three sides of each shim are tapered.

Clause 49. The electric machine of each preceding clause, wherein outer surfaces the plurality of yokes cooperate to form a cylindrical shape.

Clause 50. The electric machine of each preceding clause, wherein an edge of at least one yoke of the plurality of yokes is not aligned with an edge of an adjacent yoke.

Clause 51. The electric machine of each preceding clause, further including a rotor positioned radially inwards of the plurality of electromagnetic coils.

Clause 52. The electric machine of each preceding clause, further including a rotor positioned radially outwards of the plurality of electromagnetic coils.

Clause 53. The electric machine of each preceding clause, wherein the plurality of teeth are formed of SMC material.

Clause 54. The electric machine of each preceding clause, wherein the plurality of teeth are formed of laminated steel.

Clause 55. The electric machine of each preceding clause, wherein at least one yoke has two of the plurality of teeth extending therefrom.

Clause 56. The electric machine of each preceding clause, wherein the plurality of teeth within each coil opening together forms a wedge-shaped multi-part tooth that extends in a radial direction of the electric machine and is shaped such that a plurality of cross-sectional areas of the multi-part tooth in a plurality of planes perpendicular to the radial direction vary and perimeters of the plurality of cross-sections are substantially the same across the plurality of planes.

Clause 57. The electric machine of each preceding clause, wherein the cross-sectional area of each multi-part tooth in a plane perpendicular to the radial direction increases toward an axis of rotation of the electric machine.

Clause 58. The electric machine of each preceding clause, wherein a cross-sectional shape of each multi-part tooth in at least one of an axial plane or a radial plane of the electric machine is a trapezoid.

Clause 59. The electric machine of each preceding clause, wherein the electric machine is an electric generator.

Clause 60. The electric machine of each preceding clause, wherein the electric machine is an electric motor.

Clause 61. An air coolable electric machine as recited in this clause alone or in combination with any of the preceding clauses, comprising:
a rotor;
a stator;
a heat dissipation plate having a first side arranged for thermal communication with the stator, the heat dissipation plate having a central opening therein and an outer periphery; and
a plurality of circumferentially distributed Y-shaped or ψ-shaped cooling fins extending from a second side of the heat dissipation plate opposite the first side, wherein each cooling fin includes a radially extending leg portion and a V-shaped or ψ-shaped deflector portion, wherein each V-shaped or ψ-shaped deflector portion faces the outer periphery of the heat dissipation plate to deflect a first portion of airflow outwardly, and wherein each radially extending leg portion is arranged to direct portion of airflow inwardly toward the central opening.

Clause 62. The electric machine of each preceding clause, wherein the second side of the heat dissipation plate further includes non-Y and non-ψ shaped cooling fins disposed between adjacent Y-shaped or ψ-shaped cooling fins.

Clause 63. The electric machine of each preceding clause, wherein the non-Y and non-ψ shaped cooling fins are linear cooling fins extending from the outer periphery of the heat dissipation plate towards the central opening.

Clause 64. The electric machine of each preceding clause, wherein the Y-shaped or ψ-shaped cooling fins are symmetrically arranged about the central opening.

Clause 65. The electric machine of each preceding clause, wherein the second side of the heat dissipation plate further includes a plurality of cooling pins disposed radially inwards of the Y-shaped or ψ-shaped cooling fins.

Clause 66. The electric machine of each preceding clause, wherein the plurality of cooling pins are symmetrically arranged about the central opening.

Clause 67. The electric machine of each preceding clause, wherein the plurality of cooling pins are arranged at a common radial distance from the central opening.

Clause 68. The electric machine of each preceding clause, wherein the plurality of cooling pins include a first set of cooling pins arranged at a first common radial distance from the central opening and a second set of cooling pins arranged at a different second common radial distance from the central opening.

Clause 69. The electric machine of each preceding clause, wherein the heat dissipation plate further includes a plurality of cavities that extend from the second side to the first side, the plurality of cavities being symmetrically positioned about the central opening.

Clause 70. The electric machine of each preceding clause, wherein the heat dissipation plate is formed of aluminum.

Clause 71. The electric machine of each preceding clause, wherein the Y-shaped or ψ-shaped cooling fins are arranged such that they radiate outwardly from a center of the cooling plate.

Clause 72. The electric machine of each preceding clause, wherein the electric machine is an electric generator.

Clause 73. The electric machine of each preceding clause, wherein the electric machine is an electric motor.

Disclosed embodiments of electric machines may include any one of the following bullet-pointed features alone or in combination with one or more other bullet-pointed features.

An electric machine
a plurality of coils
each coil of the plurality of coils defines a coil opening
a plurality of U-shaped clips
each U-shaped clip includes a first tooth, a second tooth, and a yoke interconnecting the first tooth and the second tooth
the first tooth of each U-shaped clip is disposed in one coil opening of the plurality of coils
the second tooth of each U-shaped clip is disposed in another coil opening of an adjacent coil
the yoke bridging two adjacent coils
two sidewalls of the two adjacent coils are sandwiched between the first tooth and the second tooth of each U-shaped clip.
each coil opening includes multiple teeth arranged along a length of the opening.
one or more teeth of the multiple teeth fills an entire width of each opening.
a single tooth of the multiple teeth fills an entire width of each opening.
multiple teeth includes at least an upper tooth, a lower tooth, and a middle tooth
at least one of the upper tooth or the lower tooth fills an entire width of each opening
at least one of the upper tooth or the lower tooth includes an arc-shaped yoke with a plurality of teeth extending therefrom.
each coil opening contains at least one first tooth of a first group of the plurality of U-shaped clips and at least one first tooth of a second group of the plurality of U-shaped clips
the first group differs from the second group.
at least one first tooth of the first group has a length greater than a length of the at least one first tooth of the second group.
at least two first teeth in the second group have a common length.
a group of the plurality of U-shaped clips have first tooths disposed in the coil opening of one of the plurality of coils.
at least one U-shaped clip in the group has a first tooth that is wedge-shaped.
at least one U-shaped clip in the group has a second tooth that is wedge-shaped.
at least one U-shaped clip in the group is made of an SMC material.
all of the U-shaped clips in the group are made of an SMC material.
all of the U-shaped clips in the group are made of laminated steel.

each wedge-shaped first tooth has a length dimension that varies from one end of the coil opening towards an opposite end of the coil opening.
the plurality of yokes cooperate to form a ring.
the plurality of yokes cooperate to form a first ring and a second ring.
a plurality of standalone U-shaped clips are disposed between the first ring and the second ring.
the yokes of a group from the plurality of U-shaped clips are interconnected.
a plurality of first tooths and a plurality of second tooths are disposed in each coil opening.
at least one pair of a particular first tooth and a particular second tooth have a length greater than a length of other first tooths and second tooths disposed in each coil opening.
the electric machine includes a stator positioned radially outwards of a rotor
the plurality of U-shaped clips form a part of the stator.
each coil opening includes a first section, a second section, and an intermediate section between the first section and the second section;
at least one first yoke;
a plurality of first wedge-shaped teeth integrally formed with and extending from the at least one first yoke
each of the plurality of first wedge-shaped teeth extend into a differing one of the plurality of coil openings in the first section thereof.
at least one second yoke.
a plurality of second wedge-shaped teeth integrally formed with and extending from the at least one second yoke.
each of the plurality of second wedge-shaped teeth extend into a differing one of the plurality of coil openings in the second section thereof.
at least one intermediate yoke between the at least one first yoke and the at least one second yoke.
a plurality of intermediate wedge-shaped teeth integrally formed with and extending from the at least one intermediate yoke.
the plurality of intermediate wedge-shaped teeth extend into a differing one of the plurality of coil openings in the intermediate section thereof.
a pair of intermediate wedge-shaped teeth are disposed in each coil opening.
only one first wedge-shaped tooth and only one second wedge-shaped tooth are disposed in each coil opening.
a single intermediate wedge-shaped tooth is disposed in each coil opening.
the intermediate wedge-shaped teeth have a wedge shape that differs from a wedge shape of at least some of the first wedge-shaped teeth and second wedge-shaped teeth.
the intermediate wedge-shaped teeth are wedge-shaped in a first plane.
the first wedge-shaped teeth and the second wedge-shaped teeth are wedge-shaped in a second plane transverse to the first plane.
the first plane is perpendicular to an axis of rotation of the electric machine.
the first wedge-shaped teeth and the second wedge-shaped teeth are also wedge-shaped in the first plane.
at least one first yoke includes a plurality of first yokes.
a pair of first wedge-shaped teeth extend from each of the plurality of first yokes.
at least one second yoke includes a plurality of second yokes.
a pair of second wedge-shaped teeth extend from each of the plurality of second yokes.
at least one first yoke, the at least one second yoke, and the at least one intermediate yoke are part of a stator of the electric machine.
a rotor positioned radially inwards of the stator.
the plurality of first wedge-shaped teeth and the plurality of second wedge-shaped teeth share a common size and shape.
the plurality of coils are symmetrically arranged about an axis of rotation of the electric machine.
each coil contains a tooth construction formed of a single first wedge-shaped tooth, a single second wedge-shaped tooth, and a pair of adjacently positioned intermediate wedge-shaped teeth.
the plurality of coils are symmetrically arranged about an axis of rotation of the electric machine.
the coil opening of each coil contains a tooth construction formed of a single first wedge-shaped tooth, a single second wedge-shaped tooth, and a single intermediate wedge-shaped tooth.
the at least one first yoke, the at least one second yoke, and the at least one intermediate yoke are arc-shaped.
the at least one intermediate yoke includes two stacked intermediate yokes.
the first, the second, and the intermediate wedge-shaped teeth in each coil opening collectively forms a multi-part tooth that extends in a radial direction of the electric machine.
a multi-part tooth is shaped such that a plurality of cross-sectional areas of the multi-part tooth in a plurality of planes perpendicular to the radial direction vary
perimeters of the plurality of cross-sections of a multi-part tooth are substantially the same across the plurality of planes.
the cross-sectional area of each multi-part tooth in a plane perpendicular to the radial direction increases toward an axis or rotation of the electric machine.
a cross-sectional shape of each multi-part tooth in at least one of an axial plane or a radial plane of the electric machine is a trapezoid.
the electric machine is an electric generator or an electric motor.
a plurality of electromagnetic coils with each electromagnetic coil defining a trapezoidally-shaped and tapered coil opening.
the plurality of electromagnetic coils are arranged circumferentially about an axis of rotation of the electric machine.
a plurality of yokes each extending in an axial direction.
at least one of the plurality of yokes is tapered in the axial direction.
a plurality of teeth.
at least one tooth of the plurality of teeth extends from each of the plurality of yokes.
the plurality of teeth are each tapered in a radial direction to enable the plurality of teeth to fit within a corresponding trapezoidally-shaped and tapered coil opening.
only one of the plurality of teeth extends from each of the plurality of yokes.
each yoke of the plurality of yokes is tapered along two edges in the axial direction such that one side of the yoke is wider than another side of the yoke.
a wide side of each yoke is arranged adjacent a narrower side of an adjacent yoke.

each tooth of the plurality of teeth is tapered in four planes.

each tooth of the plurality of teeth is tapered in two planes.

a pair of shims disposed on opposite sides of each tooth of the plurality of teeth.

the two tapered planes are transverse to each other.

at least three sides of each shim are tapered.

outer surfaces the plurality of yokes cooperate to form a cylindrical shape.

an edge of at least one yoke of the plurality of yokes is not aligned with an edge of an adjacent yoke.

a rotor positioned radially inwards of the plurality of electromagnetic coils.

a rotor positioned radially outwards of the plurality of electromagnetic coils.

the plurality of teeth are formed of SMC material.

the plurality of teeth are formed of laminated steel.

at least one yoke has two of the plurality of teeth extending therefrom.

the plurality of teeth within each coil opening together forms a wedge-shaped multi-part tooth that extends in a radial direction of the electric machine.

the cross-sectional area of each multi-part tooth in a plane perpendicular to the radial direction increases toward an axis of rotation of the electric machine.

a cross-sectional shape of each multi-part tooth in at least one of an axial plane or a radial plane of the electric machine is a trapezoid.

an air coolable electric machine.

a rotor.

a stator.

a heat dissipation plate having a first side arranged for thermal communication with the stator.

the heat dissipation plate having a central opening therein and an outer periphery a plurality of circumferentially distributed Y-shaped or ψ-shaped cooling fins extending from a second side of the heat dissipation plate opposite the first side.

each cooling fin includes a radially extending leg portion and a V-shaped or ʊ-shaped deflector portion.

each V-shaped or ψ-shaped deflector portion faces the outer periphery of the heat dissipation plate to deflect a first portion of airflow outwardly.

each radially extending leg portion is arranged to direct portion of airflow inwardly toward the central opening.

the second side of the heat dissipation plate further includes non-Y and non-ψ shaped cooling fins disposed between adjacent Y-shaped or ψ-shaped cooling fins.

the non-Y and non-ψ shaped cooling fins are linear cooling fins extending from the outer periphery of the heat dissipation plate towards the central opening.

the Y-shaped or ψ-shaped cooling fins are symmetrically arranged about the central opening.

the second side of the heat dissipation plate further includes a plurality of cooling pins disposed radially inwards of the Y-shaped or ψ-shaped cooling fins.

the plurality of cooling pins are symmetrically arranged about the central opening.

the plurality of cooling pins are arranged at a common radial distance from the central opening.

the plurality of cooling pins include a first set of cooling pins arranged at a first common radial distance from the central opening and a second set of cooling pins arranged at a different second common radial distance from the central opening.

the heat dissipation plate further includes a plurality of cavities that extend from the second side to the first side.

the plurality of cavities being symmetrically positioned about the central opening.

the heat dissipation plate is formed of aluminum.

the Y-shaped or ψ-shaped cooling fins are arranged such that they radiate outwardly from a center of the cooling plate.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents may be resorted to, falling within the scope of the disclosure.

Moreover, while illustrative embodiments have been described herein, the scope may include any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. An electric machine, comprising:
 a plurality of coils configured to be arranged about an axis of rotation of the electric machine, wherein each coil defines a coil opening extending towards the axis of rotation from a radially outer end to a radially inner end, and wherein each coil opening includes a first section, a second section, and an intermediate section between the first section and the second section;

at least one first yoke;
a plurality of first wedge-shaped teeth integrally formed with and extending from the at least one first yoke, and wherein each of the plurality of first wedge-shaped teeth extend into a differing one of the plurality of coil openings in the first section thereof;
at least one second yoke;
a plurality of second wedge-shaped teeth integrally formed with and extending from the at least one second yoke, and wherein each of the plurality of second wedge-shaped teeth extend into a differing one of the plurality of coil openings in the second section thereof;
at least one intermediate yoke between the at least one first yoke and the at least one second yoke; and
a plurality of intermediate wedge-shaped teeth integrally formed with and extending from the at least one intermediate yoke, and wherein the plurality of intermediate wedge-shaped teeth extend into a differing one of the plurality of coil openings in the intermediate section thereof,
wherein, when the plurality of first, second, and intermediate wedge-shaped teeth are disposed in the coil openings of the plurality of coils, the at least one first yoke, the at least one second yoke, and the at least one intermediate yoke cooperate to form an annular ring extending about the axis of rotation at the radially outer end of the coil openings.

2. The electric machine of claim 1, wherein a pair of intermediate wedge-shaped teeth are disposed in each coil opening.

3. The electric machine of claim 1, wherein a single intermediate wedge-shaped tooth is disposed in each coil opening.

4. The electric machine of claim 3, wherein only one first wedge-shaped tooth and only one second wedge-shaped tooth are disposed in each coil opening.

5. The electric machine of claim 1, wherein the intermediate wedge-shaped teeth have a wedge shape that differs from a wedge shape of at least some of the first wedge-shaped teeth and second wedge-shaped teeth.

6. The electric machine of claim 5, wherein the first wedge-shaped teeth, the second wedge-shaped teeth and intermediate wedge-shaped teeth have a trapezoidal cross-sectional shape in a radial plane, and the first wedge-shaped teeth and the second wedge-shaped teeth have a trapezoidal cross-sectional shape in an axial plane.

7. The electric machine of claim 1, wherein the at least one first yoke includes a plurality of first yokes, wherein at least a pair of first wedge-shaped teeth extend from each of the plurality of first yokes, wherein the at least one second yoke includes a plurality of second yokes, and wherein at least a pair of second wedge-shaped teeth extend from each of the plurality of second yokes.

8. The electric machine of claim 1, wherein the at least one first yoke, the at least one second yoke, and the at least one intermediate yoke are part of a stator of the electric machine.

9. The electric machine of claim 8, further including a rotor positioned radially inwards of the stator.

10. The electric machine of claim 1, wherein the plurality of first wedge-shaped teeth and the plurality of second wedge-shaped teeth share a common size and shape.

11. The electric machine of claim 1, wherein the plurality of coils are symmetrically arranged about an axis of rotation of the electric machine, and the coil opening of each coil contains a tooth construction formed of a single first wedge-shaped tooth, a single second wedge-shaped tooth, and a pair of adjacently positioned intermediate wedge-shaped teeth.

12. The electric machine of claim 1, wherein the plurality of coils are symmetrically arranged about an axis of rotation of the electric machine, and the coil opening of each coil contains a tooth construction formed of a single first wedge-shaped tooth, a single second wedge-shaped tooth, and a single intermediate wedge-shaped tooth.

13. The electric machine of claim 1, wherein the at least one first yoke, the at least one second yoke, and the at least one intermediate yoke are arc-shaped.

14. The electric machine of claim 13, wherein at least one of the first yoke, the second yoke, and the intermediate yoke is made in the form of rings containing at least two arc segments.

15. The electric machine of claim 14, wherein, the at least one intermediate yoke includes at least two intermediate yokes stacked along an axis of rotation of the electric machine.

16. The electric machine of claim 1, wherein the first, the second, and the intermediate wedge-shaped teeth in each coil opening collectively forms a multi-part tooth that extends in a radial direction of the electric machine and is shaped such that a plurality of cross-sectional areas of the multi-part tooth in a plurality of planes perpendicular to the radial direction vary and perimeters of the plurality of cross-sections are substantially the same across the plurality of planes.

17. The electric machine of claim 16, wherein a cross-sectional shape of each multi-part tooth in at least one of an axial plane or a radial plane of the electric machine is a trapezoid.

18. The electric machine of claim 1, wherein the electric machine is an electric generator or an electric motor.

* * * * *